United States Patent
Goldenberg et al.

(10) Patent No.: US 10,538,932 B2
(45) Date of Patent: Jan. 21, 2020

(54) MASTER AND SLAVE POOL CLEANING ROBOTS

(71) Applicant: Maytronics Ltd., Kibbutz Yizrael (IL)

(72) Inventors: Sharon Goldenberg, Binyamina (IL); Yair Hadari, Kibbutz Hulata (IL); Ofer Regev, Tel-Adashim (IL); Shay Witelson, Kibbutz Yizrael (IL)

(73) Assignee: Maytronics Ltd, Herzliya ( * ) Notice: Subject to any disclaimer, the term of this patent is extended or adjusted under 35 U.S.C. 154(b) by 199 days.

(21) Appl. No.: 15/702,774

(22) Filed: Sep. 13, 2017

(65) Prior Publication Data

US 2018/0071908 A1    Mar. 15, 2018

Related U.S. Application Data

(60) Provisional application No. 62/393,816, filed on Sep. 13, 2016.

(51) Int. Cl.

| | |
|---|---|
| *G06F 19/00* | (2018.01) |
| *E04H 4/16* | (2006.01) |
| *G05D 1/02* | (2006.01) |
| *G05D 1/00* | (2006.01) |
| *G05D 1/10* | (2006.01) |
| *B25J 3/00* | (2006.01) |
| *B25J 11/00* | (2006.01) |

(52) U.S. Cl.
CPC .............. *E04H 4/1654* (2013.01); *B25J 3/00* (2013.01); *B25J 11/0085* (2013.01); *G05D 1/0027* (2013.01); *G05D 1/0214* (2013.01); *G05D 1/0219* (2013.01); *G05D 1/0295* (2013.01); *G05D 1/10* (2013.01); *G05D 2201/0203* (2013.01); *Y10S 901/01* (2013.01)

(58) Field of Classification Search
CPC .. E04H 4/1654; G05D 1/0295; G05D 1/0219; G05D 1/0214; G05D 1/10; G05D 1/0027; G05D 2201/0203; B25J 11/0085; B25J 3/00; Y10S 901/01
See application file for complete search history.

(56) References Cited

U.S. PATENT DOCUMENTS

| | | | | |
|---|---|---|---|---|
| 6,299,699 | B1 * | 10/2001 | Porat | E04H 4/1654 |
| | | | | 134/6 |
| 6,398,878 | B1 * | 6/2002 | Henkin | E04H 4/1654 |
| | | | | 134/167 R |
| 8,424,142 | B2 * | 4/2013 | Garti | E04H 4/1654 |
| | | | | 15/1.7 |
| 9,021,645 | B2 | 5/2015 | Garti | |
| 9,145,699 | B2 | 9/2015 | Ben Dov | |
| 9,222,275 | B2 | 12/2015 | Ben Dov | |
| RE45,852 | E | 1/2016 | Pareti | |
| 9,410,338 | B2 | 8/2016 | Ben Dov | |
| 2002/0166804 | A1 * | 11/2002 | Henkin | E04H 4/1654 |
| | | | | 210/167.1 |

(Continued)

FOREIGN PATENT DOCUMENTS

| | | |
|---|---|---|
| CN | 20139561 | 2/2010 |
| EP | 1041220 | 10/2000 |

(Continued)

*Primary Examiner* — Ian Jen
(74) *Attorney, Agent, or Firm* — Reches Patents

(57) ABSTRACT

A set of pool cleaning robots for cleaning a pool, wherein the set includes a master pool cleaning robot and a slave pool cleaning robot.

27 Claims, 33 Drawing Sheets

(56) References Cited

U.S. PATENT DOCUMENTS

| | | | | |
|---|---|---|---|---|
| 2003/0182742 A1* | 10/2003 | Wichmann | | E04H 4/1654 15/1.7 |
| 2003/0201218 A1* | 10/2003 | Henkin | | E04H 4/1654 210/167.16 |
| 2003/0212472 A1* | 11/2003 | McKee | | G05D 1/0274 700/245 |
| 2004/0073337 A1* | 4/2004 | McKee | | G05D 1/0251 700/245 |
| 2005/0040089 A1* | 2/2005 | Meritt-Powell | | B01D 39/1623 210/167.17 |
| 2007/0094817 A1* | 5/2007 | Stoltz | | E04H 4/1636 15/1.7 |
| 2012/0209566 A1 | 8/2012 | Idiart | | |
| 2013/0152316 A1* | 6/2013 | Rief | | E04H 4/1654 15/1.7 |
| 2014/0096329 A1* | 4/2014 | Garti | | E04H 4/1654 15/1.7 |
| 2014/0262401 A1* | 9/2014 | Renaud | | E04H 4/1654 173/152 |
| 2014/0262997 A1* | 9/2014 | Renaud | | E04H 4/1663 210/138 |
| 2014/0263087 A1* | 9/2014 | Renaud | | E04H 4/1654 210/745 |
| 2014/0273541 A1* | 9/2014 | Renaud | | H01R 39/64 439/13 |
| 2014/0366297 A1 | 12/2014 | Shlomi-Shlomi | | |
| 2015/0059106 A1* | 3/2015 | Rief | | E04H 4/1672 15/1.7 |
| 2015/0101135 A1 | 4/2015 | Witelson | | |
| 2015/0191925 A1* | 7/2015 | Maggeni | | C02F 1/001 210/85 |
| 2015/0292222 A1 | 10/2015 | Tamir | | |
| 2015/0314453 A1* | 11/2015 | Witelson | | B25J 11/00 320/108 |
| 2015/0337556 A1* | 11/2015 | Shlomi-Shlomi | | E04H 4/1654 210/167.16 |
| 2016/0040445 A1* | 2/2016 | Borg | | B01D 35/28 210/167.18 |
| 2016/0051913 A1* | 2/2016 | Witelson | | B01D 29/23 210/143 |
| 2016/0060887 A1* | 3/2016 | Tryber | | E04H 4/1654 15/1.7 |
| 2016/0129593 A1* | 5/2016 | Wolowelsky | | B25J 5/00 700/253 |
| 2016/0153210 A1* | 6/2016 | Sebor | | E04H 4/1654 15/1.7 |
| 2016/0215516 A1* | 7/2016 | Hayes | | E04H 4/1654 |
| 2016/0305144 A1* | 10/2016 | Maggeni | | E04H 4/1654 |
| 2017/0037648 A1 | 2/2017 | Hilel | | |
| 2017/0043966 A1* | 2/2017 | Witelson | | B65G 67/04 |
| 2017/0057759 A1 | 3/2017 | Maggeni | | |
| 2017/0057760 A1* | 3/2017 | Maggeni | | B65G 67/00 |
| 2017/0212523 A1 | 7/2017 | Witelson | | |

FOREIGN PATENT DOCUMENTS

| | | | |
|---|---|---|---|
| EP | 3282072 | | 2/2018 |
| EP | 2929109 | | 10/2018 |
| FR | 2890992 | | 3/2007 |
| WO | WO2014159955 | | 10/2014 |
| WO | WO2017-036532 | * | 3/2017 |

\* cited by examiner

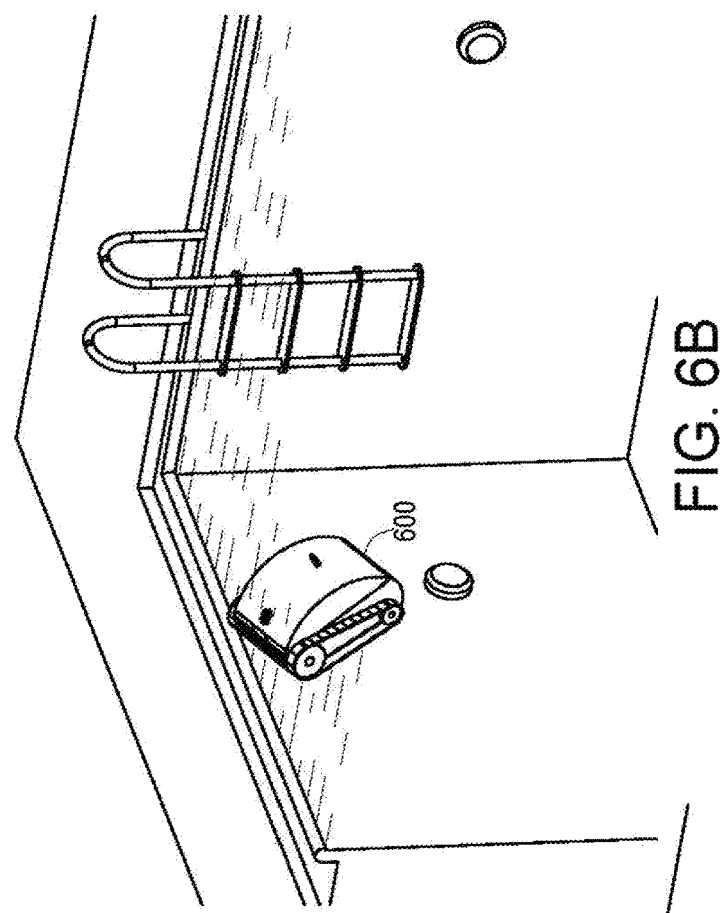
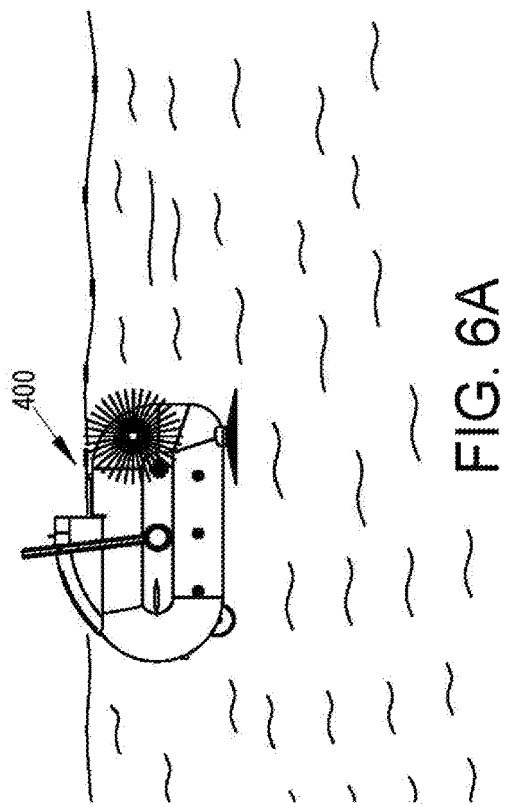
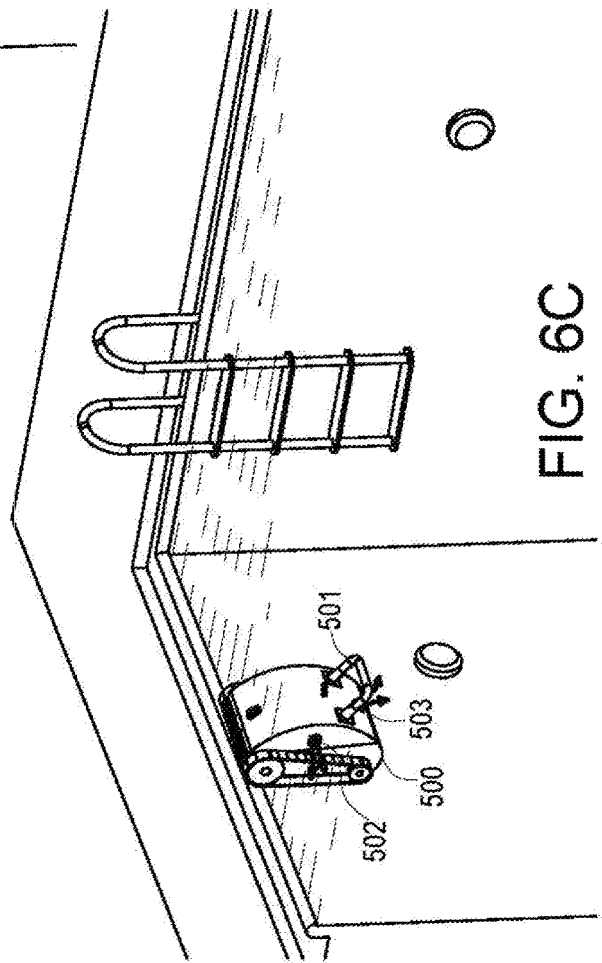

MASTER AND SLAVE POOL CLEANING ROBOTS

CROSS REFERENCE

This application claims priority from U.S. provisional patent Ser. No. 62/393,816 filing date Sep. 13, 2016 which is incorporated herein by reference.

BACKGROUND

Large pools such as Olympic pools and pools of 50 meters or more are usually cleaned with a single commercial type pool cleaner. These type pool cleaners may also be referred to as public pool cleaners that may be used in any shape type pool. The size of such a pool cleaner may approximate 1 meter by 50 by×50 cm.

Examples of such pool cleaners may be manufactured by the applicant, Maytronics Ltd. For example:—2×2, wave 300 or wave 200. Similar pool cleaners are available from other vendors.

A similar situation exists in the private pool sector whereby a single pool cleaner is employed in swimming pool sizes of more or less 6 meter by 3 meter or 10 meter by 5 meter and the like that may be used in any shape type pool. The size of such a pool cleaner may approximate 40 cm by 40 cm by 30 cm.

It is common for pool owners to construct multiple pool basins in a pool complex. One large basin may incorporate other basins or a private pool may integrate a smaller jet hydrotherapy basin or another low water level children pool.

For swimming pool operators, it is of utmost importance to have their swimming pool in a clean state when the pool is about to be used. For swimming pools that are businesses, an unclean pool may mean loss of swimmers who would rather stay away from an unclean pool and this may therefore mean loss of business to the pool operators or owners.

The cost and the advantages of purchasing and using pool cleaning equipment should be taken into account by said pool owners or operators.

A pool operator concern is related to downtime and after sale service. Namely, if a single commercial pool cleaner needs to be serviced or repaired, the said owner may remain without any pool cleaning equipment for an undefined period of time. This aggravates the pool owner's concerns and alternative pool cleaning systems are needed even if for a temporary period of time. The same applies in the private pool sector.

There is a growing need to reduce the human intervention and improve the efficiency of pool cleaners in swimming pools.

SUMMARY

Sets of pool cleaning robots, one or more pool cleaning robots of a set, methods for programming one or more pool cleaning robots and methods for cleaning a pool by a set as illustrated in the specification and/or the claims and/or the drawings.

BRIEF DESCRIPTION OF THE DRAWINGS

In order to understand the invention and to see how it may be carried out in practice, a preferred embodiment will now be described, by way of non-limiting example only, with reference to the accompanying drawings.

FIG. 6A is an example of a pool cleaning robot;
FIG. 6B is an example of a pool and a pool cleaning robot;
FIG. 6C is an example of a pool and a pool cleaning robot.

DETAILED DESCRIPTION OF THE DRAWINGS

Figure 1A:
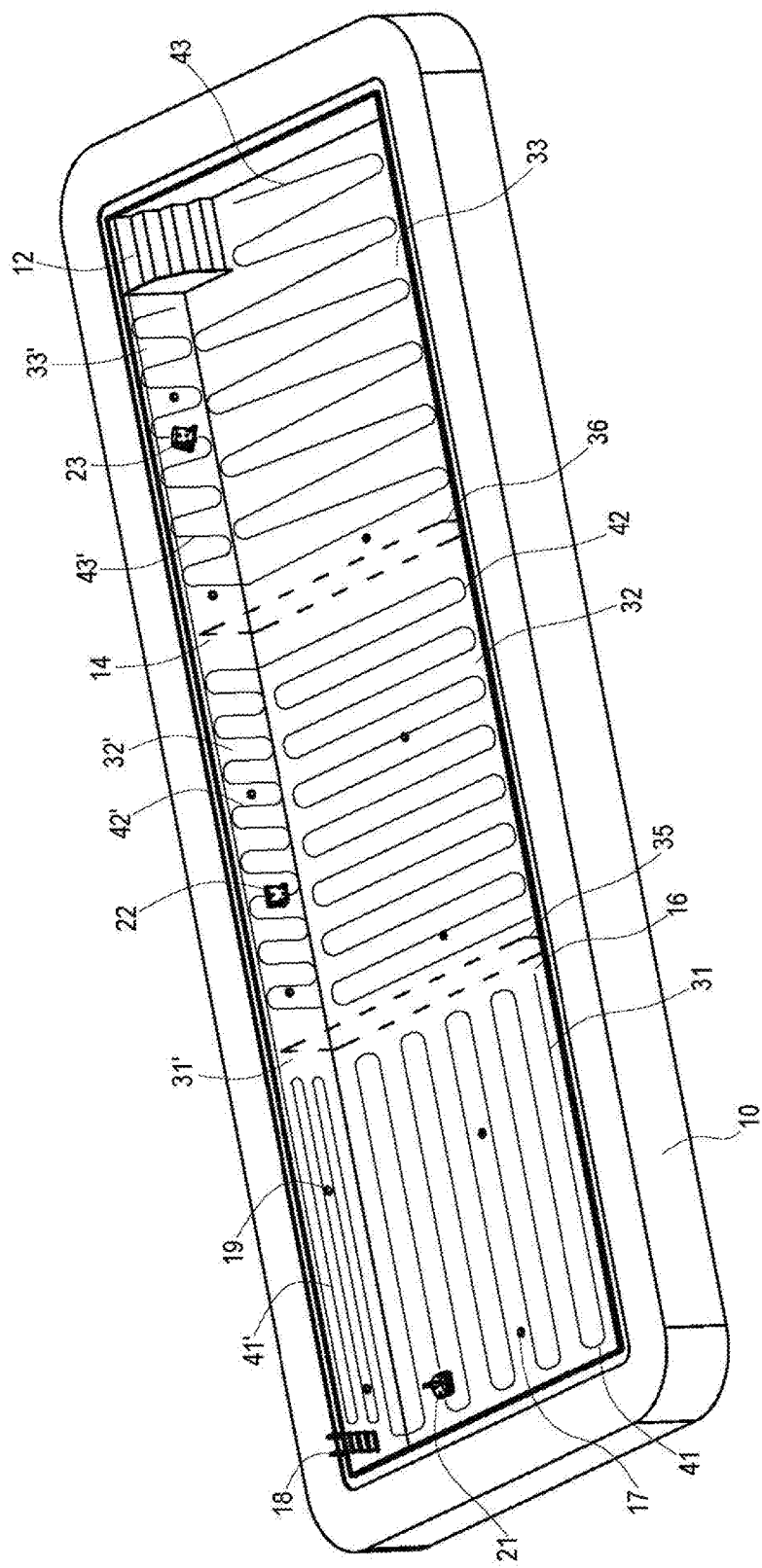
FIG. 1A is an example of a pool and a set of pool cleaning robots.

Any reference to a pool cleaner should be applied, mutatis mutandis to a method that is executed by a pool cleaner and/or to a non-transitory computer readable medium that stores instructions that once executed by the pool cleaner will cause the pool cleaner to execute the method.

Any reference to method should be applied, mutatis mutandis to a pool cleaner that is configured to execute the method and/or to a non-transitory computer readable medium that stores instructions that once executed by the pool cleaner will cause the pool cleaner to execute the method.

Any reference to a non-transitory computer readable medium should be applied, mutatis mutandis to a method that is executed by a pool cleaner and/or a pool cleaner that is configured to execute the instructions stored in the non-transitory computer readable medium.

The term "and/or" is additionally or alternatively.

The terms "avoidance maneuver" and "avoidance step" are used in an interchangeable manner.

Pool owner or operator may be provided with a system that may include at least two pool cleaners available or a set of pool cleaners so that if the one is used elsewhere or that it is temporarily non-useable, another pool cleaner may continue performing the tasks.

In private pools especially, if the operator chooses to have multiple pool cleaners in his pool (or pools) instead of one, also it would be advantageous to have a downsized or miniaturized pool cleaner with a size of, as an example only, 20 cm by 20 cm by 15 cm. Other sizes may be provided. Such a size pool cleaners set will be most suitable in the said smaller pools and especially so if at least one of the set is a battery-operated pool cleaner.

There may be provided a set of pool cleaning robots for cleaning a pool.

The set of pool cleaning robots may be configured to clean the same pool. The cleaning may be executed simultaneously (by pool cleaning robots of the set), in a partially overlapping manner or in a non-overlapping manner. The pool cleaning robots may participate in cleaning the pool.

One or more pool cleaning robots of the set may cooperate with each other—thereby cleaning the pool in a cooperative manner. This may include an exchange of information, commands, maps of the pool, allocation of cleaning tasks, physically interacting, and the like.

An allocation of a cleaning task may include an allocation of a region of the pool to clean and/or defining cleaning parameters. Any reference to an allocation of a cleaning task should be applied mutatis mutandis to an allocation of a region—and vice verse.

Using a set of pool cleaning robots may speed the cleaning period, may improve the cleanliness of the pool. A subset of the set (that subset may include one or more pool cleaning robots) may clean the pool when a remaining pool cleaning robot are unavailable. The subset may clean the pool in a slower manner and/or less efficient manner than the entire set—but this is not necessarily so.

The set may include pool cleaning robots that are equal, even identical, to each other and/or may include pool cleaning robots that differ from each other. The difference may include different hardware components and/or different software, code, firmware or malware configurations.

This application may refer to a first pool cleaning robot, a second pool cleaning robot, a third pool cleaning robot and a fourth pool cleaning robot. The phrases first, second, third and fourth are merely used to differentiate between the pool cleaning robots.

The set may include a first pool cleaning robot and a second pool cleaning robot that differ from each other. The difference may be, for example, a difference between at least one unit out of a propulsion unit and a cleaning unit.

When such a set is provided at least one of the following conditions is fulfilled:

a. At least one pool cleaning robot of the set may be configured to clean a sidewall of the pool.
b. At least one pool cleaning robot of the set may be configured to perform collision avoidance steps for preventing a collision between the first pool cleaning robot and the second pool cleaning robot.
c. At least one pool cleaning robot of the set may be configured to perform cable entanglement avoidance steps for preventing an entanglement of a cable connected to the first pool cleaning robot with a cable connected to the second pool cleaning robot.
d. Only one of the first pool cleaning robot and the second pool cleaning robot may include a jet propulsion unit.
e. The cleaning unit of the first pool cleaning robot may include a PVC brush wheel and does not include a Polyvinyl acetate (PVA) sponge brush wheel; and a cleaning unit of the second pool cleaning robot may include a PVA sponge brush wheel and does not include a PVC brush wheel.
f. Only one of the first pool cleaning robot and the second pool cleaning robot may include a sponge brush wheel.
g. Only one of the first pool cleaning robot and the second pool cleaning robot may include a brush wheel that may include a sponge brush wheel portion and a PVC brush wheel portion.
h. The first pool cleaning robot may be configured to remove coarser dirt than the second pool cleaning robot.
i. The first pool cleaning robot may be configured to hover between a bottom of a pool floor and a waterline.
j. The first pool cleaning robot may be configured to skim the water surface and then sink to the bottom floor.
k. The first pool cleaning robot and the second pool cleaning robot may be configured to clean different regions of the pool.
l. The first pool cleaning robot may include a detachable module, the first pool cleaning robot and the second pool cleaning robot may be configured to interchangeably receive the detachable module.
m. The first pool cleaning robot may include a detachable sensor, the first pool cleaning robot and the second pool cleaning robot may be configured to interchangeably receive the detachable sensor.
n. The first pool cleaning robot and the second pool cleaning robot may be configured to clean a same region of the pool at different manners.
o. The first pool cleaning robot and the second pool cleaning robot may be configured to clean different regions of the pool.
p. The first pool cleaning robot operates as a master pool cleaning robot during a certain period of time and the second pool cleaning robot operates as a slave pool cleaning robot during the certain period of time.
q. The first pool cleaning robot and the second pool cleaning robot cooperatively reallocate cleaning tasks according to failure to complete cleaning tasks.
r. The failure to completing tasks may be failure to traverse slippery pool surfaces.
s. Only the first pool cleaning robot may be configured to clean a slippery sloped bottom region of the pool.
t. The first pool cleaning robot may be configured to clean a slippery flat bottom region of the pool.

Each one of the first pool cleaning robot and the second pool cleaning robot may include a filtering unit for filtering fluid, a housing that may enclose various components such as the filtering unit, and a controller for controlling the operation of the pool cleaning robot.

At least one pool cleaning robot of the set may be configured to clean a sidewall of the pool. The pool cleaning robot may include cleaning unit components (such as dedicated brushes) and/or propulsion unit components (such as water jet propulsion units).

At least one pool cleaning robot of the set may be configured to perform collision avoidance steps for preventing a collision between the first pool cleaning robot and the second pool cleaning robot.

Various collision avoidance steps are listed in the text below.

A collision avoidance step may include maintaining different pool cleaning robots at different regions of the pool, keeping at least a predefined distance between different pool cleaning robots, sensing the location of other pool cleaning robots, notifying the other pool cleaning robots when there is a possibility of collision, and the like.

At least one pool cleaning robot of the set may be configured to perform cable entanglement avoidance steps for preventing an entanglement of a cable connected to the first pool cleaning robot with a cable connected to the second pool cleaning robot.

At least one pool cleaning robot may sense the locations of its cable and a cable of another pool cleaning robot and may alert the other pool cleaning robot that the cables will be entangled if the other pool cleaning robot will continue its movement, may move itself in a manner that will prevent the cable entanglements, may be fed by information from another device (within or outside the water of the pool) that the cables may become entangled and change its position, its course and the like.

When the pool cleaning robots are allocated with different regions of the pool to clean—the allocation may take into account cable entanglements. The allocation can be dictated to the set, may be amended by one or more pool cleaning robot of the set, and/or may be determined by the set.

One or more pool cleaning robots may determine the allocation, may amend a previously provided (or preprogrammed) allocation, and the like. Pool cleaning robots of the set may participate in the allocation process—for example may negotiate the desired allocation.

The allocation may be dictated to the set—preprogrammed, downloaded during a software update, communicated from another device, and the like. The allocation may be generated by a computerized system such as mobile device that is controlled by a user or may be operated without user intervention—or any other computerized system. The computerized system may be included in an external docking system, an external power supply and/or within a submerged docking system.

The allocation of regions may change over time and/or may be fixed.

The allocation of regions may be determined and/or updated and/or generated with regarded to (or regardless) to at least one of the following:

a. One or more capabilities of the pool cleaning robots of the set. These capabilities may include cleaning capabilities and/or maneuvering capabilities and/or exit from the pool capabilities. There may be some pool cleaning robots that cannot clean certain regions of the pool and will not be allocated to clean these regions. There may be pool cleaning robot that may be more effective in cleaning slippery surfaces (for example have better maneuverability and/or grip and/or cleaning elements that are capable of cleaning slippery surfaces) and/or pool cleaning robots that are faster than others. These pool cleaning robots will be prioritized to clean these slippery surfaces.

b. The status of the pool cleaning robots of the set—for example cleanliness of the filtering unit, energy resources status (battery fullness), any fault or error, progress (or lack of progress) of one or more cleaning tasks allocated to one or more pool cleaning robots, deviations of pool cleaning robot from allocated path, and the like. For example—a pool cleaning robot that has a dirtier filtering unit may be allocated to clean cleaner surfaces and/or smaller surfaces than a pool cleaning robot of similar configuration that has a cleaner filtering unit. Yet for another example—a pool cleaning robot that has an emptier battery may be allocated with cleaning smaller regions and/or regions that are easier to clean and/or require less climbing and/or slipping than another pool cleaning robot that has a fuller battery. Yet for a further example—the allocation may allow emptying a battery of one or more cleaning robots and/or the clogging of one of more filtering unit of a pool cleaning robots and the like. A faulty pool cleaning robot may be allocated smaller cleaning regions or any other regions that may be cleaned despite the fault. For example—a faulty jet propulsion unit that may prevent a pool cleaning robot from hovering may result in allocating to that pool cleaning robot regions that do not require hovering (such as stairs). A pool cleaning robot that significantly deviates from its designed cleaning path may be allocated to clean other regions of the pool and/or regions of the pool that are easier to clean.

c. Location (and even existence) of power cable cords of pool cleaning robots. The location may change over time and may be tracked and/or estimated to prevent cable entanglement.

d. Pool parameters such as materials of sidewalls, bottom of the pool, structure of the pool-flat bottom surfaces, sloped bottom surfaces, materials from which the pool is made, grip level associated with the different surfaces of the pool, slope of different surfaces of the pool, obstacles such as stairs, ladder, drain, lighting elements and the like. The maneuverability of the pool cleaning robot will be taken into account during the allocation. For example—cleaning stairs may require hovering in the water of the pool and thus cleaning stairs will be allocated to a pool cleaning robot with hovering capabilities. Yet for another example a pool cleaning robot with a sponge brush wheel may be allocated to clean sidewalls and/or sloped surfaces and/or slippery surfaces.

e. Status of the pool-turbidity, aggregation of algae, submerged dirt, and the like. A pool that is dirtier (or dirtier regions of the pool) may require, at least as an initial phase, using coarser cleaning—and allocating pool cleaning robots of coarser cleaning capabilities to perform the cleaning of the dirtier parts of the pool. Higher turbidity and/or a more slippery pool may require keeping a greater distance between pool cleaning robots—and or defining a larger distance between a border of a region allocated to a pool cleaning robot and an aggregation of algae, or other slippery elements of the pool.

f. Presence of people within the pool. The people may be confined to a certain part of the pool and the allocation may include preventing the pool cleaning robot from cleaning that certain part of the pool. The cleaning process may be stopped when one or more people enter the pool, or may continue cleaning even when people are within the pool. The entrance of people to the pool may be sensed by one or more pool cleaning robots of the set (for example using an image sensor and image processing) or by another system that may communicate the event to one or more pool cleaning robots. The set may exit the pool when a person enters the pool.

g. Timing parameters—allowed duration of cleaning process, time of day, season. For example—shorter allowable time frames may induce at least one pool cleaning robot to perform a faster cleaning operation—even if the faster cleaning operation is less effective. The traveling speed of at least one pool cleaning robot may be increased to comply with smaller time frames. The number of pool cleaning robot of the set that will participate in the cleaning of the pool may change based on the time window. Sometime windows may require using all the pool cleaning robot of the set. Longer time windows may allow using only some of the pool cleaning robots of the set.

h. Cleaning policy—for example limitations on the number of exits from the pool during a cleaning session, limitation on the duration of the overall cleaning process, a required cleanliness of pool at the end of the cleaning process, allowing or forbidding one of the pool cleaning robots of the set to be stuck in the pool at the end of the cleaning process, prioritizing the cleaning of some pool surfaces, and the like. The prioritized pool surfaces may be cleaned more times and/or in a more extensive manner than non-prioritized surfaces. The priority may be dictated by a third party, may be determined by one or more pool cleaning robot, and the like. The priority may be responsive to success or failure in previous cleaning attempts, to the current or past status of different regions of the pool, and the like.

A cable entanglement avoidance step may include changing the progress of one or more pool cleaning robot and/or allocating cleaning tasks to prevent such entanglement.

Different cables of different pool cleaning robots may be stretched from different external units (such as power supply units) located outside the pool. The locations of these units may be fed to one or more pool cleaning robot of the set and/or to another computerized system. The cable entanglement avoidance steps may take into accounts these locations.

For example—the cable entanglement avoidance steps may include allocating the cleaning zones to reduce the chances of cable entanglements.

The allocation of regions for reducing the chances of cable entanglement may include:
  a. Receiving or calculating an expected cleaning region of a certain pool cleaning robot.
  b. Based on the expected cleaning region, calculating the possible locations of the cable connected between an external unit and the certain pool cleaning robot.
  c. Trying to prevent the cable from crossing an expected cleaning region of another pool cleaning robot.

The allocation of regions for reducing the chances of cable entanglement may include:
  a. Receiving or calculating expected cleaning region of different pool cleaning robots.
  b. Receiving or calculating information about the cleaning paths of the different pool cleaning robots—especially mappings between locations and timings of the different pool cleaning robots during the cleaning process.
  c. Based on the expected cleaning regions and the mapping, calculating the possible locations (and timing associated with these locations) of different cables connected between one or more external units and the different pool cleaning robot.
  d. Checking, based on the locations and timings of the different cables, whether one or more cables will be entangled- and if so either changing the allocated regions and/or changing at least one cleaning path of at least one pool cleaning robot (changing the shape, size and/or timing) to prevent said crossing.

The checking and/or the changing (of step d above) may be executed in an iterative manner, in a non-iterative manner, by one or more pool cleaning robot, by a master pool cleaning robot, by a slave pool cleaning robot, in a distributed manner, in a non-distributed manner, by an external computerized system (external to the pool), and the like.

For example—one or more pool cleaning robots may receive the information from steps a, b, and c, and may perform the checking of step d.

Distributed manner indicates that a pool cleaning robot and at least one other pool cleaning robot (or another computerized entity) participates in the process.

If the one or more pool cleaning robot finds a possible collision it may update the cleaning paths to prevent the cable entanglement.

If the one or more pool cleaning robot finds a possible collision then they may inform at least one of the involved pool cleaning robots (pool cleaning robots that are involved in the potential cable entanglement) about the possible collision.

One or more of the involved pool cleaning robots may re-calculate their cleaning path and communicate the at least one updated cleaning path to the one or more pool cleaning robots.

The one or more pool cleaning robots may evaluate whether this amendment solved the potential cable entanglement.

The cable entanglement avoidance steps may include, in addition to or instead of the steps mentioned above, determining cable entanglement reduction measures that may include sensing a cable entanglement event, sensing a potential cable entanglement event, responding to the sensing.

The cable entanglement avoidance steps may include, in addition to or instead of the steps mentioned above, resolving a cable entanglement event after the cables were entangled. This may include introducing a movement between entangles pool cleaning robot (pool cleaning robots that have their cables entangled).

The sensing (of the cable entanglement event and/or of the potential cable entanglement event) may be performed using images sensors, proximity sensors that may sense that two or more cables are too proximate to each, that may sense that the pool cleaning robots are too close to each other, that pool cleaning robots are cross each other paths in a manner that will result in a cable entanglement. The sensors may be included in one or more pool cleaning robot, and/or outside the pool cleaning robots.

The sensing may involve monitoring the movement of the pool cleaning robots and sensing when their cable may be entangled. This may involve speed sensing and/or acceleration sensing and/or direction sensing, and the like.

The sensing may involve sensing forces applied on the pool cleaning robots and/or deviations from expected propagation of the pool cleaning robot due to cable entanglement. The sensing may include accelerometers, motion sensors, image sensors and the like.

The responding to the sensing may include stopping the progress of one or more pool cleaning robot until another pool cleaning robot will change its position and avoid the cable entanglement. The pool cleaning robot that stops may be requested or instructed to stop for a certain period and/or may determine the predefined period by itself.

The responding to the sensing may include changing the progress of one or more pool cleaning robot. For example, changing the speed and/or direction of movement.

The change of speed and/or movement may be dictated to the pool cleaning robot and/or may be determined by the pool cleaning robot.

The change of direction may include reversing the direction or changing the direction by ninety to two hundred and seventy degrees, propagating to a direction that will increase the distance between the pool cleaning robots, propagating in a direction that will increase the distance between the pool cleaning robots and the cleaning region allocated to the other pool cleaning robot.

Any step or measure mentioned in relation to the cable entanglement avoidance steps may be applied mutatis mutandis to pool cleaning robot collision avoidance.

Only one (or both) of the first pool cleaning robot and the second pool cleaning robot may include a jet propulsion unit. A jet propulsion unit may enable cleaning slippery flat surfaces, slippery wall climbing, slippery slopes cleaning, waterline cleaning, overcoming obstacles and sidewall sideways cleaning.

The term "jet" refers to a jet of fluid.

The cleaning unit and/or the propulsion unit of the pool cleaning robots of the set may be determined based on the characters of the pool. The shape, size and materials of the pool sidewalls and bottom may determine the profiling of which pool cleaning robots should populate the set that should clean the pool or a certain region.

Pools with a flat bottom are easier to clean than pools that have one or more sloped bottom surfaces—especially steep sloped bottom surfaces. Pools that include sloped bottom surfaces may or may not include a hopper (deepest part of the pool) that interfaces with one or more sloped bottom surfaces. There are pools that include hoppers of significant size of insignificant size. Controlled movement along sloped bottom surfaces—and especially steep sloped bottom surfaces may be challenging—especially when the sloped bottom surfaces are slippery.

It should be noted that the grip level of any surface of a pool may be determined by the material of that surface (ceramics, marble, painted and certain PVC or GRP may be more slippery than concrete painted or not), the slope of the surface and the cleanliness of that surface—especially whether algae or other or slippery dirt is aggregated on that surface.

Moving and/or cleaning sidewalls as well as moving and/or cleaning sloped bottom surfaces and slippery flat surfaces may be eased (and even facilitated) by having dedicated brush wheels such as a sponge brush wheel—especially a Polyvinyl acetate (PVA) sponge brush wheel (such as the synthetic chamois by Kanebo co. Ltd in Japan) and/or with a hybrid brush that includes a sponge brush portion and a non-sponge brush portion. For example—a hybrid brush that may include a PVC portion and a PVA sponge portion.

Sponge brush wheels are more expensive—and only a part of the pool cleaning robots of the set may have sponge brush wheels.

The set may include a pool cleaning robot that is configured to perform sidewall cleaning and another pool cleaning robot that is not configured to perform sidewall cleaning.

Different brushes have different costs and using a set that includes pool cleaning robot that have different brushes may reduce the cost of the set.

Different pool cleaning robots of the set may be configured to remove different types of dirt—one pool cleaning robot may be configured to remove coarser dirt than the second pool cleaning robot.

The set may include a pool cleaning robot that may be configured to hover between a bottom of a pool floor and a waterline performing as a hovering submarine pool cleaner—while another pool cleaning robot of the set may or may not have this capability.

The set may include pool cleaning robot that may be configured to skim the water surface and then sink to the bottom floor—while another pool cleaning robot of the set may or may not have this capability.

One of pool cleaning robots of the set may include a detachable module that may be interchangeably exchanged between the pool cleaning robots of the set.

The detachable module may be a battery, a filtering unit, a sensor, a controller, and the like.

Exchanging the detachable module may reduce cost (by sharing the detachable module between the pool cleaning robots), One detachable module (that may be detached to different pool cleaning robot at different points in time) may increase the redundancy of the set, enables to perform a flexible resource management, and the like.

The exchange may occur for different reasons—for example a malfunction in one of the pool cleaning robots, a shortage of power supply, a clogged filter, a task that requires the detachable module, and the like.

During such an exchange, a detachable module is removed from a first pool cleaning robot and received by a second pool cleaning robot. The exchange may require human intervention or may be executed without human intervention.

The detachable module may be detachably connected to the housing of the pool cleaning robot or to any other part of the pool cleaning robot by any mechanical and/or magnetic and/or electrostatic manner—such as by a locking and unlocking mechanism.

The set may include pool cleaning robots that may be allocated to clean different regions of the pool, the same region of the pool and the like. The different regions of the pool may not overlap or may partially overlap.

A partial overlap may be required, for example, to prevent gaps in the coverage of the set.

The different regions may be of the same type or different types. Regions of different types may include sidewall regions, flat bottom regions, sloped bottom regions, and the like.

Different regions may have the same size and/or the same shape and/or different sizes and/or different shapes.

One or more regions may be allocated to a pool cleaning robot. A region may include any part of the pool—one or more sidewalls of the pool, one or more parts of one or more sidewalls of the pool, one or more bottom surface of the pool, one or more parts of one or more bottom surface of the pool, one or more stairways of the pool, one or more parts of one or more stairways of the pool, one or more part of the waterline of the pool, one or more external surface of the pool, one or more parts of one or more external surface of the pool, one or more peripheral region of the pool that may be submerged and/or not submerged, and any combination thereof.

When a set of pool cleaning robots (the set include first and second pool cleaning robots) includes pool cleaning robots such as the first and the second pool cleaning robots—that are allocated to clean the same regions of the pool, at least one of the following conditions may be fulfilled:

a. The first pool cleaning robot and the second pool cleaning robot may be configured to clean a same region of the pool at different manners.

b. The first pool cleaning robot and the second pool cleaning robot may be configured to clean a same region of the pool at the same manners.

c. The first pool cleaning robot may be configured to perform a preliminary cleaning of the region and the second pool cleaning robot may be configured to perform a supplementary cleaning of the region.
  i. The preliminary cleaning may be faster than the supplementary cleaning.
  ii. The preliminary cleaning may be slower than the supplementary cleaning.
  iii. The preliminary cleaning may be coarser than the supplementary cleaning.
d. The second pool cleaning robot may be configured to follow the first pool cleaning robot.
e. The second pool cleaning robot may be configured to perform the supplementary cleaning of the region while staying within a cloud of debris elevated during the preliminary cleaning of the region.

At least one pool cleaning robot of the set may act as master pool cleaning robot—it may control at least one slave pool cleaning robot of the set. A single master pool cleaning robot may control one or more other pool cleaning robots. A single slave pool cleaning robot may be controlled by one or more master pool cleaning robots.

The roles of the pool cleaning robots may be fixed or may be changed over time.

When the roles change over time a slave pool cleaning robot may become a master pool cleaning robot. The change of roles may occur when the master pool cleaning robot malfunctions—or for any other reason.

A pool cleaning robot may be a master pool cleaning robot in relation to certain operations- and may be a slave pool cleaning robot in relation to other operations—either at the same time and/or at different times.

There may be provided multiple control layers so that a pool cleaning robot may be a slave of another pool cleaning robot and at the same time be a master of a further pool cleaning robot. For example, a third pool cleaning robot may control a second pool cleaning robot, and the second pool cleaning robot may control a first pool cleaning robot. Yet for another example—the second pool cleaning robot may be controlled by each one of the first and third pool cleaning robots.

Assuming that the set includes at least a master pool cleaning robot and a slave pool cleaning robot then at least one of the following conditions is fulfilled:
a. The master pool cleaning robot and the slave pool cleaning robot may be configured to clean different regions of the pool.
b. The master pool cleaning robot and the slave pool cleaning robot may be configured to a clean same region of the pool.
c. At least one of the slave pool cleaning robot and the master pool cleaning robot may be configured to apply collision avoidance maneuvers to prevent collisions between the slave and master pool cleaning robots.
d. The master pool cleaning robot may be configured to control at least one cleaning related operation of the slave pool cleaning robot.
e. The master pool cleaning robot may be configured to instruct the slave pool cleaning robot to perform cleaning operations within a predefined region of the pool, and wherein the slave pool cleaning robot may be configured to perform the cleaning operations only within the predefined region of the pool.
f. The master pool cleaning robot may be configured to apply collision avoidance maneuvers to prevent collisions between the master pool cleaning robot and the slave pool cleaning robot.
g. The master pool cleaning robot may be configured to instruct the slave pool cleaning robot to apply collision avoidance maneuvers to prevent collisions between the master pool cleaning robot and the slave pool cleaning robot.
h. The master pool cleaning robot has cleaning elements that equal to cleaning elements of the slave pool cleaning robot.
i. The master pool cleaning robot has cleaning elements that differ from cleaning elements of the slave pool cleaning robot.
j. The master pool cleaning robot has coarser cleaning elements than the slave pool cleaning robot.
k. The master pool cleaning robot has finer cleaning elements than the slave pool cleaning robot.
l. Only one of the master pool cleaning robot and the slave pool cleaning robot may be configured to climb on a sidewall of the pool and clean the sidewall of the pool and/or its waterline.
m. Only one of the master pool cleaning robot and the slave pool cleaning robot may be configured to travel slippery surfaces of a pool.
n. Both master pool cleaning robot and the slave pool cleaning robot may be configured to travel slippery surfaces of a pool.
o. Only one of the master pool cleaning robot and the slave pool cleaning robot may include a jet propulsion unit.
p. Both the master pool cleaning robot and the slave pool cleaning robot may include a jet propulsion unit.
q. The master pool cleaning robot may include a jet propulsion unit that differs from a jet propulsion unit of the slave pool cleaning robot.
r. At least one pool cleaning robot of the set may be configured to generate information about a status of a pool, and wherein the master pool cleaning robot may be configured to allocate a cleaning task to the slave pool cleaning robot based on the information about the status of the pool. The status of the pool may include cleanliness of the pool.
s. The allocating of the cleaning task may include determining a region of the pool to be cleaned by the slave pool cleaning robot.
t. The allocating of the cleaning task may include determining a manner of cleaning of a pool region of the pool to be cleaned by the slave pool cleaning robot.
u. The master pool cleaning robot may be configured to receive instructions from another device regarding an association between different pool cleaning robots of the sets and the different regions of the pool.
v. The master pool cleaning robot may be configured to receive instructions from another device regarding an association between different pool cleaning robots of the set and the different regions of the pool, and to amend the association based on the status of the pool.
w. The master pool cleaning robot may be configured to allocate a cleaning task to the slave pool cleaning robot based on a status of the slave pool cleaning robot and a status of the master pool cleaning robot.
x. The master pool cleaning robot may be configured to allocate a cleaning task to the slave pool cleaning robot based on a status of the slave pool cleaning robot.
y. The master pool cleaning robot may be configured to receive a definition of the different regions of the pool and to define overlap areas of the pool that may be cleaned, at different points in time, by more than a single pool cleaning robot.

z. The master pool cleaning robot may be configured to communicate information about the overlap areas to the slave pool cleaning robot.
aa. The master pool cleaning robot may be configured to track a position of the slave pool cleaning robot.
bb. Each pool cleaning robot of the set may be configured to track a position of at least one other pool cleaning robot of the set
cc. The master pool cleaning robot and the slave pool cleaning robot may be configured to replace roles.
dd. The master pool cleaning robot may be configured to receive information about a location of a cord that may be connected to the slave pool cleaning robot and to allocate a region to be cleaned by the slave pool cleaning robot based on the information about the location of the cord that may be connected to the slave pool cleaning robot and based on estimated or actual location of another cord that may be connected to the master pool cleaning robot.
ee. The master pool cleaning robot may be configured to sense a location of a cord that may be connected to the slave pool cleaning robot and to allocate a region to be cleaned by the slave pool cleaning robot based on the sensed location of the cord that may be connected to the slave pool cleaning robot and based on estimated or actual location of another cord that may be connected to the master pool cleaning robot.
ff. The master pool cleaning robot may include at least one sensor that may be not included in the slave pool cleaning robot.
gg. The master pool cleaning robot may include an image sensor that may be not included in the slave pool cleaning robot.

The master pool cleaning robot may include an image sensor that may be a detachable modular sensor to be reattached to a slave pool cleaning robot.

A cleaning process executed by a certain pool cleaning robot may be monitored by the certain pool cleaning robot. Additionally or alternatively, one or more pool cleaning robots of the set may be configured to monitor the cleaning process executed by the certain pool cleaning robot.

The monitoring of the cleaning process may include imaging a region (or a part of the region) that is cleaned by the pool cleaning robot, evaluating a turbidity or lighting quality (by an image sensor or any other sensor) of the fluid near the region (or a part of the region) that is cleaned by the pool cleaning robot, measuring the grip level of the region (or a part of the region) that is cleaned by the pool cleaning robot, measuring the outcome of the cleaning process (whether the entire region was cleaned, are there any cleaning gaps, what is the cleanliness level of different locations within the region, the duration of the cleaning process, energy consumed during the cleaning process, and the like.

An automatic co-operative allocation and reallocation of cleaning tasks within the set may be based on the outputs of the monitoring as compared to pre-set failure or success rates to complete tasks that may be measured by ongoing trial and error during a single cleaning cycle. These are based on preset normal conditions that are a function of the propulsion abilities and the cleaning abilities in ideal pool conditions.

For example—a pool cleaning robot that successfully cleaned a certain region may be re allocated to a larger region and/or a tougher region to clean in a cleaning cycle.

Yet for another example—a pool cleaning robot that cleaned its region at a faster rate than another pool cleaning robot may be allocated a larger region than the other pool cleaning robot.

Fast rate or slow rate may be a function of the success or failure to match nominal expected propagation movements by the pool cleaning robot.

For example, an odometer or acceleration device that measures a failure of the pool cleaning robot to move despite movement of the wheel(s) or track(s) may mean that this specific pool cleaning robot may need to be reallocated to another task. The same rules apply to tasks such as cleaning walls, waterlines, slopes and the like.

The determination may be responsive to the state of the region before and after the cleaning process, to the type of the region (sidewall, bottom surface—sloped of flat), to the energy consumption associated with the cleaning process (energy consumption may be reported by the pool cleaning robot—for example by monitoring the level of its battery), ability to overcome slippery surfaces on vertical walls, slopes or without idling on flat surfaces and the like.

A movement of a certain pool cleaning robot may be monitored by the certain pool cleaning robot. Additionally, or alternatively, one or more pool cleaning robots may be configured to monitor the movement of the certain pool cleaning robot. The movement may be a part of a cleaning process and/or may follow (or precede) the cleaning process.

One or more pool cleaning robots of the set may help one or more other pool cleaning robots of the set. The one or more pool cleaning robot of the set may request the help. Additionally or alternatively, another pool cleaning robot of the set may detect that the one or more pool cleaning robot needs help.

A first pool cleaning robot may help a second pool cleaning robot by performing, for example, at least one out of:
a. Pushing the second pool cleaning robot.
b. Pulling the second pool cleaning robot, otherwise affecting a movement of the second pool cleaning robot.
c. Providing a module (for example—filter, battery, sensor) to the second pool cleaning robot.
d. Taking a detachable module (for example—filter, battery, sensor) from the second pool cleaning robot.
e. Cleaning a region allocated to the second pool cleaning robot ("second region").
f. Shredding and/or collecting debris or dirt that may reside in the second region.
g. Shredding and/or collecting debris that may be positioned in a portion of the pool that leads to the second region.
h. Assisting the second pool cleaning robot to climb sloped and/or slippery surfaces of the pool.
i. Performing a cleaning process of the second region before the first pool cleaning robot starts cleaning the second region, after the first pool cleaning robots ends the cleaning of the second region or at any other time.
j. Sensing a state of the second region.
k. Sensing a state of the second pool cleaning robot.
l. Transmitting or receiving control information and/or sensed data to or from the second pool cleaning robot.

At least one of the pool cleaning robot of the set may have an ultrasonic wave generator for removing particles. A non-limiting example of such a pool cleaning robot is provided in U.S. Pat. No. RE45852 which is incorporated herein by reference.

At least one of the pool cleaning robots of the set may include at least one out of: (i) a ballast tank for controlling a buoyancy of the submarine pool cleaner, (ii) at least one cleaning element for cleaning pool debris from an underwater surface of a pool while the pool cleaning robot hovers over the underwater surface, (iii) a propulsion module (unit) that is configured to propel the submersible pool cleaner and a steering module that includes a rudder and diving planes. A non-limiting example of such a pool cleaning robot is illustrated in FIG. 6A (denoted 400) and in US patent application publication number 2016/0060887, which is incorporated herein by reference. Yet another pool cleaning robot of the set may differ from such a type of pool cleaning robot.

Figure 5:
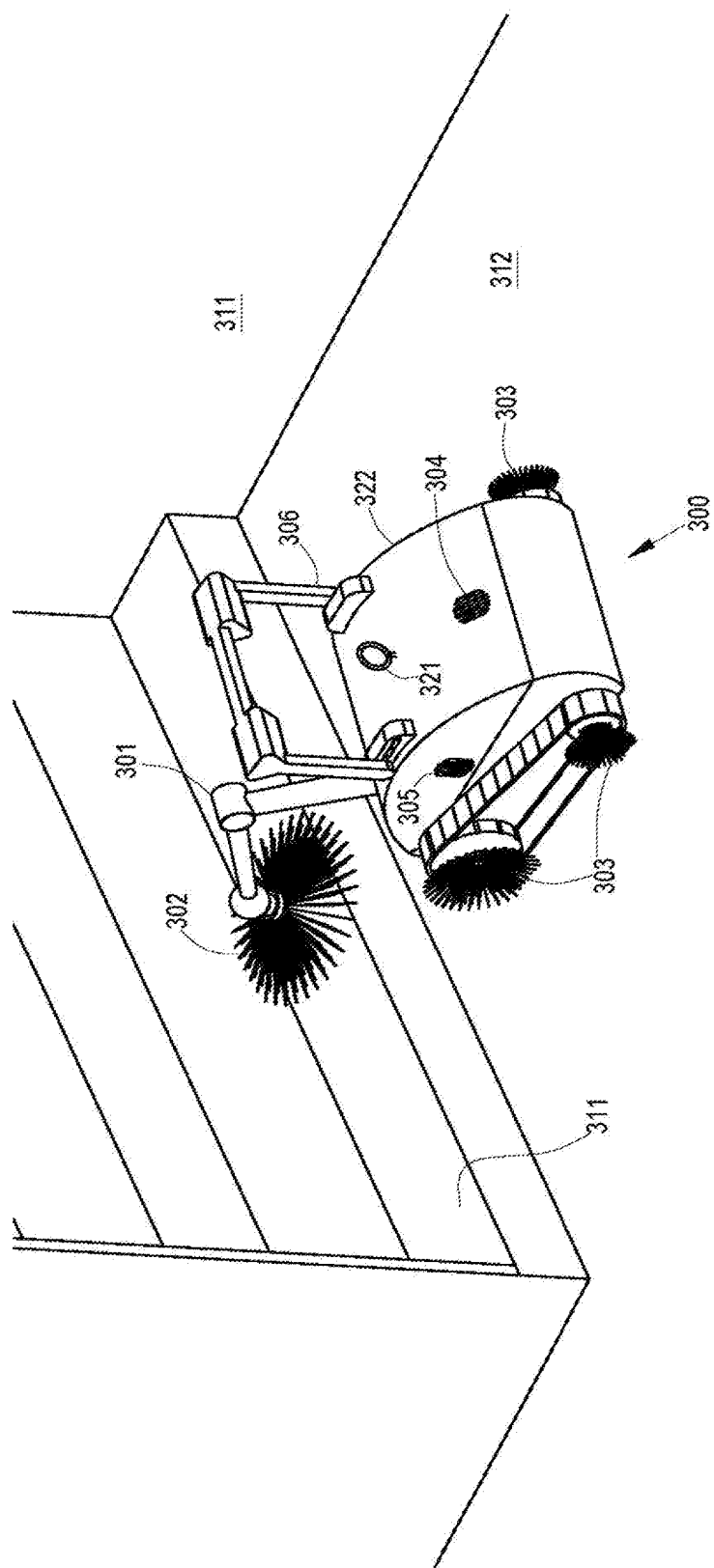
FIG. 5 is an example of a pool cleaning robot.

At least one of the pool cleaning robots of the set may include at least one out of (i) a side brush located at the side of the housing of the pool cleaning robot, (ii) an upper brush that is located (at least at certain points of time) above the housing, (iii) a bottom brush located beneath the housing, (iv) one or more arms that are coupled to one or more cleaning brushes, any arm may extend outside the housing, may include one or more joints, may be static or movable. Non-limiting examples of arms and brushes are illustrated in FIGS. 5 and 6A and in US patent application publication number 2016/0060887, which is incorporated herein by reference.

At least one of the pool cleaning robots of the set may include a propulsion unit that may include one or multiples jet generators. For example—the propulsion unit may include first jet generator that is configured to generate first fluid jets while the pool cleaning robot propagates towards the underwater surface; a second jet generator of the propulsion unit may be configured to generate second fluid jets while the pool cleaning robot hovers over an underwater surface. The first fluid jets may be may not be stronger than the second fluid jets. Non-limiting examples of jet propulsion units are illustrated in FIGS. 5 and 6A and in US patent application publication number 2016/0060887, which is incorporated herein by reference.

At least one of the pool cleaning robots of the set may include at least one out of a transmission coupled between a brushing element and a drive motor, the transmission is arranged to convert a rotary movement induced by the drive motor to a combination of (a) a rotary movement of the brushing element about a brushing element axis, and (b) a reciprocal movement of the brushing element in parallel to the brushing element axis. A non-limiting example of such a pool cleaning robot is illustrated in either one of U.S. Pat. Nos. 9,145,699, 9,410,338 and 9,222,275, all being incorporated herein by reference.

At least one of the pool cleaning robots of the set may include at least one out of (i) multiple movable elements that are coupled to the housing, each movable element is arranged to induce a movement of the housing when the movable element is in contact with a surface of the pool; and (ii) an imbalance induction unit that is arranged to introduce an imbalance between at least two movable elements, the imbalance results in a change in a direction of propagation of the cleaning robot; wherein the imbalance induction unit is arranged to induce the imbalance as a result of at least one out of (a) a movement of a nozzle that is arranged to output fluid from the cleaning robot, and (b) a movement of a diaphragm that is coupled to the housing.

At least one of the pool cleaning robots of the set may include at least one out of a housing that includes a right opening, a left opening and a center opening; wherein the right opening is preceded by a right fluid conduit that is arranged to direct fluid to the right of the housing, the left opening is preceded by a left fluid conduit that is arranged to direct the fluid towards the left of the housing; and the central opening is preceded by a central conduit; a nozzle manipulator that is coupled to the nozzle and arranged to rotate the nozzle about an nozzle axis such as to alter an orientation of the nozzle in relation to an imaginary longitudinal axis of the housing; a fluid interfacing unit arranged to direct fluid from the nozzle (a) towards the central fluid conduit when the nozzle is at a first orientation, (b) towards the right fluid conduit when the nozzle is at a second orientation, and (c) towards the left fluid conduit when the nozzle is at a third orientation; wherein the first orientation differs from the second and third orientations.

At least one of the pool cleaning robots of the set may include at least one out of a pump motor, a drive motor and an impeller that are substantially closer to a front edge of the housing than to a rear edge of the housing. A non-limiting example of such a pool cleaning robot is illustrated in either one of U.S. Pat. Nos. 9,145,699, 9,410,338 and 9,222,275, all being incorporated herein by reference.

At least one of the pool cleaning robots of the set may include at least one out of an optical sensor that includes at least one light source that illuminates an area of a surface of the pool being cleaned by the cleaning robot through optical lens at a non-vertical angle, a detector able to generate, based upon light from the area of the surface of the pool, detection signals indicative of a motion of the cleaning robot; and a processor arranged to receive the detection signals and to determine a motion characteristic or a location characteristic of the cleaning robot. A non-limiting example of such a pool cleaning robot is illustrated in either one of U.S. Pat. Nos. 9,145,699, 9,410,338 and 9,222,275, all being incorporated herein by reference.

At least one of the pool cleaning robots of the set may include at least one out of a first compass arranged to generate first directional information; a second compass arranged to generate second directional information; wherein the first and second compasses are spaced apart from each other; and a processor; arranged to receive directional information from the first and second compasses and to determine at least one of a location parameter and a directional parameter of the cleaning robot based upon at least the first and second directional information.

At least one of the pool cleaning robots of the set may include a filtering unit includes a first filter that has a first filtering level and a second filter that has a second filtering level that differs from the first filtering level. A non-limiting example of such a pool cleaning robot is illustrated in either one of U.S. Pat. Nos. 9,145,699, 9,410,338 and 9,222,275, all being incorporated herein by reference.

At least one of the pool cleaning robots of the set may include at least one out of a housing having a front portion, a rear portion, a door and a hinge; wherein the door is pivotally connected to the rear portion of the housing via the hinge; wherein the rear portion includes a rear opening; wherein the door is arranged to move between a closed position in which the door substantially closes the rear opening and an open position in which the door does not close the rear opening; wherein the door includes a floating element or is coupled to a floating element, wherein the floating element is positioned and shaped to induce the door to move to the closed position when the cleaning robot is submerged in fluid and to remain in an open position when out of water in a horizontal position. A non-limiting example of such a pool cleaning robot is illustrated in either one of U.S. Pat. Nos. 9,145,699, 9,410,338 and 9,222,275, all being incorporated herein by reference.

At least one of the pool cleaning robots of the set may include at least one out of a housing that include a front portion and a rear portion, and further includes a door and a hinge. Wherein the door is pivotally connected to the rear portion via the hinge; wherein the rear portion includes a rear opening; wherein the door is arranged to move between a closed position in which the door substantially closes the rear opening and an open position in which the door does not close the rear opening; wherein the door includes a floating element or is coupled to a floating element, wherein the floating element is positioned and shaped to induce the door to move to the closed position when the cleaning robot is submerged in fluid. A non-limiting example of such a pool cleaning robot is illustrated in either one of U.S. Pat. Nos. 9,145,699, 9,410,338 and 9,222,275, all being incorporated herein by reference.

At least one of the pool cleaning robots of the set may include one or more brush wheels (auxiliary brush wheels) that may be positioned at the center of the bottom of the pool cleaning robot or be positioned such that the one or more brush wheels does not extend beyond the sides of the bottom of the pool cleaning robot. Thus—a top view of the pool cleaning robot would not reveal the bottom brush wheel. A non-limiting example of such a pool cleaning robot is illustrated in either one of U.S. Pat. Nos. 8,424,142, 9,021, 645 and 9,021,645, all being incorporated herein by reference.

At least one of the pool cleaning robots of the set may include at least one out of (i) interfacing modules (such as wheels and/or tracks) arranged to interface between the pool cleaning robot and the environment, and (ii) an interface manipulator that is arranged to change a spatial relationship between (a) the housing and (b) a selected interfacing module of the group, during an exit process during which the pool cleaning robot exits the pool. A non-limiting example of such a pool cleaning robot is illustrated in US patents application publication number 2015/0101135 that is being incorporated herein by reference.

At least one of the pool cleaning robots of the set may include an interface for coupling an extraction element to the pool cleaning robot, during a pool exit process; and wherein during at least a part of the pool exit process an upper end of the interface may be higher than the housing. A non-limiting example of such a pool cleaning robot is illustrated in US patents application publication number 2017/0057760 that is being incorporated herein by reference.

At least one pool cleaning robot of the set may include at least one out of (i) a propulsion unit such as a drive system that is configured to move the pool cleaning robot, during a pool exit process, at a path that leads outside the pool, (ii) a pump motor that is configured to rotate an impeller during at least a part of the pool exit process for forcing water to exit the pool cleaning robot. A non-limiting example of such a pool cleaning robot is illustrated in US patents application publication number 2017/0057759 that is being incorporated herein by reference.

At least one pool cleaning robot of the set may include at least one out of (i) a sensor for sensing a cleanliness of a filtering unit while submerged in water, (ii) a controller that is configured to determine, based on the cleanliness of the filtering unit, a cleaning process to be applied on the pool cleaning robot by an external system; and (iii) a communication unit that is configured to transmit information about the cleaning process. A non-limiting example of such a pool cleaning robot is illustrated in US patents application publication number 2017/0037648 that is being incorporated herein by reference.

At least one pool cleaning robot of the set may include at least one out of (i) a filtering unit for filtering water that passes through the pool cleaning robot; (ii) a sensor for sensing a cleanliness of the filtering unit (a) before the pool cleaning robot reaches an external system that is configured to apply a cleaning process on the pool cleaning robot and (b) at one or more points in time during the cleaning process; and (iii) a communication unit that is configured to transmit information about the cleanliness of the filtering unit. A non-limiting example of such a pool cleaning robot is illustrated in US patents application publication number 2017/0037648 that is being incorporated herein by reference.

At least one pool cleaning robot of the set may include a cleaning brush (brush wheel) that may include a central portion that has a longitudinal axis; a right-handed fin that surrounds a first section of the central portion; a left-handed fin that surrounds a second section of the central portion; first protuberances that are oriented in relation to the right-handed fin; and second protuberances that are oriented in relation to the left-handed fin. A non-limiting example of such a cleaning brush is illustrated in US patents application publication number 2014/0366297 that is being incorporated herein by reference.

At least one pool cleaning robot of the set may include a cleaning brush (brush wheel) that may include a central portion that has a longitudinal axis; first fins that have a positive slope in relation to the longitudinal axis and surround a first section of the central portion; second fins that have a negative slope in relation to the longitudinal axis and surround a second section of the central portion; first protuberances that are oriented in relation to the first fins; and second protuberances that are oriented in relation to the second fins. A non-limiting example of such a cleaning brush is illustrated in US patent application publication number 2014/0366297 that is being incorporated herein by reference.

At least one pool cleaning robot of the set may include a filter manipulator that is at least partially located within the housing and is arranged to (a) receive a filter and (b) introduce a movement between the filter and the housing thereby positioning the filter within a filtering position in which the filter is at least partially disposed within a fluid path formed between a first fluid opening and a second fluid opening of the housing thereby allowing the filter to apply a filtering operation on fluid that passes through the fluid path. The filter manipulator may be arranged to receive the filter and at least one additional filter and to position the filter at the filtering position. The filter manipulator may include (i) a filter storage module that includes multiple compartments for receiving multiple filters including the filter, and (ii) a movement mechanism that is arranged to introduce the movement between the filter and the housing by moving the storage module. The movement may include extracting the filter from the housing, receiving the filter to the housing, positioning the filter at a filtering position or at another position within the housing, and the like. A non-limiting example of such a pool cleaning robot is illustrated in US patents application publication number 2015/0292222 that is being incorporated herein by reference.

At least one pool cleaning robot of the set may be controlled in an interactive or non-interactive manner by another device (such as but not limited to a mobile computer).

At least one pool cleaning robot of the set may include at least one of a receiver and a controller. The receiver may be a part of a communication module. The receiver may be configured to receive demarcation information that defines pool zones and pool cleaning robot operational parameters related to the pool zones. The demarcation information may be generated by a mobile computer and under a control of a user. The controller may be configured to control a cleaning operation of the pool cleaning robot, based on the demarcation information. The cleaning operation may include passing the non-filtered fluid through a filtering unit to provide the filtered fluid while moving the pool cleaning robot by the propagation system. A non-limiting example of such a pool cleaning robot is illustrated in US patents application publication number 2017/0212523 that is being incorporated herein by reference.

At least one pool cleaning robot of the set may include at least one of a receiver and a controller. The receiver may be a part of a communication module. The communication module is configured to receive end of cycle location information that defines an end of cycle location; wherein the end of cycle location information is generated by a mobile computer and under a control of a user. The controller is configured to control multiple cleaning cycles of the pool cleaner; wherein a performing of the multiple cleaning cycles comprises positioning the pool cleaner, at an end of each cleaning cycle of the multiple cleaning cycles, at the end of cycle location; wherein each cleaning cycle comprises passing the non-filtered fluid through the filtering unit to provide the filtered fluid while moving the pool cleaner by the propagation system. A non-limiting example of such a pool cleaning robot is illustrated in U.S. patent application Ser. No. 15/463,161 that is being incorporated herein by reference.

Figure 7:
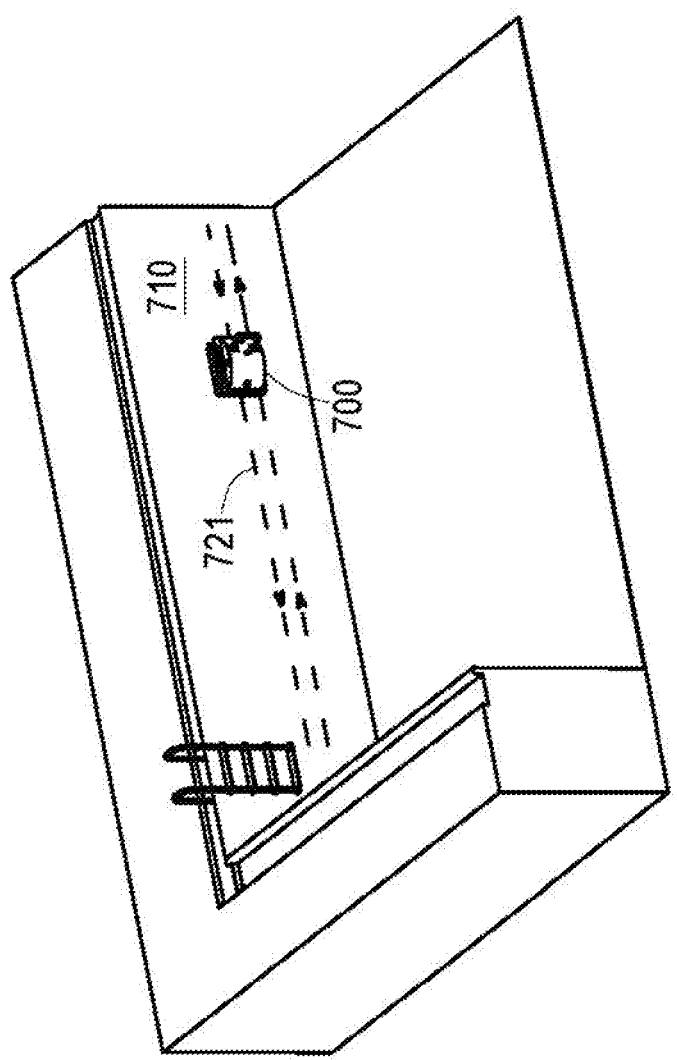
FIG. 7 is an example of a pool and a pool cleaning robot.
Figure 8:
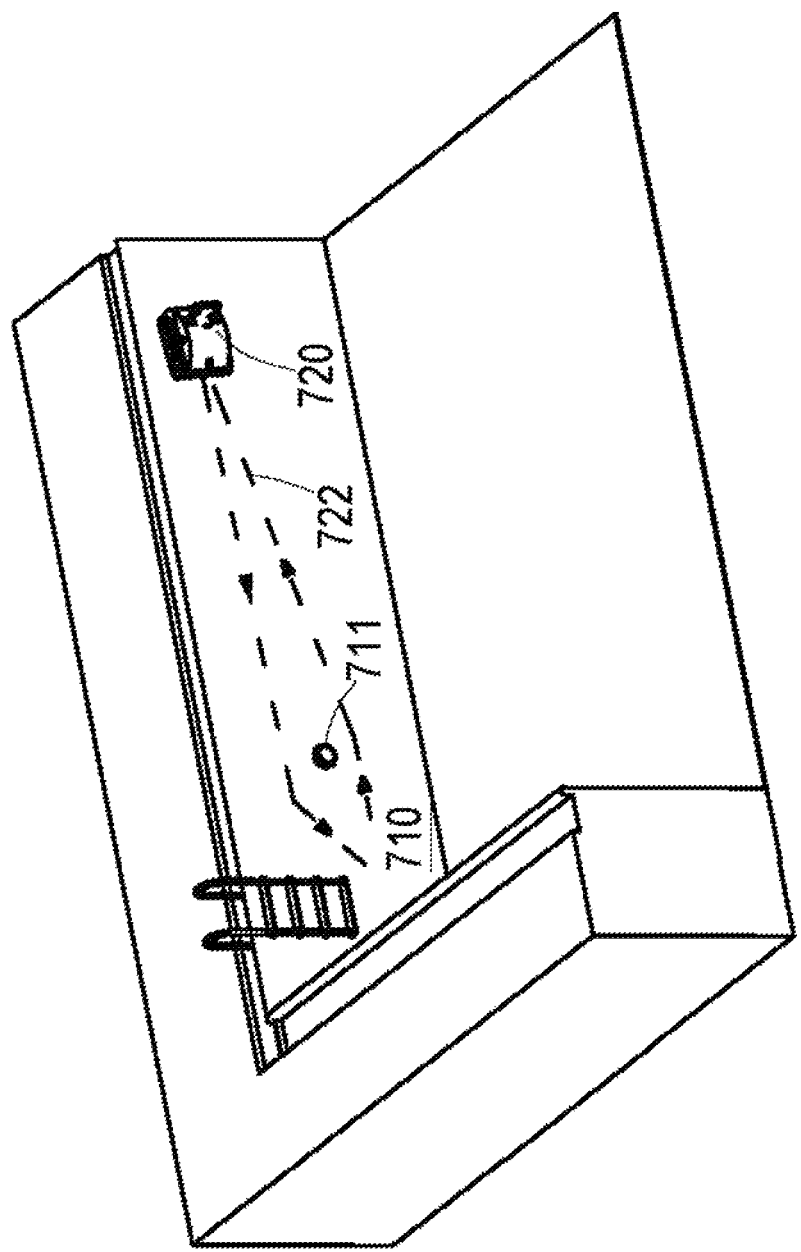
FIG. 8 is an example of a pool and a pool cleaning robot.

At least one pool cleaning robot of the set may include at least one out of (i) one or more sensors for sensing an actual yaw of the pool cleaner and an actual orientation of the pool cleaner (ii) a propulsion unit that may be configured to move the pool cleaner along a cleaning path, during a cleaning process of a certain region of a sidewall of the pool; wherein the cleaning path comprises a cleaning path segment that has a cleaning path segment yaw that is a non-vertical yaw; wherein the certain region is fully submerged; and (iii) a controller that is configured to control the at least one steering element, based on the actual yaw of the pool cleaner. The cleaning path segment may or may not be horizontal. A non-limiting example of such a pool cleaning robot is illustrated in FIGS. 7 and 8 of the current application and/or in U.S. patent application Ser. Nos. 15/586,288 and 15/600,794 that are being incorporated herein by reference.

At least one pool cleaning robot of the set may include at least one out of (i) a controller that is configured to determine a cleaning path of a region of a sidewall of the pool to include less than a predetermined number of turns; wherein the predetermined number of turns is associated with a cleaning path that mostly includes vertical yaw cleaning path segments; (ii) at least one sensor for sensing an actual yaw of the pool cleaner and an actual orientation of the pool cleaner; (iii) at least one steering element that is configured to move the pool cleaner along the cleaning path, during a cleaning process of the certain region; and wherein the controller if further configured to control the at least one steering element, based on the actual yaw of the pool cleaner. A non-limiting example of such a pool cleaning robot is illustrated in U.S. patent application Ser. Nos. 15/586,288 and 15/600,794 that are being incorporated herein by reference.

At least one pool cleaning robot of the set may include at least one out of (i) at least one sensor for sensing an actual yaw of the pool cleaner and an actual orientation of the pool cleaner; (ii) at least one steering element that is configured to move the pool cleaner along a cleaning path, during a cleaning process of a certain region of a sidewall of the pool and while maintaining contact with the pool sidewall; wherein the cleaning path comprises a cleaning path segment that has a cleaning path segment yaw that is a non-vertical yaw; and (iii) a controller that is configured to control the at least one steering element, based on the actual yaw of the pool cleaner. A non-limiting example of such a pool cleaning robot is illustrated in U.S. patent application Ser. Nos. 15/586,288 and 15/600,794 that are being incorporated herein by reference.

At least one pool cleaning robot of the set may include at least one out of (i) an intake aperture; (ii) a first fluid conduit; (iii) a first grille that comprises two or more movable first panes, (iv) a filtering element that is configured to filter fluid from the intake aperture to provide filtered fluid. The first fluid conduit is configured to direct the filtered fluid towards the first grille. The first grille is configured to output the filtered fluid at a first direction that is responsive to a position of the two or more movable panes. See, for example, FIGS. 4A and 4B.

As indicated above different pool cleaning robots of a set may be configured to clean different regions of the pool. For example—it is assumed that a first pool cleaning robot and a second pool cleaning robot are configured to clean different regions of the pool. Under these assumptions at least one of the following conditions may be fulfilled:

a. The first pool cleaning robot has cleaning elements that equal to cleaning elements of the second pool cleaning robot.
b. The first pool cleaning robot has cleaning elements that differ from each cleaning element of the second pool cleaning robot.
c. The first pool cleaning robot has coarser cleaning elements than the second pool cleaning robot.
d. The first pool cleaning robot has finer cleaning elements than the second pool cleaning robot.
e. Only one of the first pool cleaning robot and the second pool cleaning robot may be configured to climb on a sidewall of the pool and clean the sidewall of the pool.
f. Only one of the first pool cleaning robot and the second pool cleaning robot may be configured to climb on stairs of the pool.
g. Both the first pool cleaning robot and the second pool cleaning robot may be configured to travel slippery surfaces of a pool.
h. Only one of the first pool cleaning robot and the second pool cleaning robot may include a directional jet propulsion unit.
i. Both the first pool cleaning robot and the second pool cleaning robot may include a directional jet propulsion unit. The directional jet propulsion unit may include jet propulsion directionally adjustable outlet panes.
j. The first pool cleaning robot may include a jet propulsion unit that differs from a jet propulsion unit of the second pool cleaning robot.
k. Only the first pool cleaning robot may be configured to climb on a sidewall of the pool and clean the sidewall of the pool, whereon only the second pool cleaning robot may be configured to clean one or more slippery surfaces of the pool and a third pool cleaning robot may be configured to clean only a bottom of the pool.

l. The first pool cleaning robot may be configured to clean a surface of the first grip level and may be not configured to clean a surface of the second grip level; and wherein the second pool cleaning robot may be configured to clean a surface of the second grip level.

m. The first pool cleaning robot and the second pool cleaning robot have different types of brush wheels.

n. The first pool cleaning robot and the second pool cleaning robot may be of different propulsion units.

o. The first pool cleaning robot and the second pool cleaning robot may be of different jet propulsion units.

p. The first pool cleaning robot and the second pool cleaning robot may be of different interface elements for interfacing with the pool.

q. The first pool cleaning robot and the second pool cleaning robot may be configured to communicate with each other.

r. The first pool cleaning robot and the second pool cleaning robot may be configured to perform a distributed allocation of cleaning tasks between the first and second pool cleaning robots.

s. The first pool cleaning robot and the second pool cleaning robot may be configured to repetitively allocate, in a distributed manner, cleaning tasks between the first and second pool cleaning robots. The repetitively allocate may be responsive to at least one out of a state of at least one pool cleaning robot of the set, a fullness of a battery of at least one pool cleaning robot of the set, a state of the filtering elements, any slipping and drifting of the pool cleaning robot planned cleaning trajectories and/or to the state of the pool.

t. Only one of the first pool cleaning robot and the second pool cleaning robot may be configured to perform waterline cleaning.

u. The first pool cleaning robot and the second pool cleaning robot may be configured to perform waterline cleaning.

v. The first pool cleaning robot and the second pool cleaning robot may be configured to independently recognize pool underwater features.

w. The first pool cleaning robot and the second pool cleaning robot may be configured to independently generate a map of the pool.

x. The first pool cleaning robot may be configured to merge maps of the pool generated by the first pool cleaning robot and the second pool cleaning robot.

y. Only one of the first pool cleaning robot and the second pool cleaning robot may be configured to independently recognize pool underwater features.

z. The first pool cleaning robot and the second pool cleaning robot may be configured to determine a spatial relationship between the first and second pool cleaning robots.

aa. Only one of the first pool cleaning robot and the second pool cleaning robot may be configured to determine a spatial relationship between the first and second pool cleaning robots.

bb. The first pool cleaning robot may be configured to change a communication parameter related to communication attempts with the second pool cleaning robot when the first pool cleaning robot reaches a demarcation between regions allocated to the first and second pool cleaning robots.

cc. The first pool cleaning robot may be configured to determine a communication parameter related to communication attempts with the second pool cleaning robot based on a distance between the first pool cleaning robot and the second pool cleaning robot.

dd. The first pool cleaning robot may be configured to determine a communication parameter related to communication attempts with the second pool cleaning robot based on a distance between the first pool cleaning robot and a border of a region of the pool that may be allocated to the second pool cleaning robot.

ee. The first pool cleaning robot may include at least one sensor for sensing locations of cables connected to the first and second pool cleaning robots.

ff. The at least one sensor for sensing locations of connected pool cleaner cables may include a repetitive pre-configuring of the propagation of the cables so that they do not entangle and twist with one another.

gg. At least one of the first pool cleaning robot and the second pool cleaning robot may be configured to exit from the pool without human intervention.

hh. The first pool cleaning robot may be configured to assist in an exit process of the second pool cleaning robot from the pool.

ii. The first pool cleaning robot may be configured to push the second pool cleaning robot during a cleaning operation of the second pool cleaning robot.

jj. The first pool cleaning robot may be configured to pull the second pool cleaning robot during a cleaning operation of the second pool cleaning robot.

kk. The first pool cleaning robot may be configured to climb on the second pool cleaning robot.

ll. The first pool cleaning robot may be configured to detachably connect to the second pool cleaning robot.

mm. The first pool cleaning robot may be configured to recharge the second pool cleaning robot.

nn. The first pool cleaning robot may be configured to direct at least one jet of fluid towards the second pool cleaning robot.

oo. The first pool cleaning robot may be configured to direct at least one jet of fluid towards dirt accumulated in wall and floor corners.

pp. The configured to direct at least one jet of fluid towards wall and floor corners may include automatically rotating directional fluid jets outlet panes.

qq. The first pool cleaning robot may be configured to travel while in a horizontal position on vertical pool sidewalls while maintaining its yaw.

rr. The first pool cleaning robot may be configured to maintaining its yaw while countering constant gravitational downward forces.

ss. The first pool cleaning robot may be a cordless pool cleaning robot.

FIG. 1A illustrates a pool 10 that has a flat bottom and three regions that are allocated to a set of pool cleaning robots that includes three different pool cleaning robots.

The set may fulfill any of the conditions listed in the specification and/or drawings of the current patent application.

First pool cleaning robot 21 is configured to clean a region of the pool that includes a first bottom portion 31 and a first sidewall portion 31'. First pool cleaning robot 21 follows a cleaning path 41 for cleaning first bottom portion 31 and follows a cleaning path 41' for cleaning first sidewall portion 31'.

Second pool cleaning robot 22 is configured to clean a region of the pool that includes a second bottom portion 32 and a second sidewall portion 32'. Second pool cleaning robot 22 follows a cleaning path 42 for cleaning second bottom portion 32 and follows a cleaning path 42' for cleaning second sidewall portion 32'.

Third pool cleaning robot 23 is configured to clean a region of the pool that includes a third bottom portion 33 and a third sidewall portion 33'. Third pool cleaning robot 23 follows a cleaning path 43 for cleaning third bottom portion 33 and follows a cleaning path 43' for cleaning third sidewall portion 33'.

While FIG. 1A illustrates raster scan cleaning paths, any of the pool cleaning robots may follow any other cleaning paths—including random cleaning paths, pseudo-random cleaning paths, and the like. The cleaning paths may change over time and/or may be dependent on the status of the pool and/or on the structure of the pool (including obstacles) and/or of the pool cleaning robot. The cleaning path of one pool cleaning robot may be the same as (or may differ from) the cleaning path of another pool cleaning robot.

It is expected that one of more of the pool cleaning robots is scheduled to clean the other three sidewalls of the pool and maybe the stairs 12.

FIG. 1A also illustrate borders 35 and 36 between the first, second and third segments.

It should be noted that any other regions may be defined. One or more of the regions may include only a sidewall area, only a bottom area or a combination thereof.

The pool cleaning robots may move and/or perform cleaning operations based on the locations of obstacles such as drains 17 and/or light elements and/or return water jets 19.

FIG. 1A does not show any cords that are connected to any of the pool cleaning robots. Any pool cleaning robot may be connected to a cord (which is not shown for simplicity of explanation), or may be a cordless pool cleaning robot.

Figure 1B:
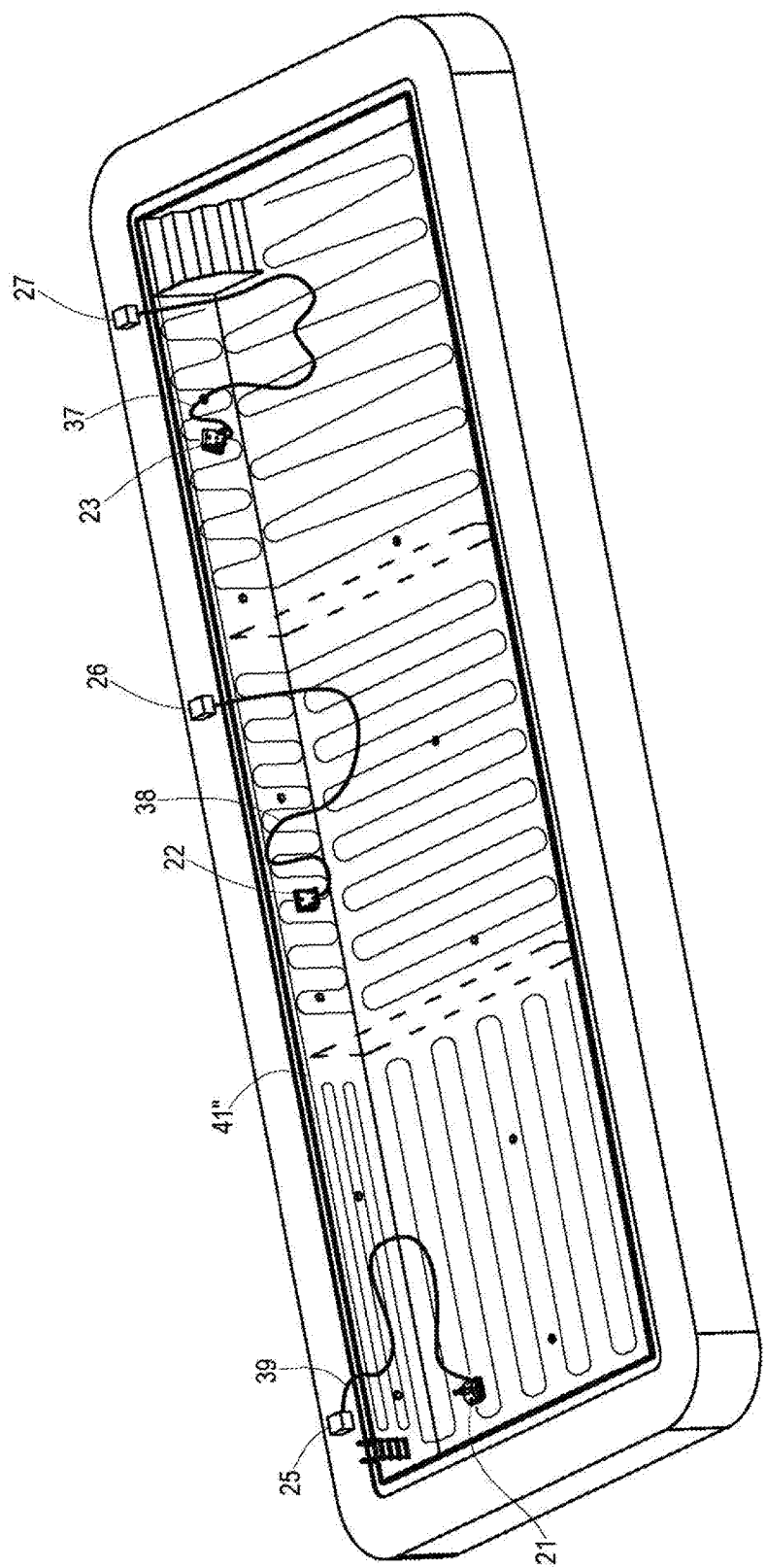
FIG. 1B is an example of a pool and a set of pool cleaning robots.

FIG. 1B illustrates the first pool cleaning robot 21 as connected via first cord 39 to first power supply unit 25, the second pool cleaning robot 22 as connected via second cord 38 to second power supply unit 26, and the third pool cleaning robot 23 as connected via third cord 37 to third power supply unit 27. The different power supply units may be connected at any position in proximity to the pool. The cable lengths are illustrative and various cable lengths may be used.

In FIG. 1B the power supply units are positioned along the same side of the pool. In FIG. 1B the first pool cleaning robot is also configured to perform a waterline cleaning process by following waterline cleaning path 41".

Figure 1C:
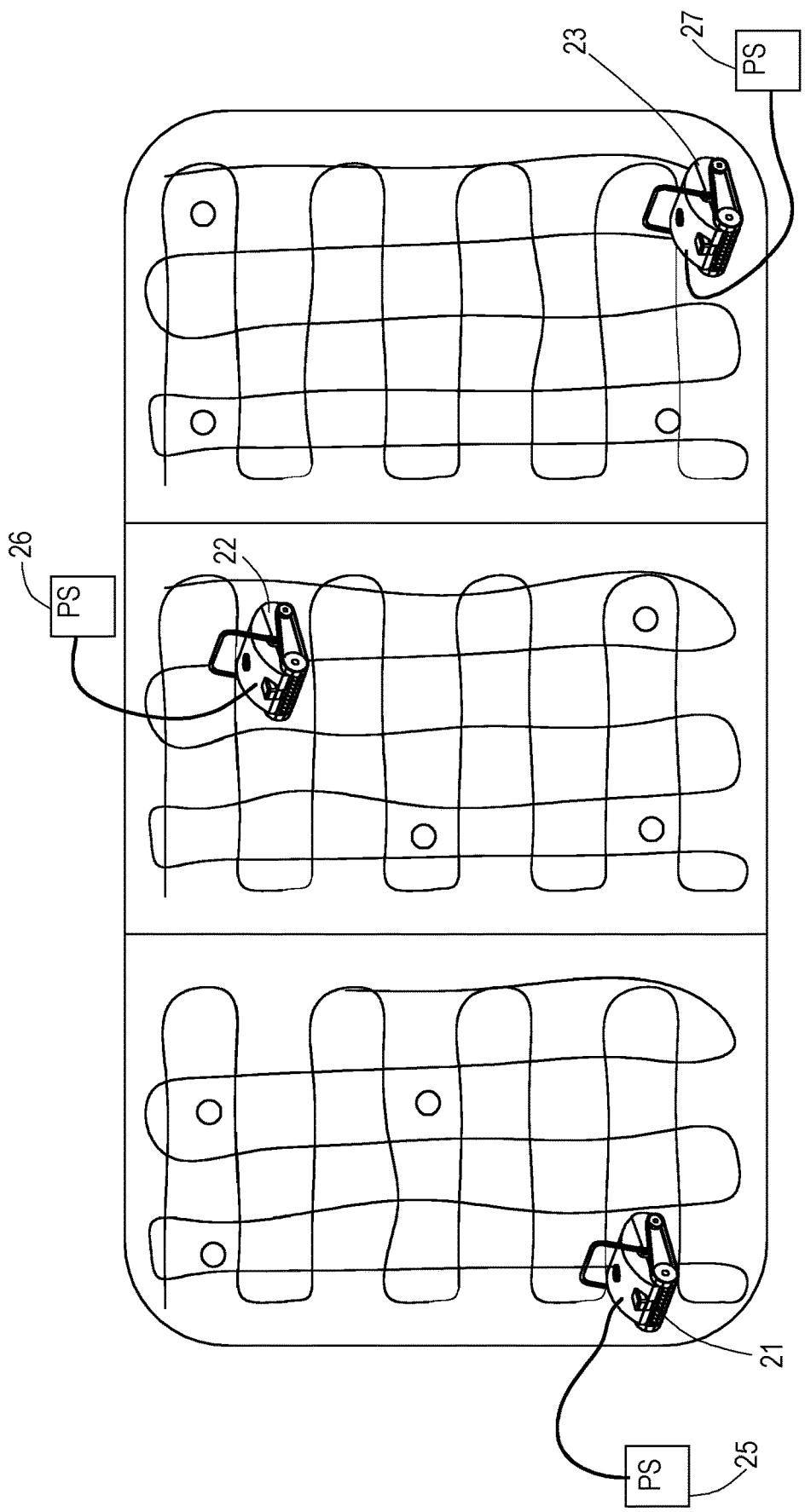
FIG. 1C is an example of a pool and a set of pool cleaning robots.

FIG. 1C illustrates the first pool cleaning robot 21 as connected via a first cord to a first power supply unit 25, the second pool cleaning robot 22 as connected via a second cord to second power supply unit 26, and the third pool cleaning robot 23 as connected via third cord 37 to third power supply unit 27. The different power supply units may be connected at any position in proximity to the pool. In FIG. 1C the power supply units are positioned along three different sides of the pool.

Figure 1D:
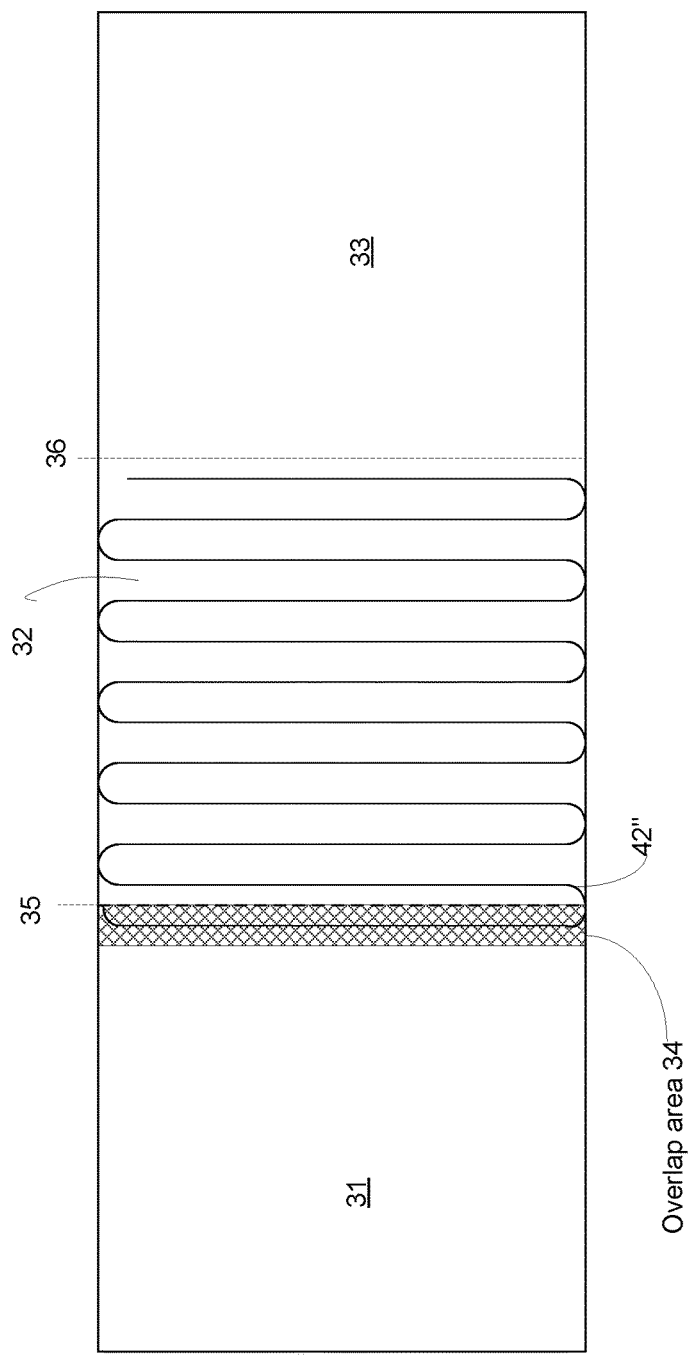
FIG. 1D is an example of pool regions and one or more cleaning paths.

There may be defined an overlap area. FIG. 1D illustrates that the second pool cleaning robot cleans an overlap area 34 that expands into first bottom portion 31 by following cleaning path 42". The overlap area may have any shape and/or size. If first pool cleaning robot 21 is allocated to clean the first bottom portion 31 and first sidewall portion 31' it may be regarded as an "invaded" pool cleaning robot—and it is notified about the cleaning of the overlap area- to prevent collisions.

Although the said "invaded" pool cleaning robot may seem to be traversing into another pool cleaner bottom or wall portions, the entry into the overlap area 34 is important and may be governed by a special division of task cleaning program to ensure that the overlap areas are cleaned by either pool cleaners without collisions, entangled cables, or the leaving behind of an uncleaned dirty strip. Path 42" depicts an entry along the travelling path that runs along the width section of the pool. Also see 16 in FIG. 1A where the traversing may occur in a longitudinal path in relation to the pool lengths (not shown).

The cleaning regions that are allocated to the different pool cleaning robot may change over time.

Figure 1E:
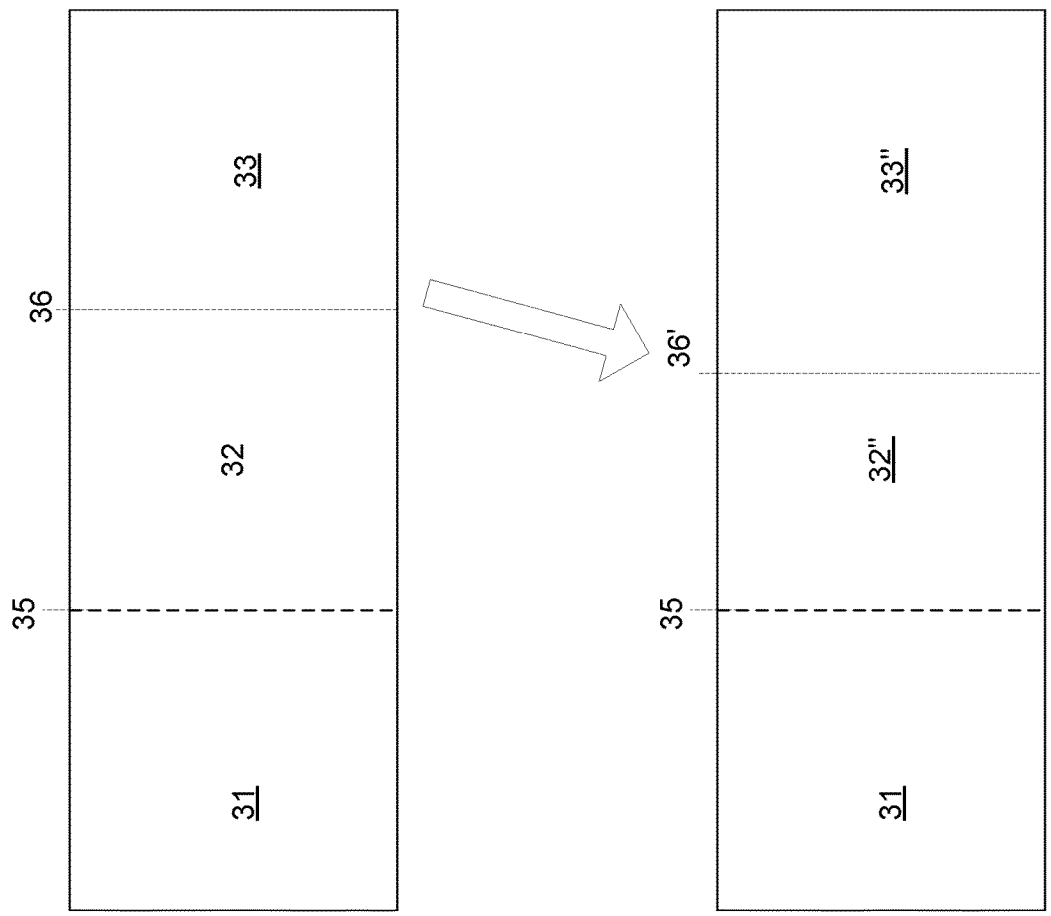
FIG. 1E is an example of pool regions.

FIG. 1E illustrates a substantially shape preserving change in which all bottom portions remain rectangular— but the third bottom portion increases to provide an updated third bottom portion 33" while the second bottom portion decreases to provide an updated second bottom portion 32". Border 36 is shifted to the left.

Figure 1F:
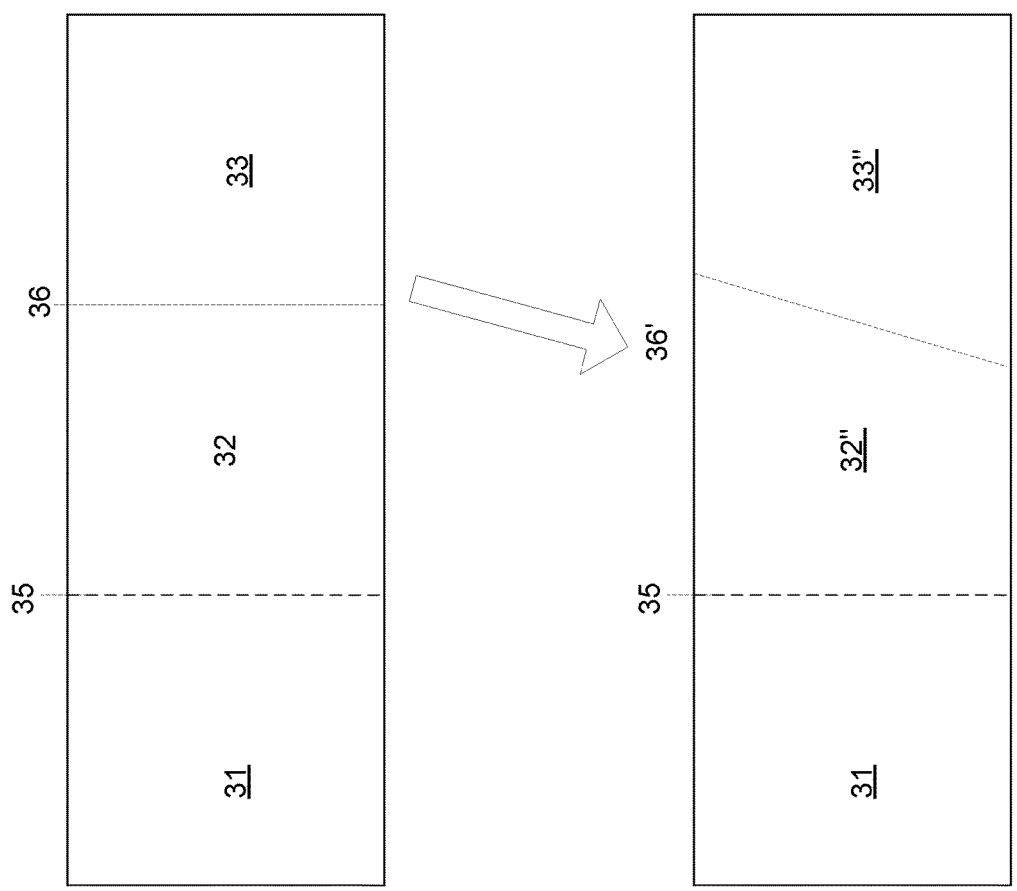
FIG. 1F is an example of pool regions.

FIG. 1F illustrates a substantially shape non-preserving change in which second and third bottom portions changes their shape from rectangular to trapezoid. The the third bottom portion increases to provide an updated third bottom portion 33" while the second bottom portion decreases to provide an updated second bottom portion 32". Border 36 is rotated clockwise.

The said shape non-preserving changes may be particularly pertinent to circular shaped pools, kidney shapes, free-style pond type contoured pools and the like.

Figure 1G:
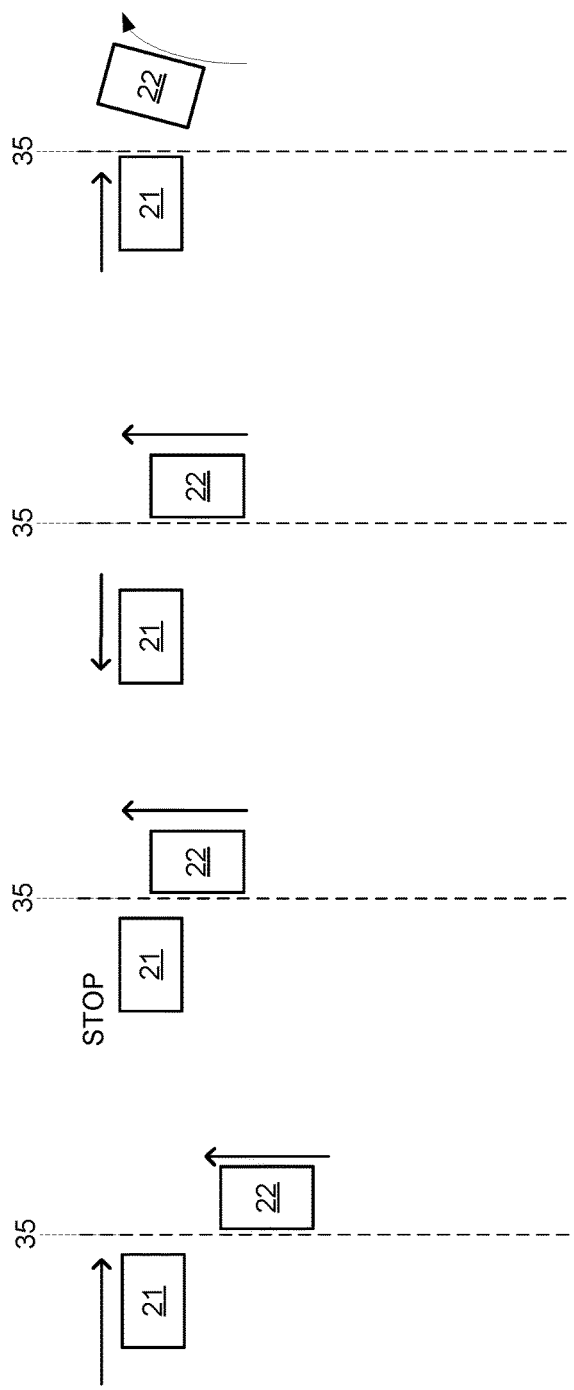
FIG. 1G is an example of collision avoidance maneuvers.

FIG. 1G illustrates different collision avoidance maneuvers.

The leftmost part of FIG. 1G illustrates the first pool cleaning robot 21 as propagating to the right towards border 35 and the second pool cleaning robot 22 as propagating upward along border 35. Unless one of the pool cleaning robots changes his route or slows down—the pool cleaning robots may collide.

The potential collision may be detected by one or more of the pool cleaning robots using any sensor—for example an image sensor, a proximity sensor and the like. The potential collision may be sensed by another pool cleaning robot and/or another sensor that is not located on (or within) a pool cleaning robot.

One or more of the pool cleaning robots may be informed, over a communication link, about the potential collision.

The first and/or second pool cleaning robots may inform the other pool cleaning robot of the pair that the distance between them is (or is about to be) too small and/or that they are in a collision path.

The first and/or second pool cleaning robot may wait for a response from the other pool cleaning robot of the pair— and if such a response does not arrive—may send another alert, increase the power and/or the repetition rate and/or the carrier frequency and/or the modulation of the communication until receiving a response from the other pool cleaning robot or determining that a communication failure occurred.

In case of a communication failure the pool cleaning robot that attempted to communicate the may perform a collision avoidance maneuver without counting on the other pool cleaning robot to perform such a collision avoidance maneuver.

It should be noted that both pool cleaning robots may perform a collision avoidance maneuver.

It should be noted that a pool cleaning robot may perform a collision avoidance maneuvers even without communicating with the other pool cleaning robot of the pair.

FIG. 1G illustrates some non-limiting examples of collision avoidance maneuvers—including (from left to right) stopping the progress of the first pool cleaning robot 21, changing the direction of progress of the first pool cleaning robot (for example moving away from the border 35), and changing the direction of progress of the second pool cleaning robot (for example moving away from the border 35). Movement away from border 35 may include a linear or non-linear movement at any direction that increases the distance between the pool cleaning robot and the border.

It should be noted that one or more pool cleaning robot may pass the border—and clean an overlap area. This may involve notifying the "invaded" pool cleaning robot about the overlap area cleaning process.

Figure 2A:
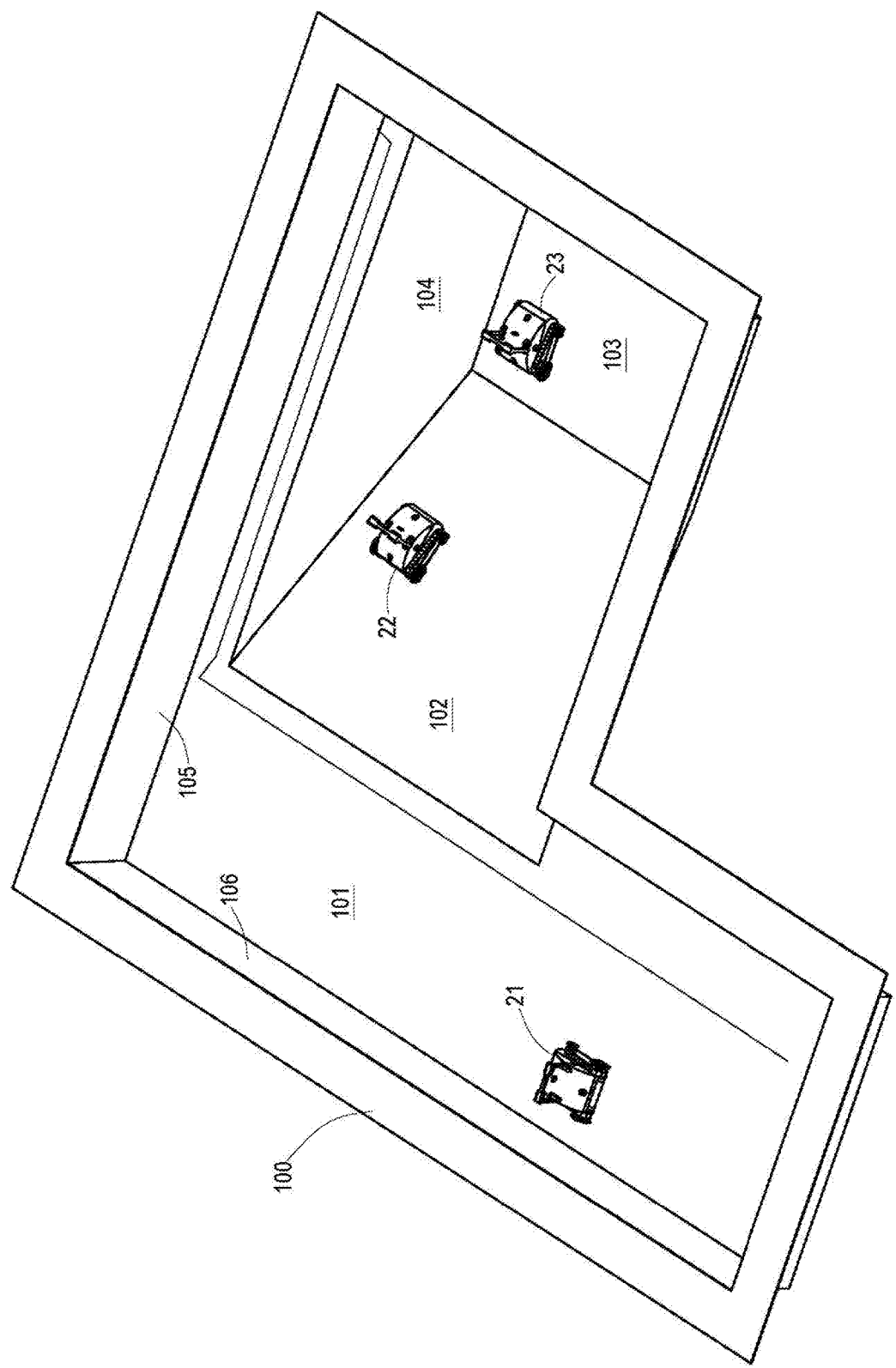
FIG. 2A is an example of a pool and a set of pool cleaning robots.

FIG. 2A illustrates first, second and third pool cleaning robots 21, 22 and 23 as well as a pool 100 that has a flat bottom portion 101 followed by a sloped bottom portion 102, a hopper 103 and sidewalls 104, 105 and 106 (as well as few unnumbered sidewalls).

Moving along sloped bottom portion 102 and/or cleaning the sloped bottom portion 102 may be challenging—especially when the grip level of the sloped bottom portion is low. Nevertheless, moving along a flat surface 101 may be equally challenging if the flat area is slippery. Second and third pool cleaning robots 22 and 23 may propagate along the sloped bottom portion 102. First pool cleaning robot 21 may or may not propagate and/or or clean the sloped bottom portion 102.

An area may be regarded as slippery if its grip level or the co-efficient of friction of the pool cleaning robot is less than 1 or that the movement of the pool cleaning robot is measured to be, say, half than a certain ideal nominal speed of, say for example, 14 meters per minute A flat area may be regarded as an area that has a slope between zero and ten degrees—and the like.

In FIG. 2A, first pool cleaning robot 21 moves along (and/or cleans) flat bottom portion 101, second pool cleaning robot 22 moves along (and/or cleans) sloped bottom portion 102, and third pool cleaning robot 23 moves along (and/or cleans) hopper 103.

The sidewall of the pools may be cleaned by one or more pool cleaning robots of the set.

FIG. 2A does not show any cords that are connected to any of the pool cleaning robots. Any pool cleaning robot may be connected to a cord (which is not shown for simplicity of explanation), or may be a cordless pool cleaning robot.

Figure 9:
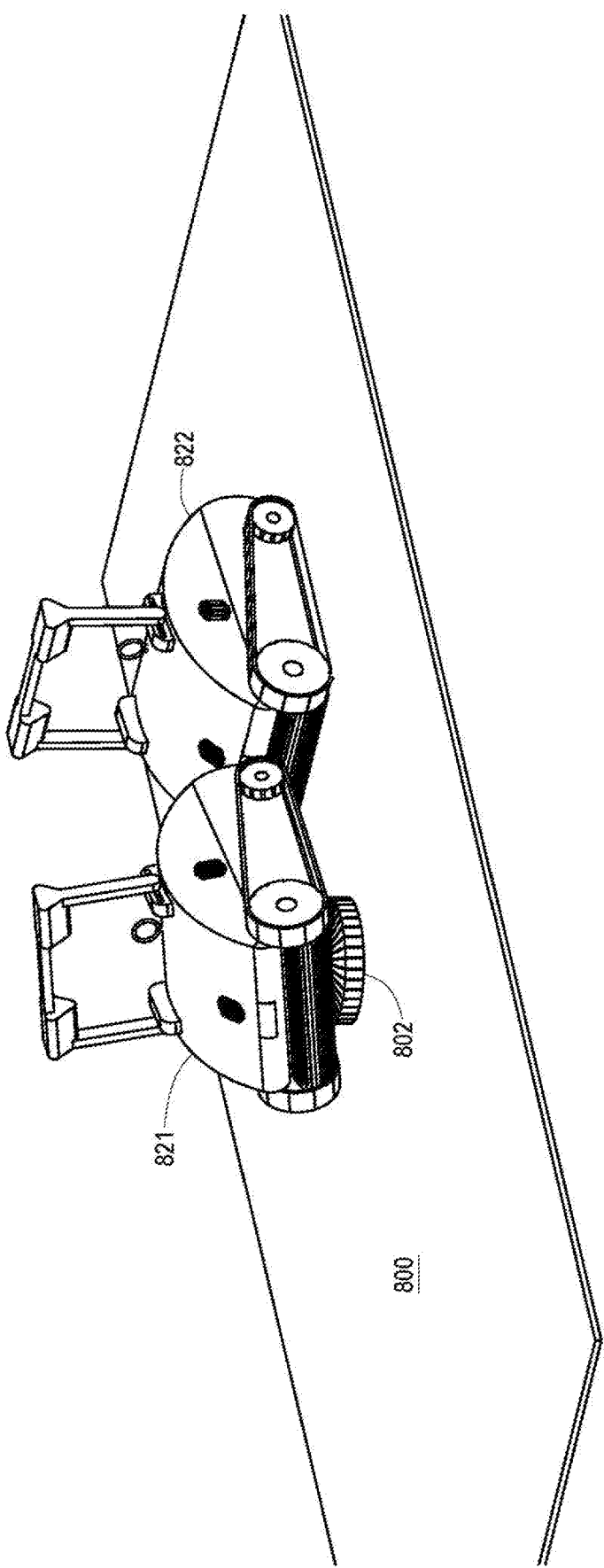
FIG. 9 is an example of pool cleaning robots.
Figure 16:
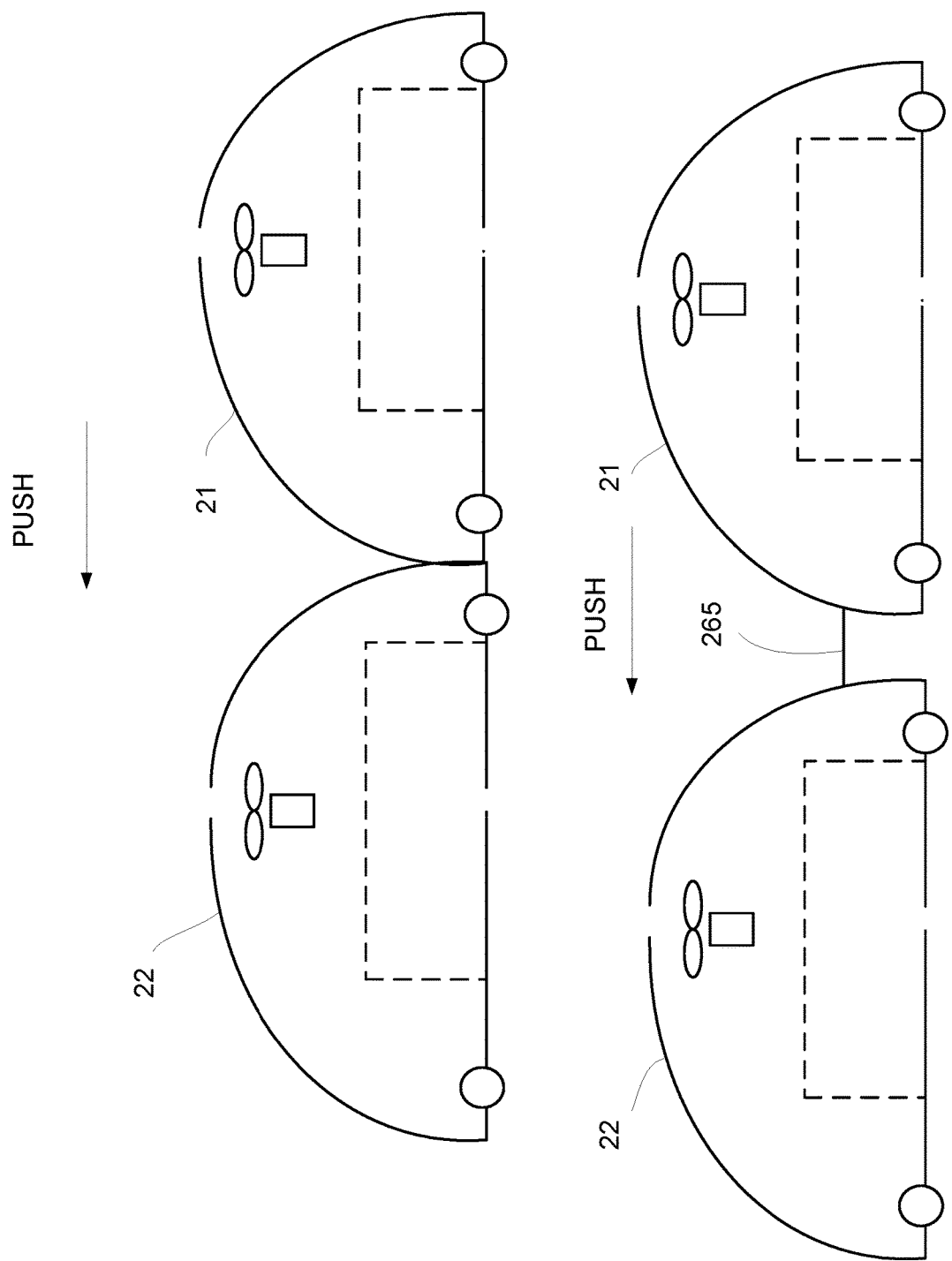
FIG. 16 is an example of pool cleaning robots.
Figure 17:
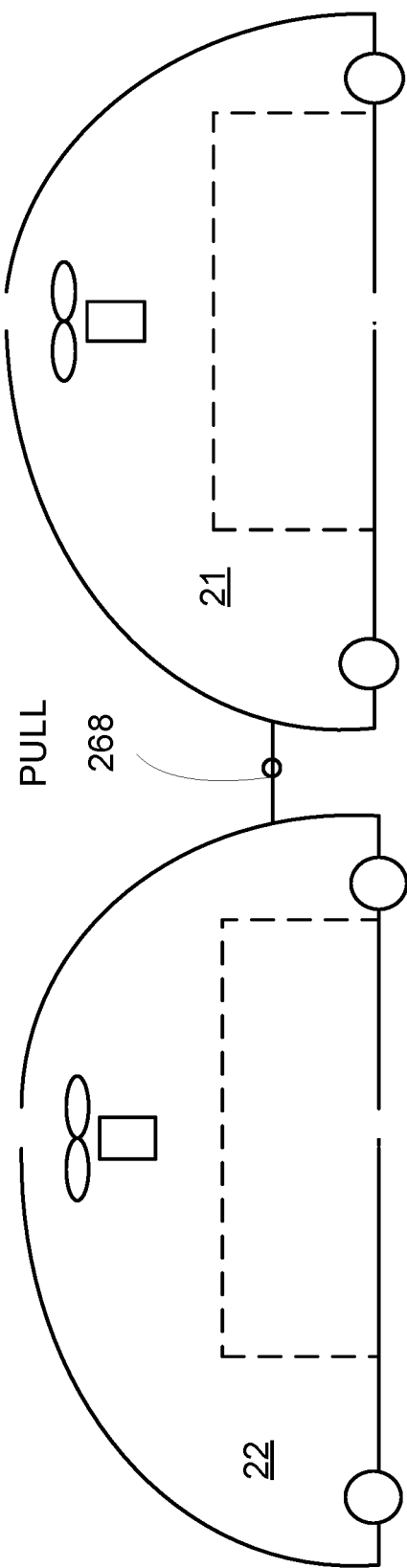
FIG. 17 is an example of pool cleaning robots.

Because dirt in pools tends to propagate by gravity to the lower regions of a pool, slopes and deep ends may be slippier than other areas. There are no definite rules on this and the flat regions may be equally slippery due to dirt accumulation that may also be a result of shock treatments such as, but not exclusively, the use of flocculants. It is common for a pool cleaning robot 23 to not be able to effectively clean area 103 let alone exit that area and climb back uphill on slope 102. Within the framework of a set of pool cleaning robots, the second pool cleaning robot 22 or 21 may possess special brushes and/or propulsion jets that allow it to descend on a slippery slope 102 to clean area 103 and exit back to area 102 or 101. FIGS. 9, 16 and 17 further depict additional salvage tasks of extracting pool cleaning robot 23 from area 103 or 102.

Figure 2B:
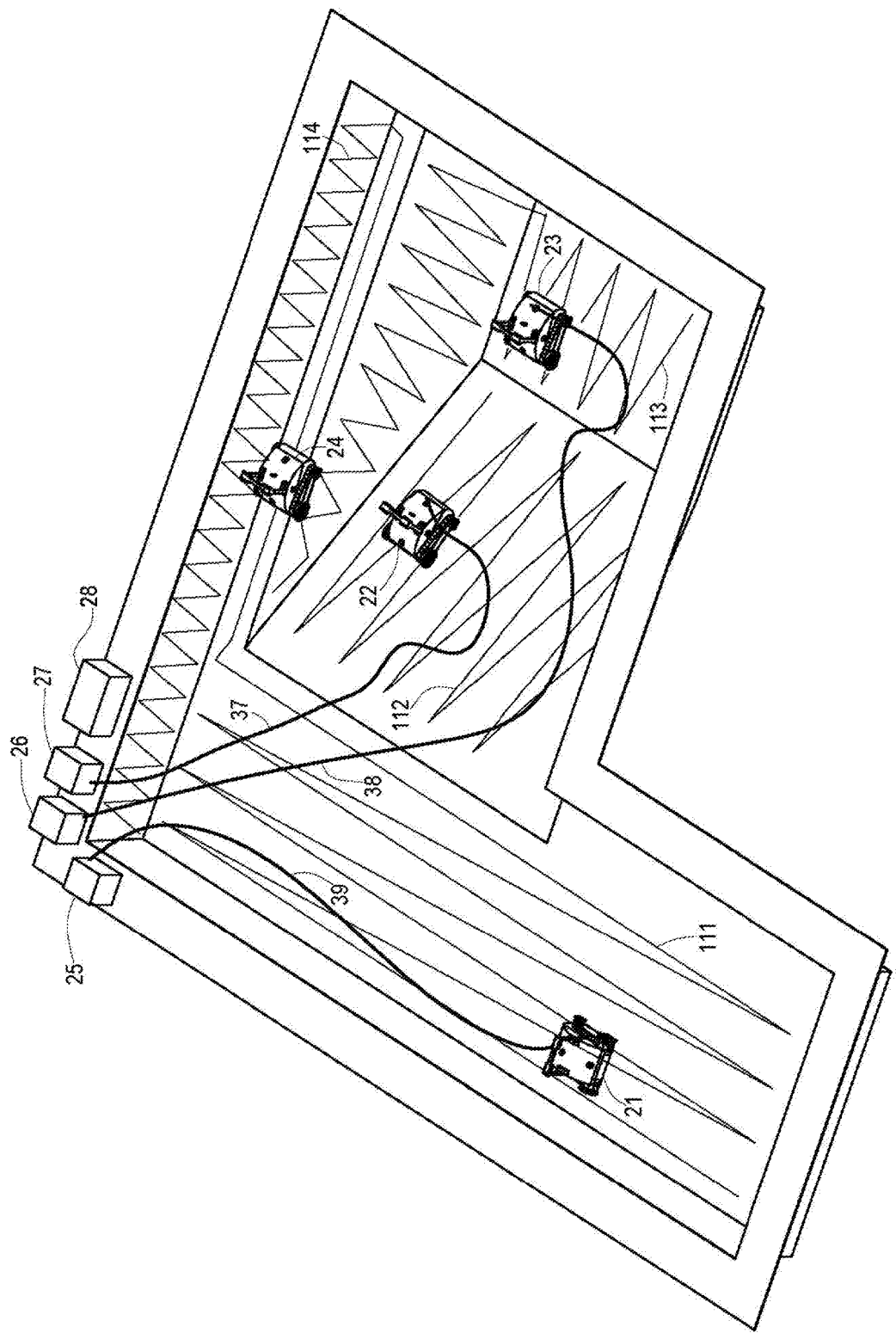
FIG. 2B is an example of a pool and a set of pool cleaning robots.

FIG. 2B illustrates (i) first, second and third pool cleaning robots 21, 22 and 23, (ii) first, second and third power supply units 26, 27 and 28, (iii) first, second and third cords 39, 38 and 37, (iv) a central power supply unit 28, and (v) a pool 100 that has a flat bottom portion 101 followed by a sloped bottom portion 102, a hopper 103 and sidewalls 104, 105 and 106 (as well as few unnumbered sidewalls).

Central power supply unit 28 supplies power to the first, second and third power supply units 39, 38 and 37. First, second and third power supply units 39, 38 and 37 are connected via first, second and third cords 39, 38 and 37 to first, second and third pool cleaning robots.

First pool cleaning robot 21 is configured to clean flat bottom portion 101. The first pool cleaning robot 21 follows a zig-zag cleaning path 111 for cleaning the flat bottom portion 101.

Second pool cleaning robot 22 is configured to clean sloped bottom portion 102. The second pool cleaning robot 22 follows a zig-zag cleaning path 112 for cleaning the sloped bottom portion 102.

Third pool cleaning robot 23 is configured to clean hopper 103. The third pool cleaning robot 23 follows a zig-zag cleaning path 113 for cleaning hopper 103.

Fourth pool cleaning robot 24 is configured to clean sidewalls 104, 105 and 106 as well as a narrow flat strip between sidewalls 104 and 105. The fourth pool cleaning robot 24 follows a zig-zag cleaning path 114 for cleaning the sidewalls 104, 105 and 106.

Fourth pool cleaning robot 24 is illustrated as a cordless pool cleaning robot.

First, second and third pool cleaning robots may or may not clean sidewalls. For example—it may be assumed that first, second and third pool cleaning robots may not clean sidewalls and/or that first pool cleaning robot 21 may not clean sloped bottom portion 102.

While FIG. 2B illustrates zig-zag cleaning paths, any of the pool cleaning robots may follow any other cleaning paths—including random cleaning paths, pseudo-random cleaning paths, and the like. The cleaning paths may change over time and/or may be dependent on the status of the pool and/or on the structure of the pool (including obstacles) and/or of the pool cleaning robot. The cleaning path of one pool cleaning robot may be the same as (or may differ from) the cleaning path of another pool cleaning robot.

It is expected that one of more of the pool cleaning robots (for example fourth pool cleaning robot 24) may be scheduled to clean the other three sidewalls of the pool 100.

Figure 3:
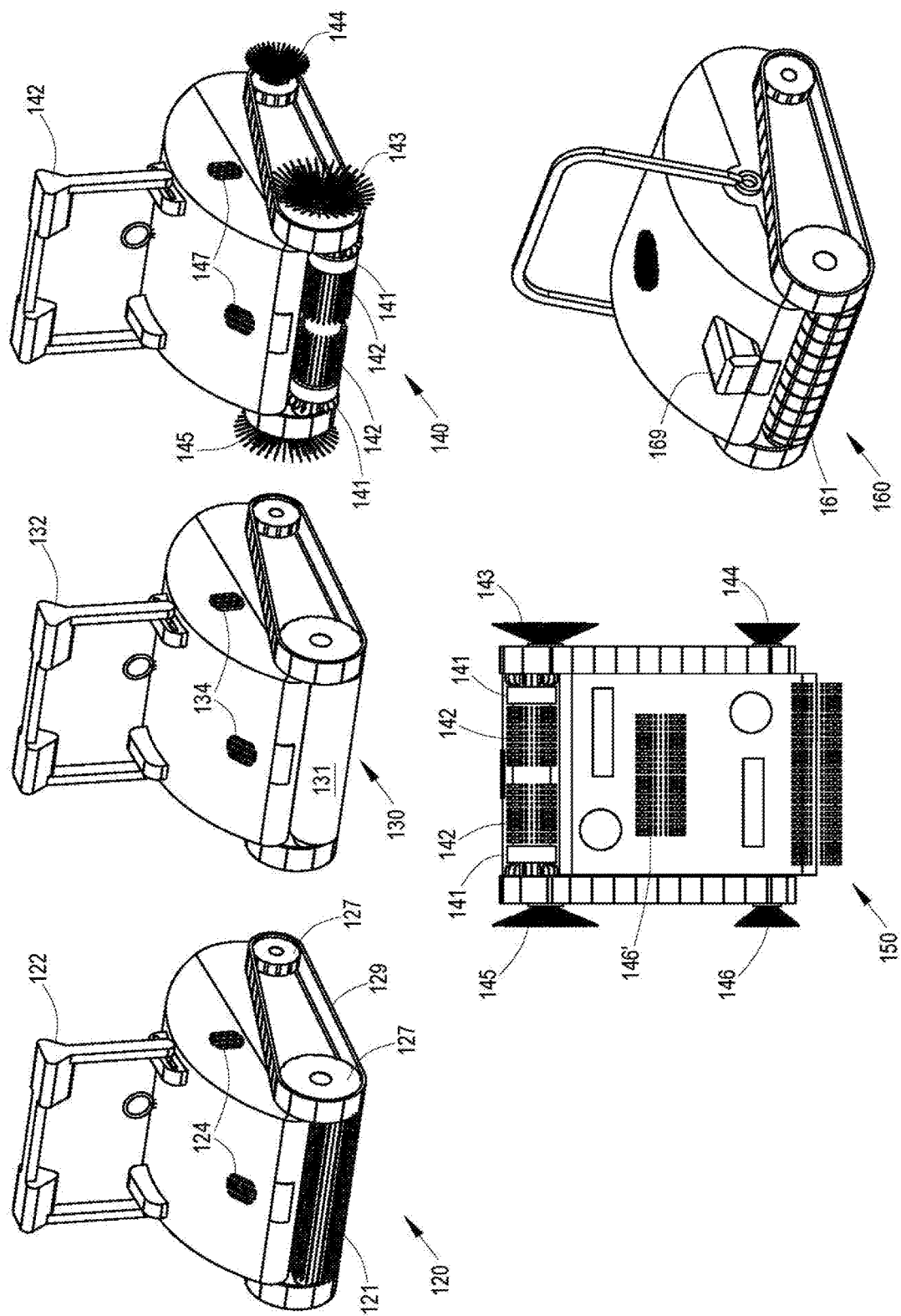
FIG. 3 is an example of pool cleaning robots.

FIG. 3 illustrates various pool cleaning robots that may form a set of pool cleaning robots. In this specification, a set may also be defined as a cluster or multitude or multiple or flock of pool cleaners and the like.

Pool cleaning robot 120 includes a maneuverable handle 122, a PVC bristled brush wheel 121, outlets 124 of a water jet propulsion unit, and interfacing elements such as wheels 127 and track 129.

Pool cleaning robot 130 includes a maneuverable handle 122, a PVA sponge brush wheel 131, outlets 134 of a jet propulsion unit, and interfacing elements such as wheels and a track.

Pool cleaning robot 140 includes (i) a maneuverable handle 142, (ii) a hybrid brush wheel that includes PVA sponge brush wheel portions 141 and PVC brush wheel portions 142, (iii) side brushes 143 and 144, and (iv) outlets 147 of a jet propulsion unit, and (v) interfacing elements such as wheels and a track.

Pool cleaning robot 150 includes (i) a maneuverable handle 142, (ii) a hybrid brush wheel that includes PVA sponge brush wheel portions 141 and PVC brush wheel portions 142, (iii) side brushes 143, 144, 145 and 146, (iv) an auxiliary brush 146', and (v) interfacing elements such as wheels and a track.

Pool cleaning robot 150 depicts a double brush wheel 142 that is separated by a sleeve insert (not numbered). By comparison to pool cleaners 120, 130, and 160, pool cleaner 150 can rotate 360 degrees in each direction by means of an additional drive motor for more sophisticated maneuvering abilities.

Pool cleaning robot 150 includes (i) a handle, (ii) a brush wheel 161 that may have any of the said brush types (iii) sensors—such as a camera- and especially a detachable camera, and (iv) interfacing elements such as wheels and a track.

Pool cleaner 160 includes any type cleaning brush 161 and a camera compartment 169 that may further comprise LED lighting, laser rangefinder, acoustic sensors and the like.

Figure 4B:
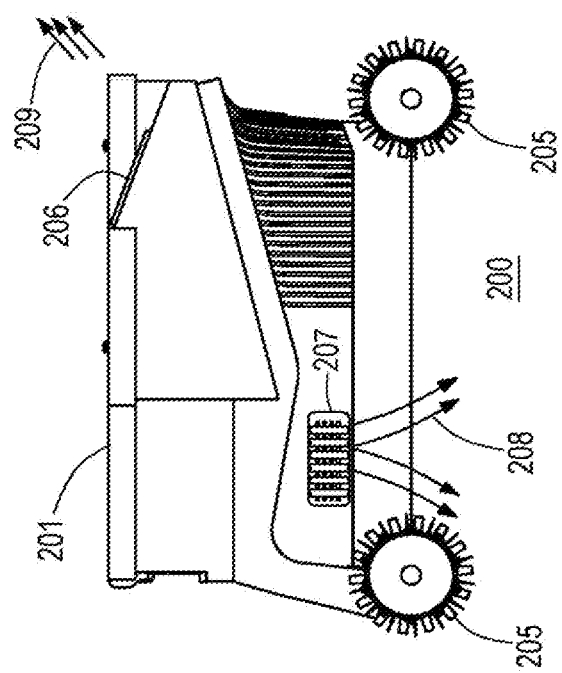
FIG. 4B is an example of a pool and a pool cleaning robot.
Figure 4A:
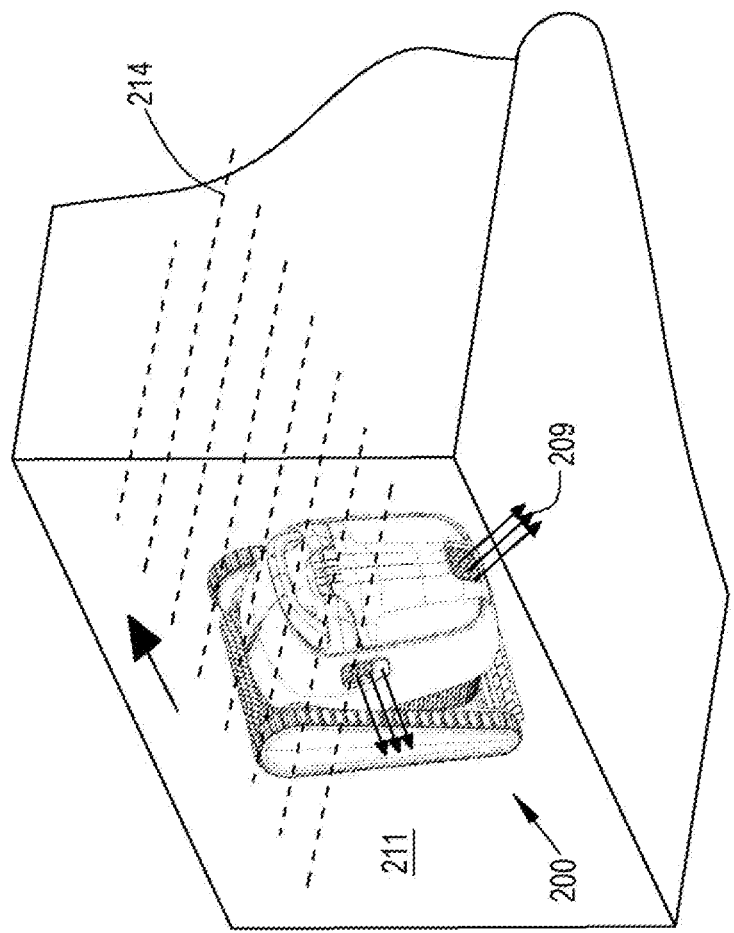
FIG. 4A is an example of a pool and a set of pool cleaning robots.
Figure 4C:
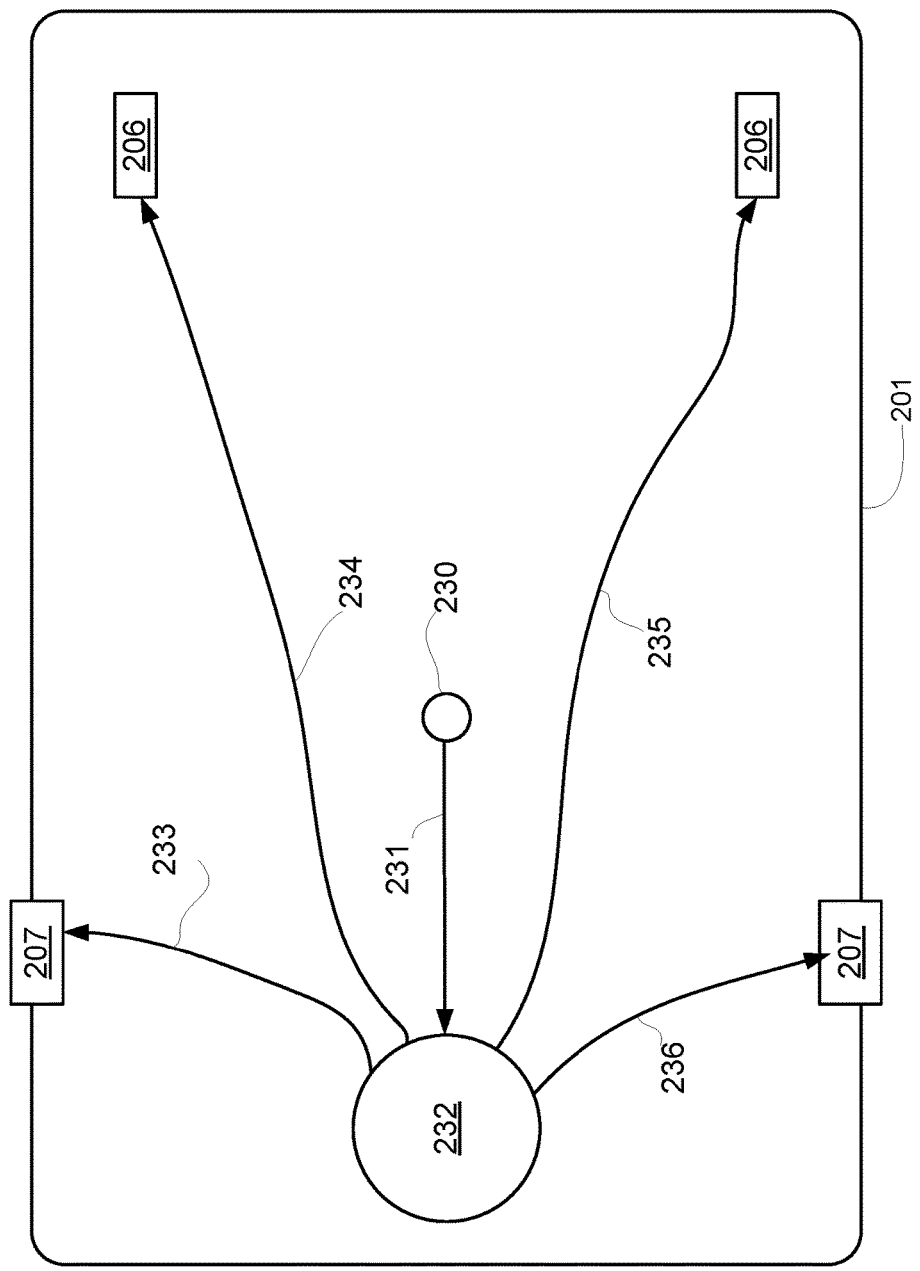
FIG. 4C is an example of a pool cleaning robot.

FIGS. 4B and 4C illustrate a pool cleaning robot 200 of the set that includes a (i) housing 201, and a water jet propulsion unit that includes (ii) pump and fluid distribution unit 232 that is fed with filtered or unfiltered fluid via fluid conduit 231 (either from a fluid intake or from the filtering unit—see reference number 230); (iii) additional fluid conduits 233, 234, 235 and 236, (iv) output fluid interfaces such as side fluid output units 207 and upper-rear fluid output units 206.

Each output fluid interface 207 may or may not control the direction of the fluid jet 208 that it outputs. Each output fluid interface 206 may or may not control the direction of the fluid jet 209 that it outputs.

For example—each output fluid interface may include a grille that includes two or more movable first panes that may be moved by one of more motors thereby determined the position and/or orientation of the two or more movable panes- and the direction of the jet of fluid outputted from the output fluid interface.

FIG. 4A illustrates the pool cleaning robot 200 as climbing a sidewall 211 of a pool towards the waterline 214 using jets of fluid 209 that may also perform a sideways waterline cleaning routine on the entire (or partial) exemplary waterline 41" in FIG. 1B.

FIG. 5 illustrates pool cleaning robot 300 as including an arm 301 that extends from housing 322 and is connected to one or more brushing elements such as external brush 29.

Arm 301 may include one or multiple joints and one or more segments that are connected to the joints. Pool cleaning robot 300 may include one or more motors and/or control elements that control the position of arm 301 and external brush 302 that is connected to the arm 301.

Pool cleaning robot 300 may be configured to position the external brush 302 at a position that allows external brush 302 to clean surfaces that are above the housing 322.

FIG. 5 illustrates an underwater staircase 311 that includes four stairs that includes horizontal surfaces and vertical surfaces. FIG. 5 also illustrates a bottom of the pool 312 on which pool cleaning robot 300 is positioned (and may optionally hover above) while arm 302 cleans one or more surfaces out of horizontal surfaces and vertical surfaces. Arm 302 may include telescopic bars, extendable or retractable bars, elastic, and/or non-elastic segments.

In FIG. 5 external brush 302 faces a horizontal surface. The external brush 302 may be oriented at any angle in relation to the horizon. For example—when cleaning any one of vertical surfaces the external brush 302 may be vertically oriented.

It is noted that during the cleaning of any of said surfaces the pool cleaning robot 300 may maintain static by countering any force applied on the external brush 302 by any cleaned surface using fine-tuned fluid jets.

Pool cleaning robot 300 may also hover above any surface illustrated in FIG. 5 while cleaning one or more stairs. It is noted that while bottom left and/or bottom right brushes clean one stair the arm 302 can be used to clean another stair.

FIG. 5 also illustrates an interface such as ring 321 for connecting the pool cleaning robot to an extracting device.

FIG. 6A illustrates a pool cleaning robot 400 that is configured to perform leaf skimming waterline cleaning. A non-limiting example of such a pool cleaning robot is illustrated in USA application 2016/0060887 which is incorporated herein by reference. The pool cleaning robot is also configured to clean the bottom of the pool or any other part of the pool. Pool cleaning robot 400 may be connected to a cord or may be cordless.

Figure 6D:
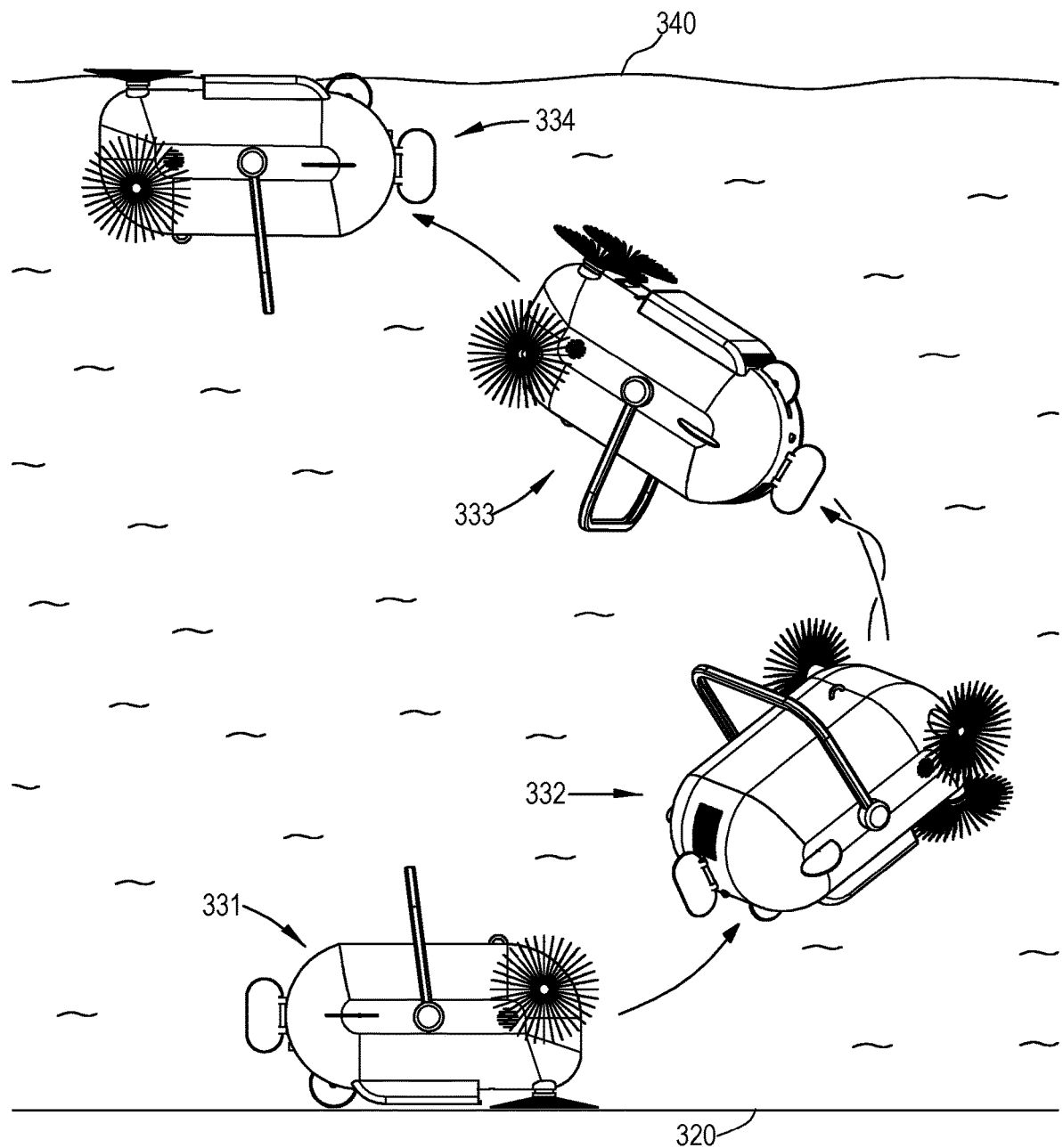
FIG. 6D is an example of a pool and a pool cleaning robot.

FIG. 6D illustrates an illustrates a process during which another embodiment of a leaf skimming waterline pool cleaning robot 400 propagates from being at non-inverted position (331) at the bottom of the pool, until (after rotating by 180 degrees while floating towards the waterline 340) the pool cleaning robot 400 is positioned in proximity to the waterline 340 and is in an inverted position (position 334)—so that the skimmer 160 is positioned above housing 90. Positions 332 and 333 are intermediate positions of the pool cleaning robot 400 during the process.

FIGS. 6B and 6C illustrate cordless pool cleaning robots 500 and 600—having water jet propulsion units that clean a sidewall. Pool cleaning robot 500 has a fixed handle 501 and pool cleaning robot 600 does not have any handle. In FIG. 5 the jet propulsion module is illustrated as having side and top apertures 502 and 503. Other parts of the jet propulsion unit are not shown.

FIG. 7 illustrates a horizontal cleaning path 721 that is followed by pool cleaning robot 720 while cleaning sidewall 710 whilst countering a natural downward gravity pull.

FIG. 8 illustrates a non-vertical cleaning path 722 that is followed by pool cleaning robot 720 while cleaning sidewall 710 and bypassing a sidewall obstacle 711.

FIG. 9 illustrates pool cleaning robot 822 and pushing pool cleaning robot 821 that is stuck on a main drain 802 of a pool.

Figure 10:
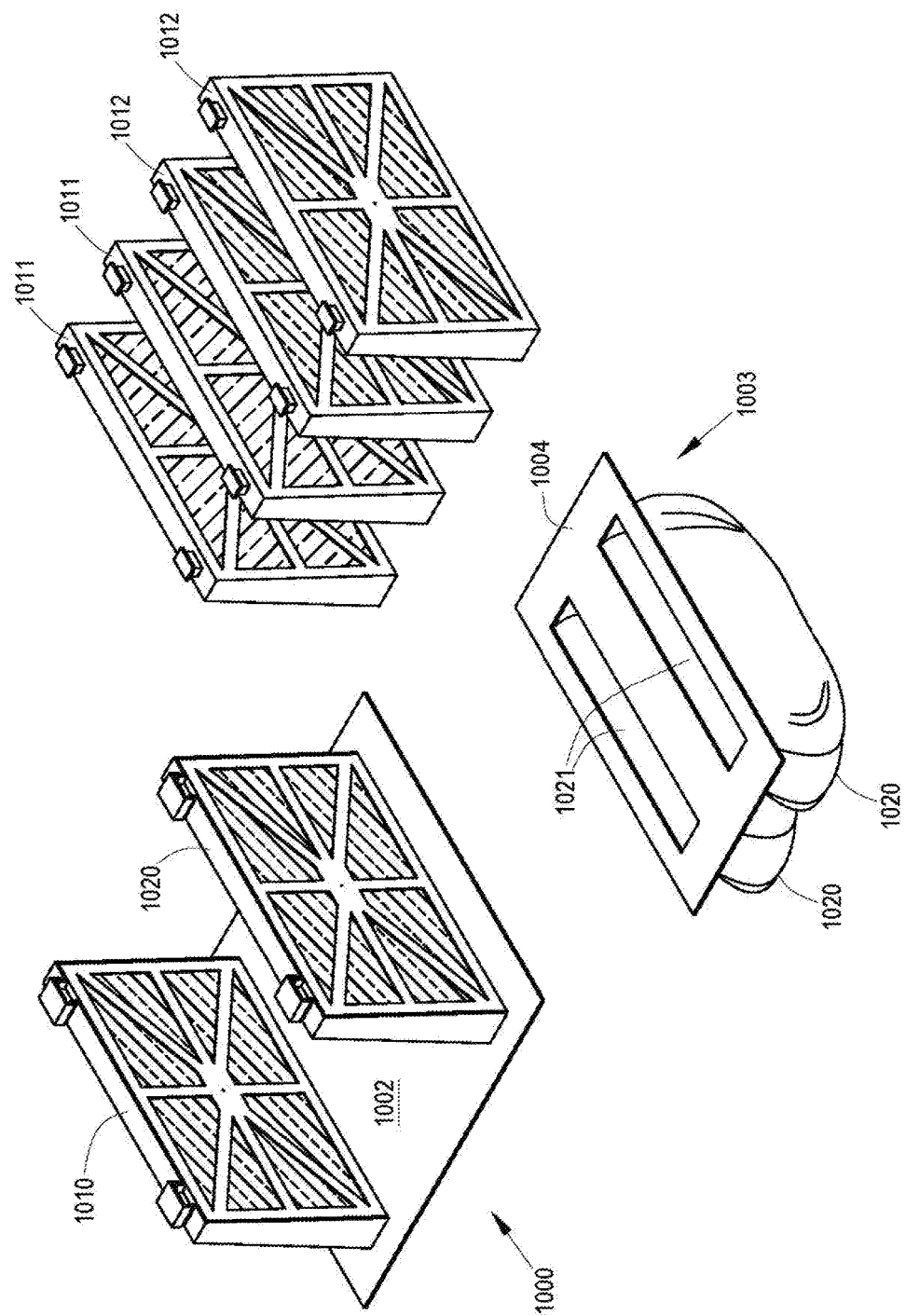
FIG. 10 is an example of filtering units.

FIG. 10 illustrates different filtering units.

Filtering unit 1000 includes a base 1002 and two frames 1010 and 1020 that support replaceable filtering panels such as 1011 and 1012 (filtering panels or cartridges 1011 are coarser than filtering panels 1012). Fluid enters the filtering panels via apertures (not shown—concealed by the frames) formed in base 1002.

Filtering unit 1003 includes a base 1004, and two bag type filtering components 1020. Fluid enters the filtering components 1020 via apertures 1021 formed in base 1004.

Different pool cleaning robots of the set may have different filtering units and/or may have different filtering, nets that may be characterized by pore sizes, assembled in their filtering units.

One or more pool cleaning robots of the set may be configured to clean the same region of the pool. They may clean the same region at different manners or at the same manner.

Figure 11:
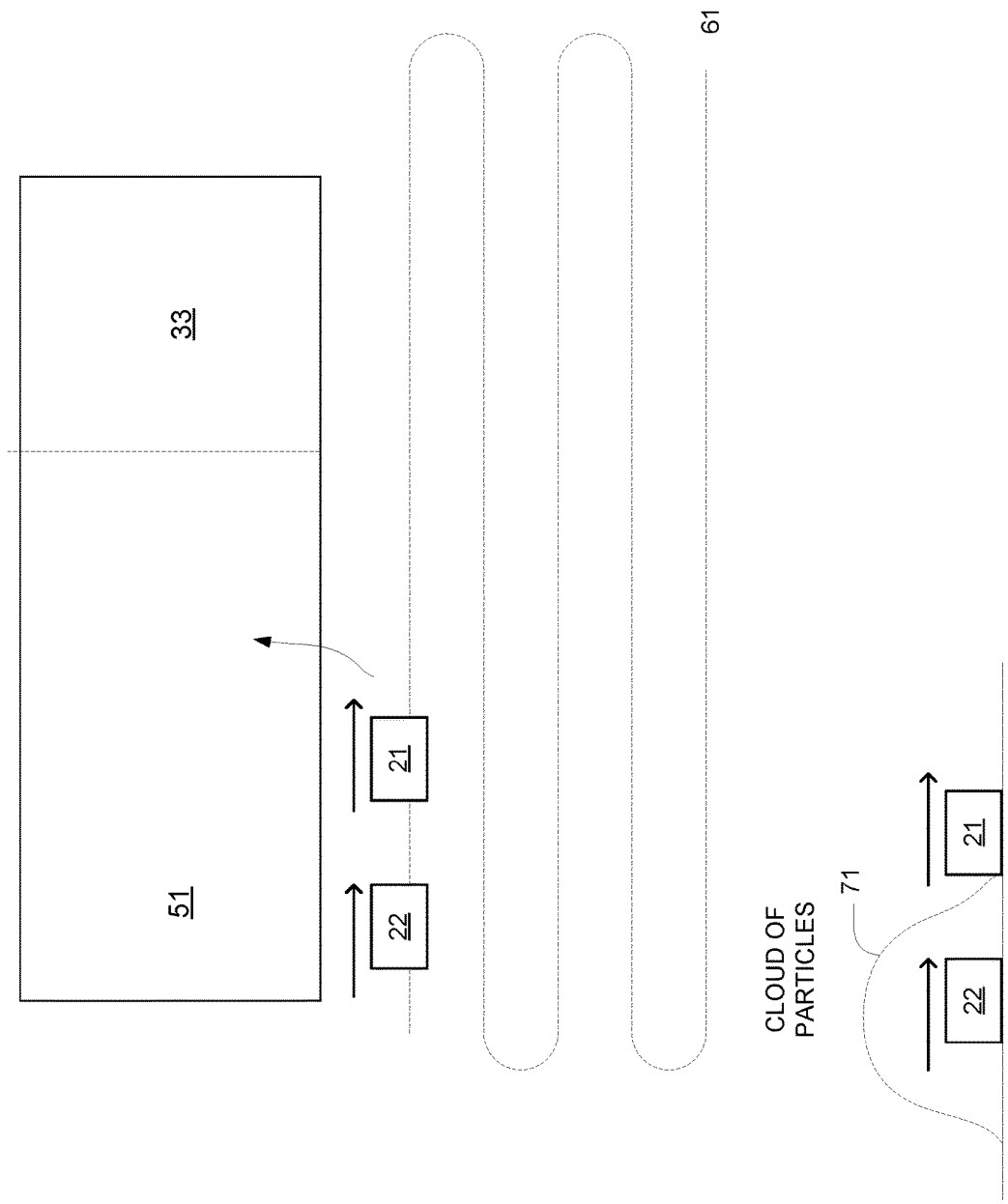
FIG. 11 is an example of a pool and pool cleaning robots.

FIG. 11 illustrates first and second pool cleaning robots as cleaning pool region 51. Another region of the pool 33 may be cleaned by another pool cleaning robot of the set.

FIG. 11 illustrates the second pool cleaning robot 22 as following the first pool cleaning robot 21 and both follow the same raster scan cleaning path 61. It should be noted that different pool cleaning robots may follow different cleaning paths even when cleaning the same region of the pool.

The first and second pool cleaning robots may clean the same region at the same time, at different points of time that are proximate to each other or that are substantially different from each other. There may be no-overlap, a partial overlap or non-overlap between the cleaning period of the region by the different pool cleaning robots If the first and second pool cleaning robots clean the same region at different manners. The first pool cleaning robot may be configured to perform a preliminary cleaning of the region and the second pool cleaning robot may be configured to perform a supplementary follow up cleaning of the region. The preliminary cleaning may be faster, slower or of the same duration as the supplementary cleaning. The preliminary cleaning may be coarser, finer or of the same granularity as the supplementary cleaning.

FIG. 11 illustrates that the second pool cleaning robot 22 is close enough to the first pool cleaning robot 21 so that it may collect debris of a cloud 71 of debris that is elevated from the bottom of the pool by the first pool cleaning robot 72. Both pool cleaners or a set may also travel side by side along travel paths.

Figure 12:
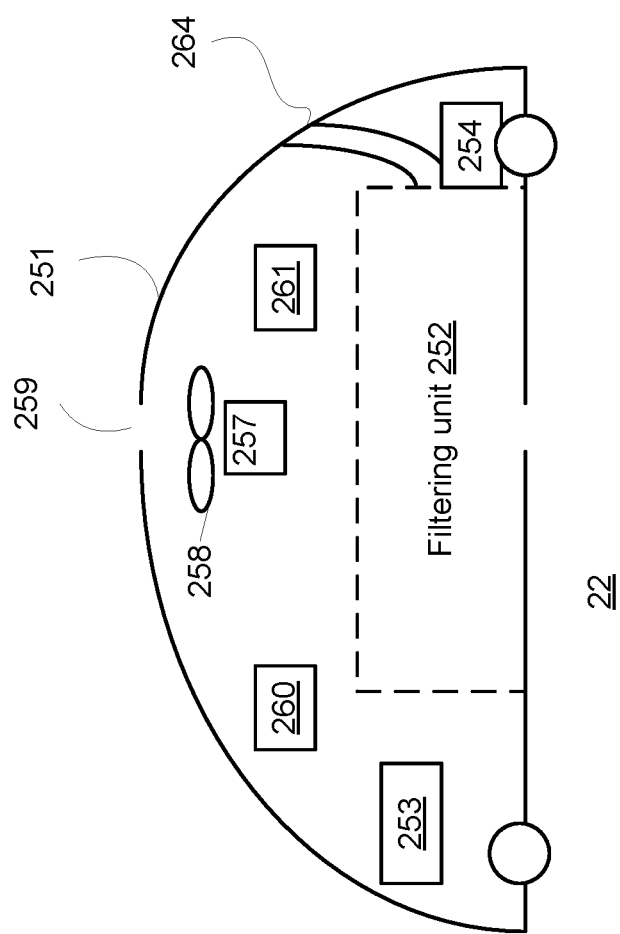
FIG. 12 is an example of a pool cleaning robot.

FIG. 12 illustrates second pool cleaning robot 22 that is representative as comprising standard pool cleaner operating components including a dedicated opening and conduit 264 for collecting unfiltered fluid and debris from the cloud of debris 71—and to filtering unit 252. This opening may be provided in addition to one or more openings formed at the bottom of the housing. FIG. 12 also illustrates controller 253, impeller 258, power supply unit 261, pump motor 257 for rotating the impeller, housing 251 that includes a bottom aperture and a top aperture 259 (allowing fluid driven by the impeller to exit the housing), drive motor and gear 254 that may include a non-return valve control device opening and closing 264 as needed (not shown), and communication module 260.

Figure 13:
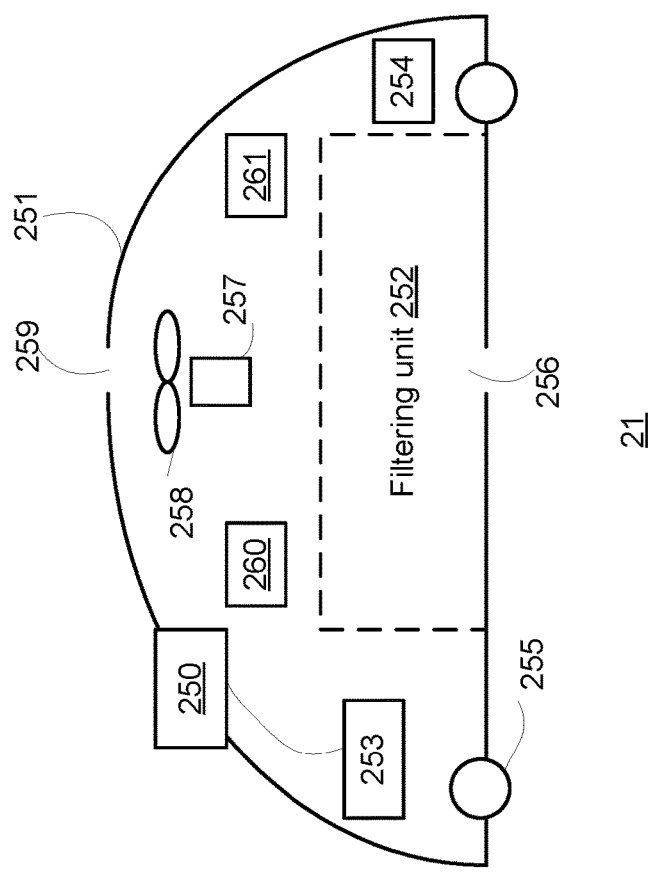
FIG. 13 is an example of a pool cleaning robot.

FIG. 13 illustrates first pool cleaning robot 21 as including a detachable module 250—such as but not limited to a detachable sensor (e.g.: a camera) that may comprise inductive electrical and data transfer connections (not shown). FIG. 13 also illustrates filtering unit 252, controller 253, impeller 258, pump motor 257 for rotating the impeller, housing 251 that includes a bottom aperture 256 and a top aperture 259, drive motor and gear 254, power supply unit 261, and communication module 260.

Figure 14:
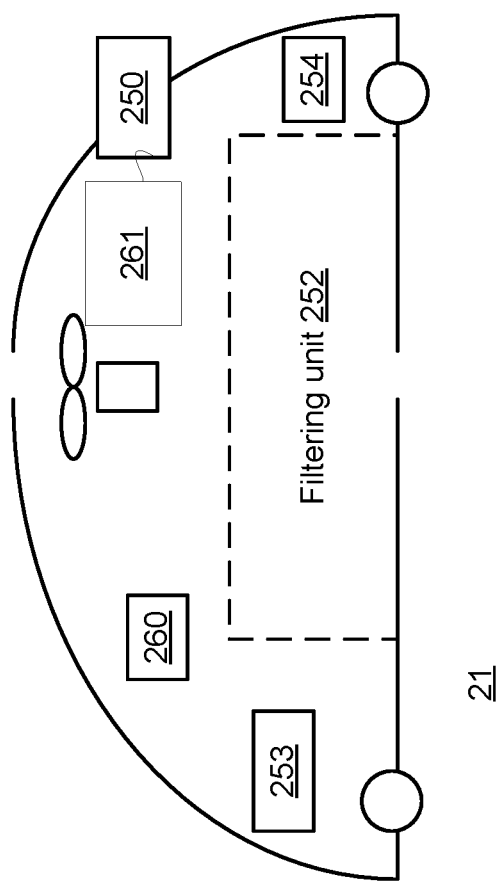
FIG. 14 is an example of a pool cleaning robot.

FIG. 14 illustrates first pool cleaning robot 22 as including a detachable module 250—such as but not limited to a detachable battery so that while one set of charged batteries may be inserted into module 250 slot (not shown). FIG. 14 also illustrates filtering unit 252, controller 253, impeller, pump motor for rotating the impeller, a housing that includes a bottom aperture and a top aperture, drive motor and gear 254, and communication module 260.

Figure 15:
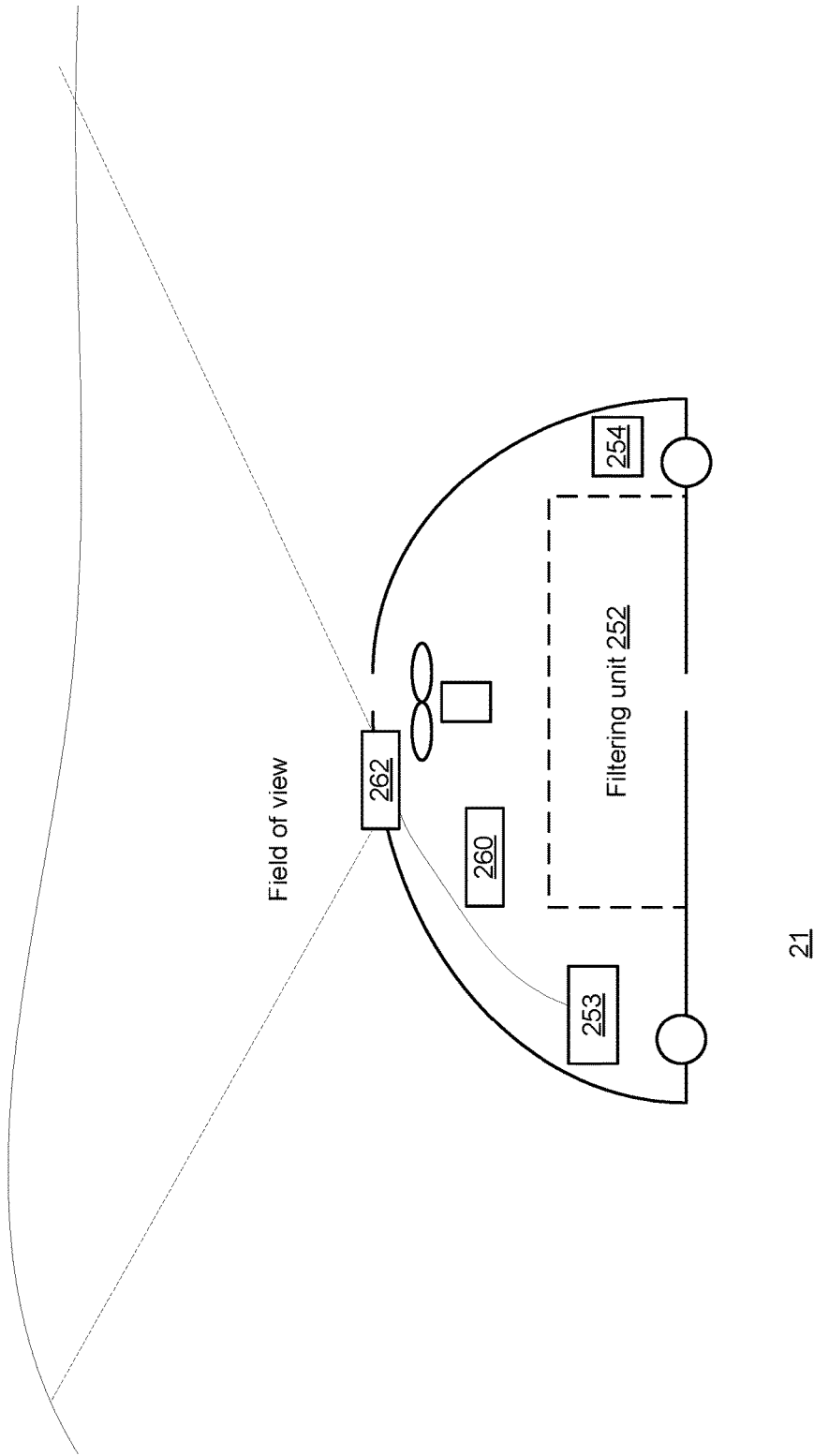
FIG. 15 is an example of a pool cleaning robot.

FIG. 15 illustrates first pool cleaning robot 21 as including a cord sensor 262 that may have a field of view that is directed upwards—and may be large in order to image cords of one of more pool cleaning robots of the set. The cord sensor 262 may be a camera that may in turn be detachable and fitted onto another pool cleaning robot. It is coupled to controller 253. FIG. 13 also illustrates filtering unit 252, impeller, pump motor, a housing that includes a bottom aperture and a top aperture, drive motor and gear 254, and communication module 260.

FIG. 16 illustrates first pool cleaning robot 21 as pushing second pool cleaning robot 22—either by direct contact between the housings of the two pool cleaning robots—or by an interfacing element such as a rod 265. The interfacing element may be static or may be dynamic—it may extend outside the housing, extend its length, or otherwise change its shape and/or size when pushing another pool cleaning robot.

FIG. 17 illustrates first pool cleaning robot 21 as pulling second pool cleaning robot 22—by an interfacing element such as locked and unlocked connectors 268.

Figure 18:
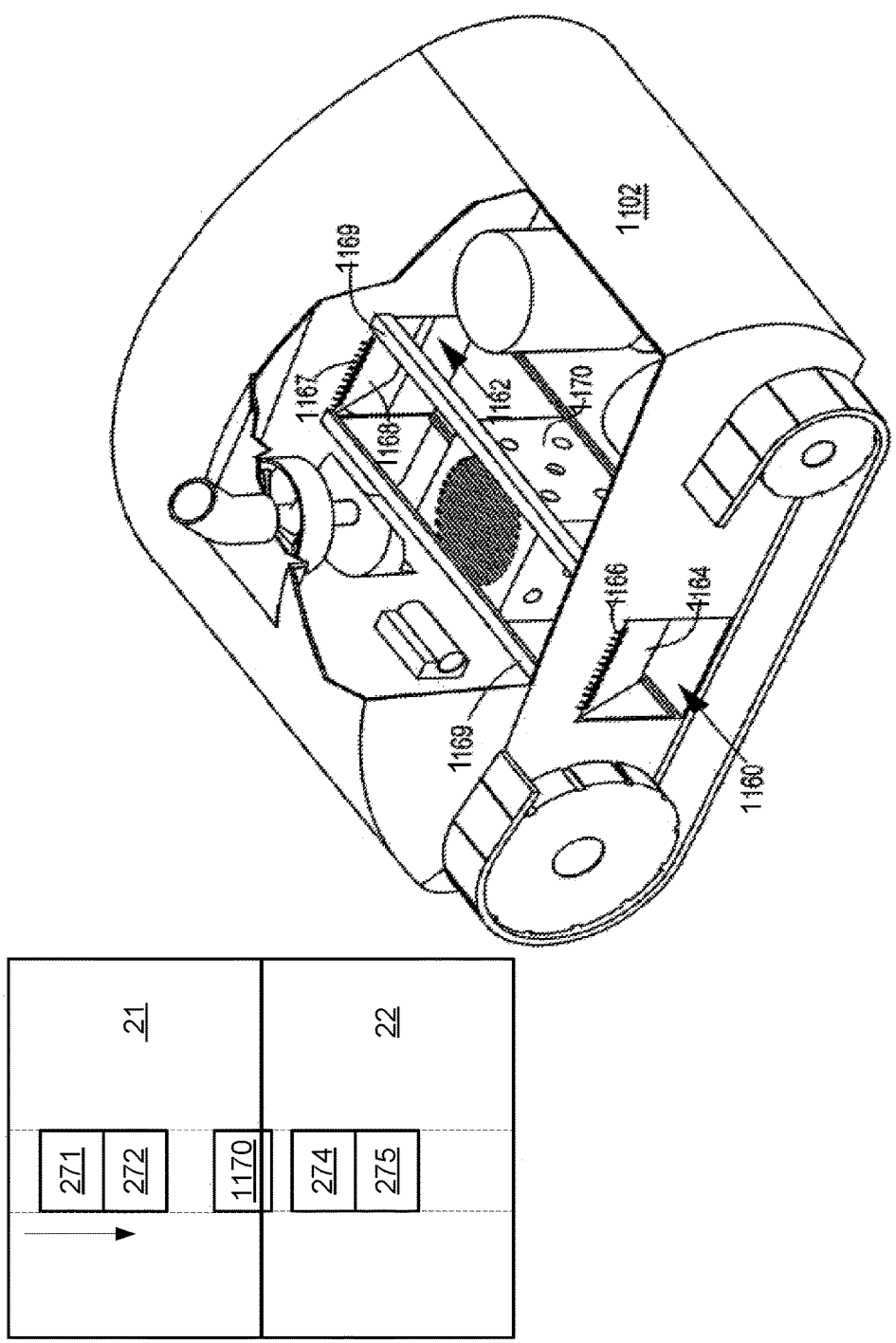
FIG. 18 is an example of pool cleaning robots.

FIG. 18 illustrates an exchange of a filter between first and second pool cleaning robots. Each one of first and second pool cleaning robots may store multiple filters—such as filters 271, 272 of first pool cleaning robot 21, filters 274 and 275 of second pool cleaning robot 22—and filters 273 that is sent from first pool cleaning robot 21 to second pool cleaning robot 22.

FIG. 18 illustrates rails 1169 for supporting the filters, first filter opening 1160 of second pool cleaning robot 22 for receiving filter 1170, and a second filter opening. First filter opening 1160 is equipped with a first door 1164 and a spring mechanism 1166 that allows the first door 1164 to open when filter 1170 is inserted to the pool cleaning robot 22 and to be closed (thereby closing the first filter opening 1160) after the filter is inserted. Second filter opening 1162 is equipped with a second door 1168 and a spring mechanism 1169 that allows the second door 1168 to open when a filter is extracted/ejected/outputted from the pool cleaning robot 22 and to be closed (thereby closing the second filter opening 1162) after the filter is extracted/ejected/outputted. It is noted that a filter opening can be closed by the filter itself.

A movement mechanism such as motor with a gear or other interfacing elements may move the filters along the rail. The movement mechanism may be located within the housing 1102.

Figure 19:
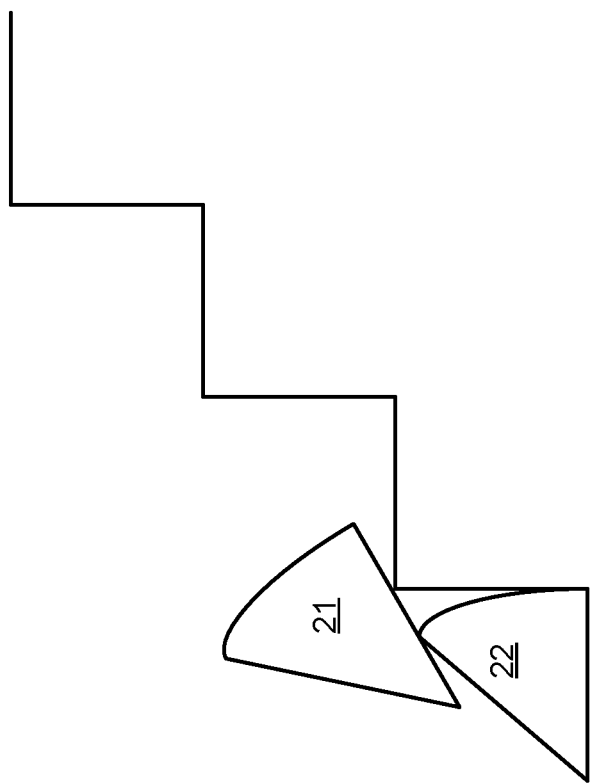
FIG. 19 is an example of pool cleaning robots.

FIG. 19 illustrates first pool cleaning robot 21 that climbs over second second pool cleaning robot 22—thereby climbing one stair of a stairway.

Figure 20:
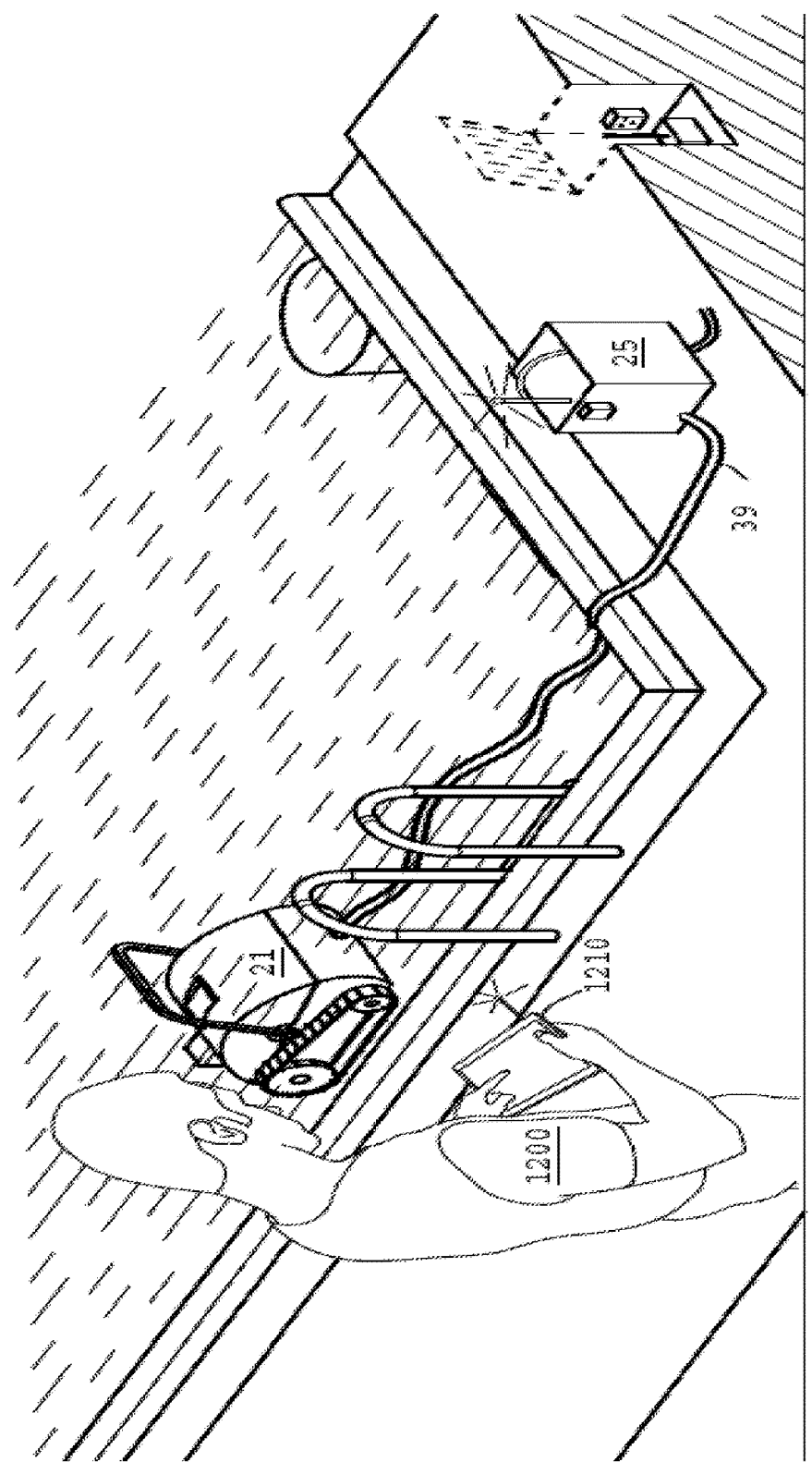
FIG. 20 is an example of a user that programs a pool cleaning robot.

FIG. 20 illustrates a user 1200 that interfaces with a mobile device 1210 that in turn communicates with first pool cleaning robot 21. The mobile device 1210 may send commands and/or suggested demarcation information to the pool cleaning robot and/or may receive information such as status information from the pool cleaning robot.

FIG. 20 also depicts an in-situ wireless programming of a pool cleaner or pool cleaners to create a set. In-situ may be an end user pool location. For example, an end user may possess one pool cleaner but may wish to upgrade by adding one or more pool cleaning robots to create a set of pool cleaning robots. According to the various components that the pool cleaning robots contains (brushes, jets and the like) and each of their abilities (climb walls, slopes and the like) the end user may nominate a master and/or a slave and initiate a set pool cleaning program that overrides the single—unattached—pool cleaning robot. The wireless programming or wired (not shown) may be performed separately on each pool cleaning robot A, B . . . n and additional commands may program the entire set so that it can operate in the pool without having any collisions and/or cable entanglements.

Another option to create and market a set with pre-defined characteristics is at the OEM source premises by offering sets with specific differentiating features. Alternatively or additionally, the set may be assembled at one of its distributors or service centers. Whereby, in any scenario, a user may specify the profile of its pool and the vendor(s) may tailor-adapt at least two pool cleaning robots to operate as an optimal set at the said end user premises.

It should be noted that inter communication between pool cleaning robots may be achieved by pool cleaning robots that may recognize the pool underwater features (for example, by optical or acoustic means).

Namely, the pool cleaning robots may recognize their relative position inside the pool in relation to pool features and in relation to other pool cleaning robot.

The pool cleaning robots may be able to recognize a pre-demarcated area or working zone from which the pool cleaner will not trespass to its neighboring pool cleaner zone.

Each pool cleaning robot may communicate its position to the neighboring pool cleaning robot(s) thereby ensuring that each cleaner remains within its demarcated zone.

The pool cleaning robots may communicate with each other directly or indirectly. The indirect communication can be executed by using submerged and/or above-water relays or communication modules.

A communication module may be wirelessly coupled to the pool cleaning robot. The communication module may be wired coupled to a pool cleaning robot via the cable that is also used for power supply.

A certain communication module may communicate with a certain pool cleaning robot and may communicate with other pool cleaning robots or may communicate with other communication modules that in turn communicate with their associated pool cleaning robots.

The inter communication may be achieved by a wireless device (such as a Bluetooth® device) located in each Power Supply unit that is positioned outside the pool (the PS is an electrical device that is not submerged). Each pool cleaning robot is electrically connected and tethered to the PS by means of an electrical cord.

In another embodiment, the pool cleaning robot(s) is/are operated by means of on-board rechargeable batteries so the underwater inter-communication between pool cleaning robots may be achieved by optical or acoustical means.

Figure 22:
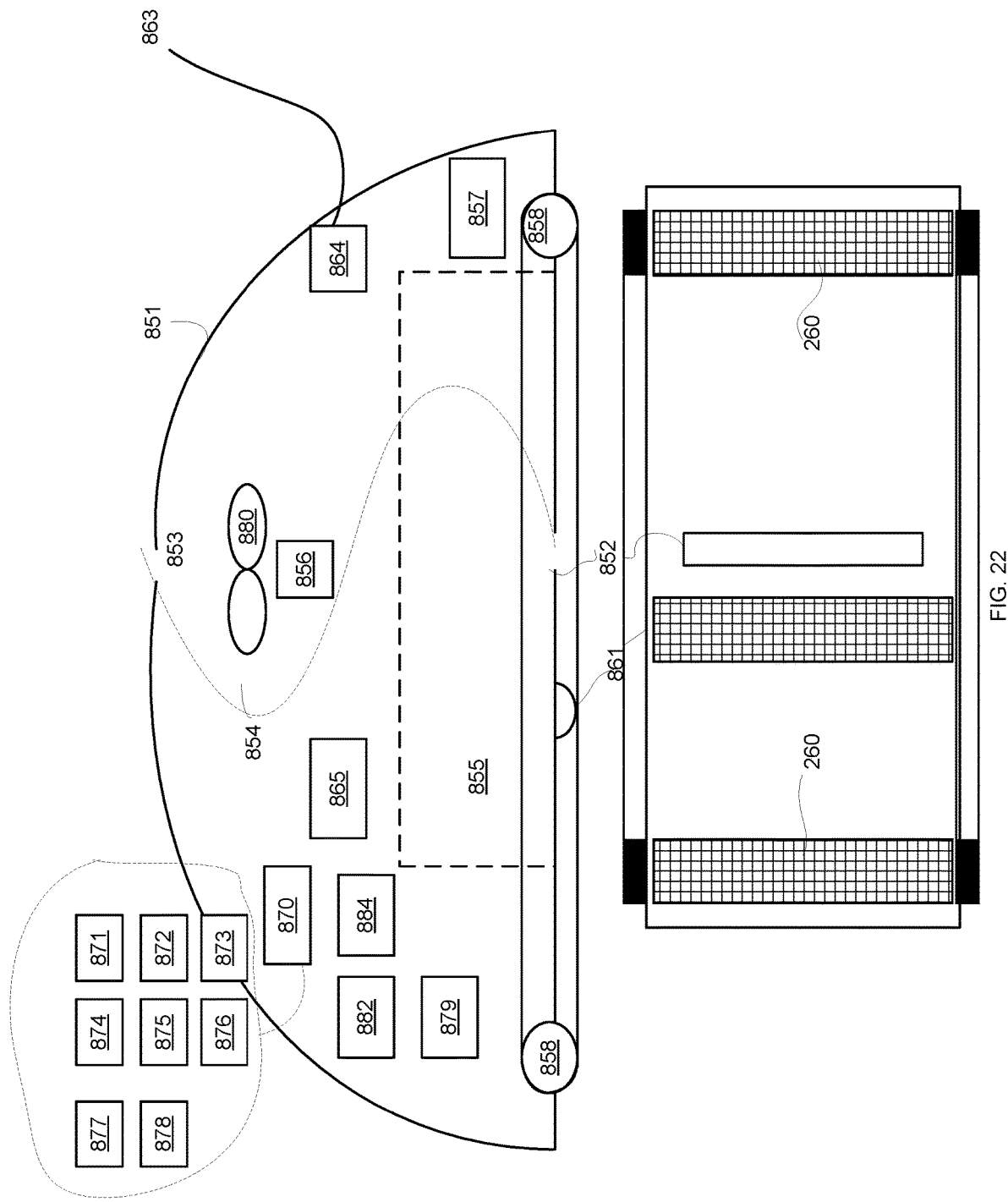
FIG. 22 is an example of a pool cleaning robot.

The pool cleaning robot 850 may include at least one of the following elements on-board (see FIG. 22):

a. A hollow body (housing) 851.
b. A water intake aperture 852.
c. A water outlet aperture 853.
d. A hydraulic path 854 stretching between the said intake and outlet.
e. A filtering and/or sieving element (such as a filtering unit) positioned inside the said hydraulic path 855.
f. A pumping motor 856 (also referred to as pump motor) positioned in the hydraulic path.
g. A driving motor and reduction gears (also referred to as drive motor and gear) 857.
h. Travelling wheels (also referred as wheels) 858.
i. Wheels connecting shafts 859.
j. Pool surface dirt brushes or scrappers (also referred as brush wheels) 860.
k. Auxiliary brushing or scrapping member (also referred to as auxiliary brush wheel) 861.
l. Tracks 862.
m. Electrical tethered power supply cable (also referred to as cable) 863.
n. A chargeable battery 864.
o. A communication unit for communicating (wirelessly or in a wired manner) with a control unit (also referred as a communication module) 865.
p. One or more sensors 870.
q. Image sensor 871—especially an on-board day and/or night camera
r. A video device 872 that captures, memorizes locations of pool features or obstacles and calculates the relative angle and distance of the robot from these features to further calculate the robot location in the pool.
s. A lighting optical recognition aid unit 873 for nighttime and/or for high turbidity conditions that may also employ an infrared light device.
t. One or more motion sensors 874 such as an accelerometer and/or a gyroscope and/or an inertial measurement unit (IMU) and/or a laser wall recognition device.
u. A turbidity sensor 875.
v. A heading direction measurement sensor 876 such as magnetometer, compass, and/or a gyrocompass
w. Impact sensors and/or pressure sensors 877
x. Pump motor velocity/current sensors 878
y. A control box (also referred to as a controller) 879 that may include a processor and cleaning program software.
z. Impeller 880
aa. A processor 882 that may be configured to perform any mentioned above calculations. The processor and the controller 879 may be combined. Any reference to a controller may be referred to as a reference to a processor or to a combination of controller and a processor. The controller and/or the processor may include one or more integrated circuits.
bb. Memory module 884 for storing programs, commands, allocation of regions, sensors information, and the like.

Such programs may include, for example, commands whereby when one pool cleaning robot approaches or is travelling towards a demarcation line, the other pool cleaning robot will direct its movement away from that said demarcation line. This will allow each pool cleaning robot to ensure cleanliness of the area around or on the demarcation lines.

There may be provided submerged radiation beacons transmitters for transmitting radiation beacons that represent the limits of the separate Although the pool cleaning robots are able to intercommunicate and automatically assign work programs and demarcation zones between them, another embodiment, that is incorporated herein in its entirety, was disclosed in Provisional U.S. application No. 62/287,006 dated 26 Jan. 2016 and in US patent application publication serial number 2017/0212523.

This concerns the overriding possibility of allowing the end-user or pool operator to switch off from automatic inter demarcations by the pool cleaning robots to a manual demarcation. This may be achieved by a control device that may be a remote control that can be dedicated or by use of smart phone or mobile devices that comprise screens that may depict the pool environment.

Manual demarcations may be achieved by use of said control device that will enable the user to add features or lines on screen and draw virtual scanning demarcation lines for cleaning zones in the pool, mark special pool areas that may need special attention by marking that area, mark end-point to arrive to at the end of the cleaning cycle, ability to overrule the preset cycle time and the like.

The pool cleaning robot may be powered by an electrical power cord tethered to an external power supply. It may autonomously exit the pool in order to evacuate the swimming pool area and/or in order to service its filtering unit in an external docking station that may be located on the deck near the pool or it may be located in an underground parking area in the pool deck or its environs. See U.S. provisional patent Ser. No. 62/146,335 filing dated Apr. 12, 2015 and the continuation in part of U.S. patent application Ser. No. 14/501,098 filing date Sep. 30, 2014 which claims priority from U.S. provisional patent Ser. No. 61/890,260 filing date Oct. 13, 2013, and all their ensuing patent applications that are all, for the purpose of this "exiting embodiment", being incorporated herein by reference.

The pool cleaning robot may be powered by on-board batteries and may employ a submerged docking station for recharging its batteries. Alternatively, it may autonomously exit the pool in order to be charged by an external docking system.

A cord connected to a pool cleaning robot may include at least one out of transmitters for transmitting electromagnetic information that once sensed by one or more pool cleaning robots may allow the one or more pool cleaning robots to determine the location of the cord. These transmissions may include a unique identifier or may have any other character (such as carrier frequency) that will enable the pool cleaning robot to detect that transmission s resulting from the cable—and not from another pool cleaning robot. There may be multiple transmitters that are located at multiple locations along the cord. A single pool cleaning robot may determine the location of any cord. Alternatively—the determination may be made in a distributed manner—for example by comparing the reception parameters of the transmissions of the transmitter—as received by different pool cleaning robots—a triangulation process or other location finding process may be performed.

Additionally or alternatively—one or more receivers may be attached to the cord and the receiver may determine its location by analyzing received transmissions from one or more pool cleaning robots. Alternatively—the receiver receives the transmission and send information about the transmission (identifier, source of transmission, reception parameters such as strength, RSSI) to one or more pool cleaning robot and/or to another device for analysis and location determination.

Additionally or alternatively—the cords may be coupled to or include any type of proximity sensors that may sense that a pair of cords are too close to each other—and then send an alert to one or more pool cleaning robot and/or to another device.

The cord may be coupled to or may include an image sensor for sensing the location of the pool cleaning robot. The image acquired from the image sensor may be used to determine the relative position of the cord and the camera.

Figure 21:
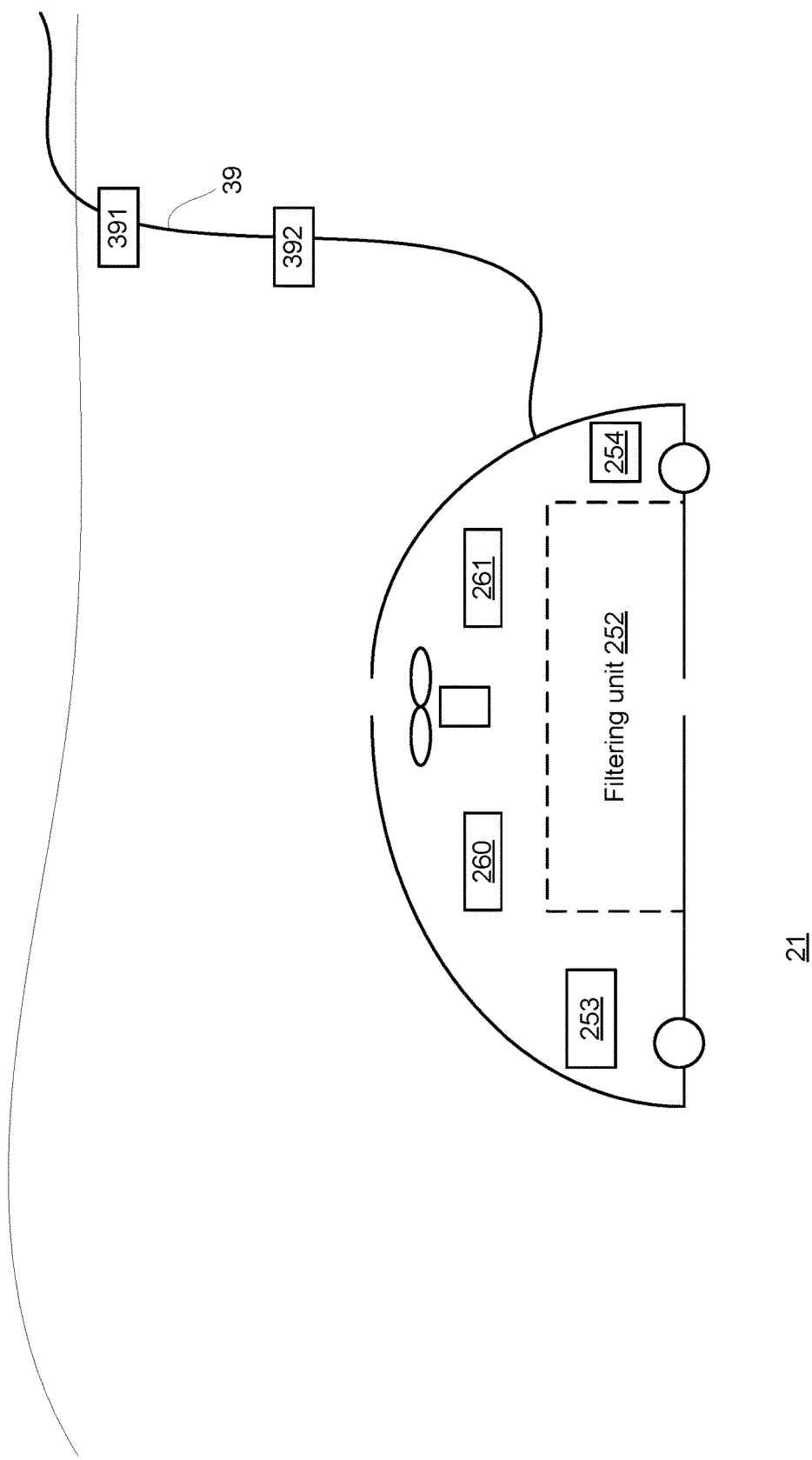
FIG. 21 is an example of a pool cleaning robot.

FIG. 21 illustrates first pool cleaning robot 21 as connected to a cord 39 that include transmitter 391 and receiver or sensor 392.

FIG. 21 also illustrates filtering unit 252, controller 253, impeller, pump motor, housing that includes a bottom aperture and a top aperture, drive motor and gear 254, power supply unit 261, and communication module 260.

There may be provided a method for cleaning a pool by a set of robots. The cleaning may be executed simultaneously, in a partially overlapping manner or in a non-overlapping manner.

The cleaning of the pool may require a participation of the pool cleaning robots of the set. Cleaning a pool using a set of pool cleaning robots may speed the cleaning period, may improve the cleanliness of the pool.

There may be provided a method for cleaning the pool using only a subset of the set (that subset may include one or more pool cleaning robots)—for example when the remaining pool cleaning robot are unavailable—or for any other reason. Cleaning the pool by using only the subset may be slower and/or less efficient than cleaning the pool using the entire set—but this is not necessarily so.

The cleaning may use a set of pool cleaning robots that may be equal to each other or may differ from each other. The difference may include different hardware components and/or different software, code, firmware or malware configurations.

Figure 23:
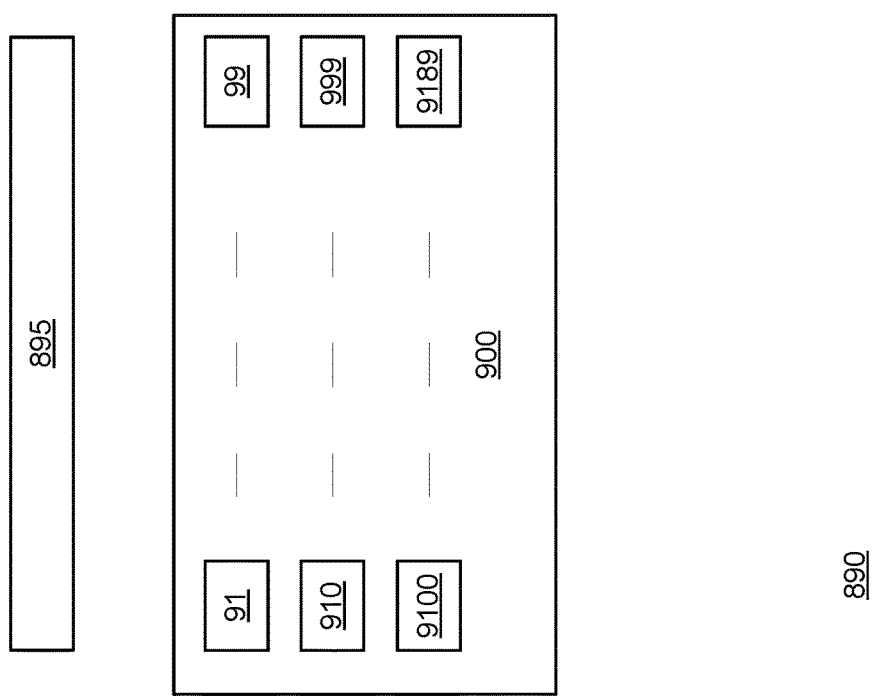
FIG. 23 is an example of a method.

FIG. 23 illustrates and example of method 890.

Method 890 may start by an initialization step 895.

The initializing step may include at least one out of:
a. Allocating cleaning tasks to the pool cleaning robots of the set.
b. Inserting the pool cleaning robot to the pool.
c. Configuring one or more pool cleaning robot of the set to cooperate with other pool cleaning robots of the set.
d. Communicating between the pool cleaning robots of the set.
e. Recognizing by at least one pool cleaning robot of the set its location within the pool.
f. Performing orientation within the pool of one or more pool cleaning robot.
g. Determining which pool cleaning robot is a master pool cleaning robot.
h. Determining which pool cleaning robot is a slave pool cleaning robot.
i. Determining which pool cleaning robot is not a master or slave pool cleaning robot.

Initialization step 895 may be followed by step 900 of cleaning a pool using at least two pool cleaning robots of a set of pool cleaning robots. The at least two pool cleaning robots may form the entire set or may form only a sub-set of the set.

In the following list any reference to a set of pool cleaning robots may also apply to a sub-set of pool cleaning robots. Thus, any step executed by one or more pool cleaning robot of a set may be executed by one or more pool cleaning robots of a sub-set of the set. The sub-set includes fewer pool cleaning robot than the set.

Step 900 may include at least one out of the following steps:
91. Cleaning the pool by a set, wherein the set may include a first pool cleaning robot and a second pool cleaning robot that differ from each other by at least one unit out of a propulsion unit and a cleaning unit; wherein each one of the first pool cleaning robot and the second pool cleaning robot may include a filtering unit, a housing, and a controller.
92. Cleaning the pool by at least two pool cleaning robots that differ from each other. The difference may be a difference in a propulsion unit, a difference in a cleaning unit, a difference in a sensor, a difference in a controller, and the like. The pool cleaning robots may include a filtering unit, a housing, and a controller.
93. Cleaning a sidewall of the pool by at least one pool cleaning robot of the set.
94. Performing, by at least one pool cleaning robot of the set, collision avoidance steps for preventing a collision between the first pool cleaning robot and the second pool cleaning robot.
95. Performing, by at least one of the set, cable entanglement avoidance steps for preventing an entanglement of a cable connected to the first pool cleaning robot with a cable connected to the second pool cleaning robot.
96. Cleaning the pool using the set wherein only one of the first pool cleaning robot and the second pool cleaning robot includes a jet propulsion unit.
97. Performing jet propulsion movement by at least one of the pool cleaning robots of the set.
98. Cleaning the pool using at least one out of a PVC brush wheel and PVA sponge brush wheel.

99. Cleaning the pool using a pool cleaning robot that may include a PVC brush wheel and does not include a Polyvinyl acetate (PVA) sponge brush wheel.
910. Cleaning the pool using a pool cleaning robot that may include a PVA sponge brush wheel and does not include a PVC brush wheel.
911. Cleaning the pool using the set wherein only one of the first pool cleaning robot and the second pool cleaning robot may include a sponge brush wheel.
912. Cleaning the pool using the set wherein only one of the first pool cleaning robot and the second pool cleaning robot may include a sponge brush wheel.
913. Cleaning the pool using a brush wheel that includes a sponge brush wheel portion and a PVC brush wheel portion.
914. Cleaning the pool using the set wherein only one of the first pool cleaning robot and the second pool cleaning robot includes a brush wheel that includes a sponge brush wheel portion and a PVC brush wheel portion.
915. Cleaning the pool using the set. The cleaning may include removing coarser coarser dirt by a first pool cleaning robot and cleaning finer dirt by a second pool cleaning robot.
916. Cleaning the pool using the set wherein the first pool cleaning robot is configured to hover between a bottom of a pool floor and a waterline.
917. Hovering one or more pool cleaning robots of the set between any points—such as a bottom of a pool and a waterline.
918. Cleaning the pool using the set wherein the first pool cleaning robot is configured to skim the water surface and then sink to the bottom floor.
919. Skimming the water surface by a pool cleaning robot of the set, and then sinking the pool cleaning robot to the bottom floor.
920. Cleaning the pool using the set wherein the first pool cleaning robot and the second pool cleaning robot are configured to clean different regions of the pool.
921. Cleaning different regions of the pool using different pool cleaning robots.
922. Cleaning the pool using the set wherein the first pool cleaning robot may include a detachable module, wherein the first pool cleaning robot and the second pool cleaning robot are configured to interchangeably receive the detachable module.
923. Exchanging a detachable module between two pool cleaning robots of the set. The exchanging may be executed during the cleaning, before the cleaning or after the cleaning. The detachable module may include a detachable sensor, a detachable power source, a detachable communication module, a detachable controller, and the like.
924. Cleaning the pool using the set where in the first pool cleaning robot and the second pool cleaning robot are configured to clean a same region of the pool at different manners
925. Cleaning the same region of the pool (in an overlapping, partially overlapping or non-overlapping timing) by pool cleaning robots of the set. For example— have a first and second pool cleaning robots clean the same region of the pool.
926. Cleaning the pool using the set wherein the first pool cleaning robot and the second pool cleaning robot cooperatively reallocate cleaning tasks according to failure to complete cleaning tasks.
927. Cooperatively reallocating cleaning tasks, by pool cleaning robots of the set.
928. Cooperatively reallocating cleaning tasks, by pool cleaning robots of the set according to a failure to complete one or more cleaning tasks. For example— when a pool cleaning robot malfunctions and/or from any reasons fails to complete his cleaning task (for example his progress is too slow and he cleaned only a part of the task) the pool cleaning robots may determine which pool cleaning robot (or robots) will finish the cleaning task—or may decide on any other reallocation of tasks. The failure to completing tasks are failure to traverse and/or clean slippery pool surfaces, especially slippery sloped bottom regions of the pool.
929. Cleaning a slippery flat bottom region of the pool by one or more pool cleaning robots of the set.
930. Cleaning a pool by a set of pool cleaning robots that may include a first pool cleaning robot and a second pool cleaning robot that differ from each other by at least one unit out of a propulsion unit and a cleaning unit; wherein each one of the first pool cleaning robot and the second pool cleaning robot may include a filtering unit, a housing, a, and a controller.
931. Cleaning the pool using the set, wherein the set includes first and second pool cleaning robots the are configured to clean different regions of the pool. The configuring may include programming the regions, programming any instructions that assist in maintaining the regions by the different pool cleaning robots, sensing demarcation region beacons or any other mean for delimiting between the regions.
932. Cleaning the pool using the set, wherein a first pool cleaning robot that has cleaning elements that equal to cleaning elements of the second pool cleaning robot.
933. Cleaning the pool using the set, wherein the first pool cleaning robot that has cleaning elements that differ from each cleaning element of the second pool cleaning robot.
934. Cleaning the pool using the set wherein the first pool cleaning robot has coarser cleaning elements than the second pool cleaning robot.
935. Cleaning the pool using the set wherein the first pool cleaning robot has finer cleaning elements than the second pool cleaning robot.
936. Cleaning the pool using the set. The cleaning may include climbing on a sidewall of the pool and cleaning the sidewall of the pool only by one of the first pool cleaning robot and the second pool cleaning robot.
937. Cleaning the pool using the set. The cleaning may include climbing on stairs of the pool only by one (or by both of) of the first pool cleaning robot and the second pool cleaning robot.
938. Cleaning the pool using the set wherein both the first pool cleaning robot and the second pool cleaning robot is configured to travel slippery surfaces of a pool.
939. Travelling over and/or cleaning slippery surfaces of a pool by one or more pool cleaning robots of the set.
940. Cleaning the pool using the set wherein only one of the first pool cleaning robot and the second pool cleaning robot may include a directional jet propulsion unit.
941. Cleaning the pool using the set wherein at least one pool cleaning robot comprises a directional jet propulsion unit that includes jet propulsion directionally adjustable outlet panes.

942. The cleaning may include adjusting a configuration of a jet propulsion directionally adjustable outlet panes thereby changing a direction of propagation of a pool cleaning robot.
943. Cleaning the pool using the set wherein the first pool cleaning robot may include a jet propulsion unit that differs from a jet propulsion unit of the second pool cleaning robot.
944. Moving different pool cleaning robots of the set using jet propulsion units that differ from each other by shape and/or size and/or strength, and/or directions of jets, number of jets, and the like.
945. Cleaning the pool using the set wherein only the first pool cleaning robot is configured to climb on a sidewall of the pool and clean the sidewall of the pool, wherein only the second pool cleaning robot is configured to clean one or more slippery surfaces of the pool and a third pool cleaning robot is configured to clean only a bottom of the pool.
946. Climbing on a sidewall of the pool (or hovering nearby) and cleaning the sidewall of the pool by one of the pool cleaning robots of the sets.
947. Cleaning one or more slippery surfaces of the pool by one of the pool cleaning robots of the sets.
948. Cleaning the pool using the set wherein the first pool cleaning robot is configured to clean a surface of the first grip level and is not configured to clean a surface of the second grip level; and wherein the second pool cleaning robot is configured to clean a surface of the second grip level.
949. Cleaning surfaces of a first grip level by a pool cleaning robot that is not suited to clean surfaces of a second grip level.
950. Cleaning surfaces of a second grip level by a pool cleaning robot that is also suited to clean surfaces of a first grip level.
951. Cleaning the pool using the set wherein the first pool cleaning robot and the second pool cleaning robot have different types of brush wheels.
952. Cleaning the pool by different types of brush wheels.
953. Cleaning the pool using the set wherein the first pool cleaning robot and the second pool cleaning robot are of different propulsion units.
954. Moving pool cleaning robots within the pool using propulsion units that differ from each other.
955. Cleaning the pool using the set, the first pool cleaning robot and the second pool cleaning robot are of different interface elements for interfacing with the pool. The interface elements may be wheels, tracks, and the like. The wheels may differ from each other by shape, size, cross section, grip level, material and the like.
956. Cleaning the pool using the set wherein the first pool cleaning robot and the second pool cleaning robot are configured to communicate with each other.
957. Communicating between pool cleaning robot of the set before the cleaning, during the cleaning and/or after the cleaning.
958. Performing, by pool cleaning robots of the set, a distributed allocation of cleaning tasks between the first and second pool cleaning robots.
959. Cleaning the pool using the set wherein the first pool cleaning robot and the second pool cleaning robot are configured to repetitively allocate, in a distributed manner, cleaning tasks between the first and second pool cleaning robots.
960. Repetitively allocating, in a distributed manner, cleaning tasks between pool cleaning robots of the set. The repetitions may be periodic, non-periodic, be triggered by events (failure, completion of tasks, collision, or cable entanglement danger, and the like) or in any other manner.
961. Different pool cleaning robots of the set (or the same pool cleaning robot) may participate in different allocations.
962. The allocation may involve using any allocation process.
963. Repetitively allocating based on a state of at least one pool cleaning robot of the set.
964. Repetitively allocating based on a fullness of a battery of at least one pool cleaning robot of the set.
965. Repetitively allocating based on a state of the filtering elements of the pool cleaning robots.
966. Repetitively allocating based on slipping and drifting of the pool cleaning robot planned cleaning trajectories.
967. Repetitively allocating based on a slipperiness state of the pool.
968. Cleaning the pool using the set wherein only one of the first pool cleaning robot and the second pool cleaning robot is configured to perform sideways waterline cleaning.
969. Performing sideways waterline cleaning by any number of pool cleaning robots of the set.
970. Cleaning the pool using the set wherein the first pool cleaning robot and the second pool cleaning robot are configured to perform waterline cleaning.
971. Performing waterline cleaning by any number of pool cleaning robots of the set.
972. Recognizing, by any number of pool cleaning robots of the set, pool underwater features.
973. Cleaning the pool using the set wherein the first pool cleaning robot and the second pool cleaning robot are configured to independently recognize pool underwater features.
974. Cleaning the pool using the set wherein the first pool cleaning robot and the second pool cleaning robot are configured to independently (or non-independently) generate one or more maps of the pool or any part of the pool.
975. Independently or non-independently generating one or more maps of the pool (or any part of the pool) by any number of pool cleaning robots of the set.
976. Cleaning the pool using the set wherein the first pool cleaning robot is configured to merge maps of the pool (or any part of the pool) generated by the first pool cleaning robot and the second pool cleaning robot.
977. Merging maps of the pool (or any part of the pool) that are generated by pool cleaning robots of the set.
978. Cleaning the pool using the set wherein only one of the first pool cleaning robot and the second pool cleaning robot is configured to independently recognize pool underwater features.
979. Independently recognizing pool underwater features by any number of pool cleaning robots of the set.
980. Cleaning the pool using the set wherein the first pool cleaning robot and the second pool cleaning robot are configured to determine a spatial relationship between the first and second pool cleaning robots.
981. Determining spatial relationship between one or more pool cleaning robots of the set. The determination may be done by one or more pool cleaning robots of the set, and/or by one or more device that differs from the pool cleaning robots of the set.

982. Cleaning the pool using the set wherein only one of the first pool cleaning robot and the second pool cleaning robot is configured to determine a spatial relationship between the first and second pool cleaning robots.
983. Changing, by at least one pool cleaning robot, at least one communication parameter related to communication attempts (duration, strength, repetition rate, carrier frequency, and the like) between pool cleaning robots when at least one of the following occurs:
984. A pool cleaning robot reaches a demarcation between regions allocated to the different pool cleaning robots.
985. A distance or a change in a distance between pool cleaning robots.
986. A distance or a change in a distance between a pool cleaning robot and a border of a region of the pool that is allocated to another pool cleaning robot.
987. Cleaning the pool using the set wherein the first pool cleaning robot may include at least one sensor for sensing locations of cables connected to the first and second pool cleaning robots.
988. Sensing by at least one sensor of at least one pool cleaning robot, at least one location of at least one cable connected to the first and second pool cleaning robots.
989. Communicating between pool cleaning robots and or between a pool cleaning robot and another system information about the sensed location of the one or more cables connected to the one or more pool cleaning robots.
990. Repetitively configuring the propagation of the cables so that they do not entangle and twist with one another.
991. Cleaning the pool using the set wherein at least one of the first pool cleaning robot and the second pool cleaning robot is configured to exit from the pool without human intervention.
992. Exiting from the pool by any number of pool cleaning robots of the set without human intervention.
993. Assisting, by a first pool cleaning robot, in an exit process of a second pool cleaning robot from the pool.
994. Cleaning the pool using the set wherein the first pool cleaning robot is configured to push the second pool cleaning robot during a cleaning operation of the second pool cleaning robot.
995. Pushing one pool cleaning robot by another pool cleaning robot during a cleaning operation (before the cleaning operation and/or after the cleaning operation).
996. Pulling one pool cleaning robot by another pool cleaning robot during a cleaning operation (before the cleaning operation and/or after the cleaning operation) of at least one of the pool cleaning robots.
997. Mechanically and/or via fluid jets affecting, by at least one pool cleaning robot, a movement and/or a cleaning process applied by another pool cleaning robot.
998. Cleaning the pool using the set wherein the first pool cleaning robot is configured to pull the second pool cleaning robot during a cleaning operation of the second pool cleaning robot.
999. Cleaning the pool using the set wherein the first pool cleaning robot is configured to climb on the second pool cleaning robot.
9100. Climbing, by one pool cleaning robot, over another pool cleaning robot.
9101. Cleaning the pool using the set wherein the first pool cleaning robot is configured to detachably connect to the second pool cleaning robot
9102. Detachably connecting one or more pool cleaning robots to each other.
9103. Cleaning the pool using the set wherein the first pool cleaning robot is configured to recharge the second pool cleaning robot.
9104. Recharging one pool cleaning robot by another.
9105. Cleaning the pool using the set wherein the first pool cleaning robot is configured to direct at least one jet of fluid towards the second pool cleaning robot.
9106. Directing, from one pool cleaning robot a jet of fluid towards another pool cleaning robot.
9107. Cleaning the pool using the set wherein the first pool cleaning robot is configured to direct at least one jet of fluid towards dirt accumulated in wall and floor corners.
9108. Directing, by at least one pool cleaning robot, a jet of fluid towards wall and floor corners. The directing may include automatically rotating directional fluid jets outlet panes.
9109. Cleaning the pool using the set wherein the first pool cleaning robot is configured to travel while in a horizontal position on vertical pool sidewalls while maintaining its yaw.
9110. Moving a pool cleaning robot, during the cleaning process, before the cleaning process or after the cleaning process, while in a horizontal position on vertical pool sidewalls while maintaining its yaw. The yaw may be maintained while countering constant gravitational downward forces.
9111. Cleaning the pool using the set wherein the first pool cleaning robot is a cordless pool cleaning robot.
9112. Cleaning the pool using the set wherein a first pool cleaning robot and a second pool cleaning robot are configured to clean a same region of the pool at different manners.
9113. Cleaning a same region by different pool cleaning robots of the set in different manners. The different manners may differ from each other by cleaning speed and/or cleaning efficiency, by the type of debris that is scrubbed, by its granularity (coarser or finer cleaning), and the like.
9114. Cleaning the pool using the set wherein the first pool cleaning robot is configured to perform a preliminary cleaning of the region and the second pool cleaning robot is configured to perform a supplementary cleaning of the region.
9115. Cleaning the pool using the set wherein the preliminary cleaning is faster than the supplementary cleaning.
9116. Cleaning the pool using the set wherein the preliminary cleaning is slower than the supplementary cleaning.
9117. Cleaning the pool using the set wherein the preliminary cleaning is coarser than the supplementary cleaning.
9118. Cleaning the pool using the set wherein the second cleaning robot is configured to follow the first pool cleaning robot.
9119. Cleaning the pool while one pool cleaning robot follows the path of another pool cleaning robot.
9120. Cleaning the pool while one pool cleaning robot does not follow the path of another pool cleaning robot.
9121. Cleaning the pool while one pool cleaning robot maintains a certain distance from another pool cleaning robot. The certain distance may be smaller than a length of any one of the pool cleaning robots, may equal said length or may exceed the length.

9122. Cleaning the pool without maintaining a certain distance between pool cleaning robots.

9123. Cleaning the pool using the set wherein the second cleaning robot is configured to perform the supplementary cleaning of the region while staying within a cloud of debris elevated during the preliminary cleaning of the region.

9124. Collecting, by one pool cleaning robot, debris that was elevated from a surface of the pool by another pool cleaning robot.

9125. Cleaning the pool using the set wherein the includes a master pool cleaning robot and a slave pool cleaning robot.

9126. Cleaning the pool using the set wherein the first pool cleaning robot operates as a master pool cleaning robot during a certain period of time and wherein the second pool cleaning robot operates as a slave pool cleaning robot during the certain period of time.

9127. Operating a first pool cleaning robot as a master pool cleaning robot (at least during a certain period) and operating a second pool cleaning robot as a slave (at least during a certain period). The master pool cleaning robot may control the operations of the slave pool cleaning robot during the certain period 9128. Cleaning different regions of the pool by the master and slave pool cleaning robot.

9129. Cleaning the same region of the pool by the master and slave pool cleaning robots.

9130. Applying, by at least one of the slave and master pool cleaning robots, collision avoidance maneuvers to prevent collisions between the slave and master pool cleaning robots.

9131. Controlling, by the master pool cleaning robot, at least one cleaning related operation of the slave pool cleaning robot. This operation may include cleaning, moving within the pool, exiting from the pool, performing a backwash, replacing a filter of the slave cleaning robot, performing a collision avoidance maneuver, performing a cable entanglement avoidance maneuver, cleaning a filter of the slave pool cleaning robot, and the like. The controlling may include commanding, requesting, suggesting, programming, instructing, code reconfiguring, and the like.

9132. Cleaning the pool using the set wherein the master pool cleaning robot is configured to instruct the slave pool cleaning robot to perform cleaning operations within a predefined region of the pool, and wherein the slave pool cleaning robot is configured to perform the cleaning operations only within the predefined region of the pool.

9133. Instruct, by the master pool cleaning robot, the slave pool cleaning robot to perform cleaning operations within a predefined region of the pool.

9134. Performing, by the slave pool cleaning robot, the cleaning operations only within the predefined region of the pool.

9135. Cleaning the pool using the set wherein the master pool cleaning robot is configured to apply collision avoidance maneuvers to prevent collisions between the master pool cleaning robot and the slave pool cleaning robot.

9136. Instructing, by the master pool cleaning robot, the slave pool cleaning robot to apply collision avoidance maneuvers to prevent collisions between the master pool cleaning robot and the slave pool cleaning robot.

9137. Cleaning the pool using the set wherein the master pool cleaning robot has cleaning elements that equal to cleaning elements of the slave pool cleaning robot.

9138. Cleaning the pool using the set wherein the master pool cleaning robot has cleaning elements that differ from cleaning elements of the slave pool cleaning robot.

9139. Cleaning the pool using the set wherein the master pool cleaning robot has coarser cleaning elements than the slave pool cleaning robot.

9140. Cleaning the pool using the set wherein the master pool cleaning robot has finer cleaning elements than the slave pool cleaning robot.

9141. Cleaning the pool using the set wherein only one of the master pool cleaning robot and the slave pool cleaning robot is configured to climb on a sidewall of the pool and clean the sidewall of the pool.

9142. Climbing a sidewall of the pool by only one of the slave and master pool cleaning robots.

9143. Cleaning the pool using the set wherein only one of the master pool cleaning robot and the slave pool cleaning robot is configured to travel slippery surfaces of a pool.

9144. Traveling slippery surfaces of the pool by only one of the slave and master pool cleaning robots.

9145. Cleaning the pool using the set wherein both master pool cleaning robot and the slave pool cleaning robot is configured to travel slippery surfaces of a pool.

9146. Cleaning the pool using the set wherein only one of the master pool cleaning robot and the slave pool cleaning robot may include a jet propulsion unit.

9147. Using a jet propulsion unit by only one (or both) of the slave and master pool cleaning robots.

9148. Cleaning the pool using the set where in both the master pool cleaning robot and the slave pool cleaning robot may include a jet propulsion unit.

9149. Cleaning the pool using the set wherein the master pool cleaning robot may include a jet propulsion unit that differs from a jet propulsion unit of the slave pool cleaning robot.

9150. Cleaning the pool using the set wherein at least one pool cleaning robot of the set is configured to generate information about a status of a pool, and wherein the master pool cleaning robot is configured to allocate a cleaning task to the slave pool cleaning robot based on the information about the status of the pool.

9151. Generating, by at least one pool cleaning robot of the set information about a status of a pool. The one or more pool cleaning robot may include a master pool cleaning robot, a slave pool cleaning robot or a pool cleaning robot that is neither a master or a slave.

9152. Allocating, by the master pool cleaning robot, a cleaning task to the slave pool cleaning robot based on the information about the status of the pool. The status of the pool may include a cleanliness of the pool.

9153. Cleaning the pool using the set wherein the allocating of the cleaning task may include determining a region of the pool to be cleaned by the slave pool cleaning robot.

9154. Determining, by the master pool cleaning robot, a region of the pool to be cleaned by the slave pool cleaning robot.

9155. Cleaning the pool using the set wherein the allocating of the cleaning task may include determining a manner of cleaning of a pool region of the pool to be cleaned by the slave pool cleaning robot.

9156. Determining by the master pool cleaning robot, a manner of cleaning of a pool region of the pool to be cleaned by the slave pool cleaning robot.

9157. Cleaning the pool using the set wherein the master pool cleaning robot is configured to receive instructions from another device regarding an association between different pool cleaning robots of the sets and the different regions of the pool.

9158. Receiving, by the master pool cleaning robot, instructions from another device regarding an association between different pool cleaning robots of the sets and the different regions of the pool.

9159. Amending by the master pool cleaning robot the instructions or leaving the instructions unlamented.

9160. Communicating the instructions to one or other pool cleaning robots of the set.

9161. Receiving responses to the communication from one or more other pool cleaning robots.

9162. Negotiating the instructions with one or more slave pool cleaning robots.

9163. Receiving updates about the status of the pool and/or pool cleaning robots and updating the instructions.

9164. Cleaning the pool using the set wherein the master pool cleaning robot is configured to receive instructions from another device regarding an association between different pool cleaning robots of the set and the different regions of the pool, and to amend the association based on the status of the pool.

9165. Allocating, by the master pool cleaning robot, a cleaning task to the slave pool cleaning robot based on a status of the slave pool cleaning robot and a status of the master pool cleaning robot, a status of the slave pool cleaning robot.

9166. Cleaning the pool using the set wherein the master pool cleaning robot is configured to allocate a cleaning task to the slave pool cleaning robot based on at least one out of a status of the slave pool cleaning robot, 9167. Cleaning the pool using the set wherein the master pool cleaning robot is configured to receive a definition of the different regions of the pool and to define overlap areas of the pool that are cleaned, at different points in time, by more than a single pool cleaning robot.

9168. Defining by the master pool cleaning robot overlap areas of the pool that are cleaned, at different points in time, by more than a single pool cleaning robot.

9169. Cleaning the pool using the set wherein the master pool cleaning robot is configured to communicate information about the overlap areas to the slave pool cleaning robot.

9170. Communicating, by a master pool cleaning robot, information about the overlap areas to the slave pool cleaning robot.

9171. Cleaning the pool using the set wherein the master pool cleaning robot is configured to track a position of the slave pool cleaning robot.

9172. Tracking, by the master pool cleaning robot a position of the slave pool cleaning robot.

9173. Cleaning the pool using the set wherein each pool cleaning robot of the set is configured to track a position of at least one other pool cleaning robot of the set.

9174. Tracking by one or more pool cleaning robot position (or positions) of at least one pool cleaning robot of the set.

9175. Cleaning the pool using the set wherein the master pool cleaning robot and the slave pool cleaning robot are configured to replace roles.

9176. Replacing roles between a master pool cleaning robot and a slave pool cleaning robot.

9177. Turning a master pool cleaning robot to a pool cleaning robot that is neither a master pool cleaning robot or a slave pool cleaning robot.

9178. Turning a slave pool cleaning robot to a pool cleaning robot that is neither a master pool cleaning robot or a slave pool cleaning robot.

9179. Cleaning the pool using the set wherein the master pool cleaning robot is configured to receive information about a location of a cord that is connected to the slave pool cleaning robot and to allocate a region to be cleaned by the slave pool cleaning robot based on the information about the location of the cord that is connected to the slave pool cleaning robot and based on estimated or actual location of another cord that is connected to the master pool cleaning robot.

9180. Receiving, by a master pool cleaning robot, information about a location of a cord that is connected to the slave pool cleaning robot.

9181. Allocating, by the master pool cleaning robot, a region to be cleaned by the slave pool cleaning robot based on the information about the location of the cord that is connected to the slave pool cleaning robot and/or based on estimated or actual location of another cord that is connected to the master pool cleaning robot.

9182. Cleaning the pool using the set wherein the master pool cleaning robot is configured to sense a location of a cord that is connected to the slave pool cleaning robot and to allocate a region to be cleaned by the slave pool cleaning robot based on the sensed location of the cord that is connected to the slave pool cleaning robot and based on estimated or actual location of another cord that is connected to the master pool cleaning robot.

9183. Sensing, by the master pool cleaning robot, a location of a cord that is connected to the slave pool cleaning robot.

9184. Allocating, by the master pool cleaning robot, a region to be cleaned by the slave pool cleaning robot based on the sensed location of the cord that is connected to the slave pool cleaning robot and/or based on estimated or actual location of another cord that is connected to the master pool cleaning robot.

9185. Cleaning the pool using the set wherein the master pool cleaning robot may include at least one sensor that is not included in the slave pool cleaning robot.

9186. Cleaning the pool using the set wherein the master pool cleaning robot may include an image sensor that is not included in the slave pool cleaning robot.

9187. Cleaning the pool using the set wherein the master pool cleaning robot may include an image sensor that is a detachable modular sensor to be reattached to a slave pool cleaning robot.

9188. Cleaning the pool using the set wherein slave pool cleaning robot and the master pool cleaning robot are configured to perform cable entanglement avoidance steps for preventing an entanglement of a cable connected to the slave pool cleaning robot with a cable connected to the master pool cleaning robot.

9189. Performing, by at least one pool cleaning robot, cable entanglement avoidance steps for preventing an entanglement of a cable connected to the slave pool cleaning robot with a cable connected to the master pool cleaning robot.

Figure 24:
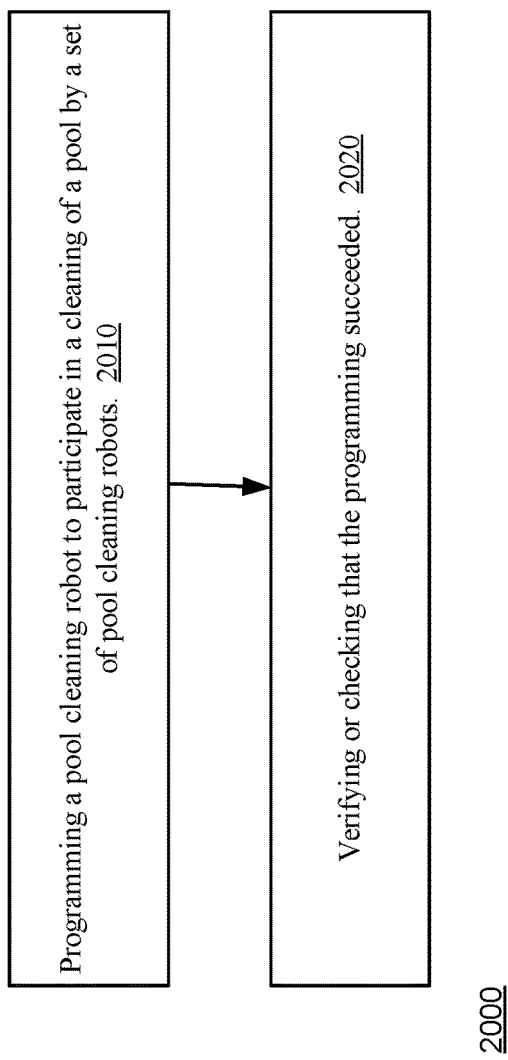
FIG. 24 is an example of a method.

FIG. 24 illustrates method 2000.

Method 2000 may include step 2010 of programming a pool cleaning robot to participate in a cleaning of a pool by a set of pool cleaning robots. The programming may include updating the programming, programming the pool cleaning robot in a remote manner—for example sending programming instructions over a communication link, programming the pool cleaning robot by sending programming commands over a wired connection, inserting to the pool cleaning robot a preprogrammed non-transitory computer readable medium, downloading programming instructions to the pool cleaning robot and the like.

Step 2010 may include any one out of:
a. Programming the pool cleaning robot to cooperate with at least one other pool cleaning robot of a set of pool cleaning robots that are configured to clean the same pool.
b. Programming the pool cleaning robot to receive instructions from a master pool cleaning robot.
c. Programming the pool cleaning robot to send instructions to a slave pool cleaning robot.
d. Programming the pool cleaning robot to send instructions to a slave pool cleaning robot.
e. Programming the pool cleaning robot to perform (or participate in a performing of) any one of the steps of method 890.
f. Programming the pool cleaning robot to perform any operation that the pool cleaning robot is configured to do—according to the specification.

Step 2010 may be followed by step 2020 of verifying or checking that the programming succeeded. This may include monitoring the operations of the pool cleaning robot during a cleaning process, before a cleaning process, by using a verification tool, and the like.

Any of the cleaning processes may be applied to one or more regions that cover the entire pool or only some part (or some parts) of the pool.

Unless explicitly stated otherwise (for example "only one of the first and second pool cleaning robot is configured to . . . ") any ability allocated to the first pool cleaning robot may be an ability of the second pool cleaning robot or any number of pool cleaning robots of the set. Unless explicitly stated otherwise any operation executed by the first pool cleaning robot may be executed by another pool cleaning robot of the set. For example—if the specification refers to a first pool cleaning robot that pushes a second pool cleaning robot—then the second pool cleaning robot may push the first pool cleaning robot. If the first pool cleaning robot is regarded as a master pool cleaning robot—then any other pool cleaning robot of the set may be a master pool cleaning robot and the first pool cleaning robot (and any number of pool cleaning robot of the set) may become slave pool cleaning robot.

A pool cleaning robot may be a master in correction to some operations (for example allocation of regions) but a slave pool cleaning robot in regard to other operations.

The terms "region", "portion" and "area" are used in an interchangeable manner.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a pool cleaning robot as including a certain component should also cover the scenario in which the pool cleaning robot does not include the certain component. For example—any reference to a method as including a certain step should also cover the scenario in which the method does not include the certain component. Yet for another example—any reference to a pool cleaning robot that is configured to perform a certain operation should also cover the scenario in which the pool cleaning robot is not configured to perform the certain operation.

The terms "pool cleaner" and "pool cleaning robot" are used in an autonomous manner and may refer to a self-propelled pool cleaner.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of pool cleaning robot that is illustrated in any of the figures and/or specification and/or the claims may be provided.

Any combination of any pool cleaning robot illustrated in any of the figures and/or specification and/or the claims may be provided.

Any combination of any set of pool cleaning robots illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

We claim:

1. A set of pool cleaning robots for cleaning a pool, wherein the set comprises a master pool cleaning robot and a slave pool cleaning robot wherein each one of the master pool cleaning robot and the slave cleaning robot is configured to independently generate a map of at least a part of the pool.

2. The set according to claim 1 wherein the master pool cleaning robot and the slave pool cleaning robot are configured to clean different regions of the pool.

3. The set according to claim 1 wherein the master pool cleaning robot and the slave pool cleaning robot are configured to a clean same region of the pool.

4. The set according to claim 1 wherein the slave pool cleaning robot and the master pool cleaning robot are configured to apply collision avoidance maneuvers to prevent collisions between the slave and master pool cleaning robots.

5. The set according to claim 1 wherein the master pool cleaning robot is configured to control at least one cleaning related operation of the slave pool cleaning robot.

6. The set according to claim 1 wherein the master pool cleaning robot is configured to apply collision avoidance maneuvers to prevent collisions between the master pool cleaning robot and the slave pool cleaning robot.

7. The set according to claim 1 wherein the master pool cleaning robot has cleaning elements that equal to cleaning elements of the slave pool cleaning robot.

8. The set according to claim 1 wherein only one of the master pool cleaning robot and the slave pool cleaning robot is configured to climb on a sidewall of the pool and clean the sidewall of the pool.

9. The set according to claim 1 wherein only one of the master pool cleaning robot and the slave pool cleaning robot is configured to travel slippery surfaces of a pool.

10. The set according to claim 1 wherein both master pool cleaning robot and the slave pool cleaning robot is configured to travel slippery surfaces of a pool.

11. The set according to claim 1 wherein both the master pool cleaning robot and the slave pool cleaning robot comprise a jet propulsion unit.

12. The set according to claim 1 wherein the master pool cleaning robot comprises a jet propulsion unit that differs from a jet propulsion unit of the slave pool cleaning robot.

13. The set according to claim 1 wherein at least one pool cleaning robot of the set is configured to generate information about a status of a pool, and wherein the master pool cleaning robot is configured to allocate a cleaning task to the slave pool cleaning robot based on the information about the status of the pool.

14. The set according to claim 1 wherein the master pool cleaning robot is configured to allocate a cleaning task to the slave pool cleaning robot based a status of the slave pool cleaning robot and a status of the master pool cleaning robot.

15. The set according to claim 1 wherein the master pool cleaning robot is configured to receive a definition of the different regions of the pool and to define overlap areas of the pool that are cleaned, at different points in time, by more than a single pool cleaning robot.

16. The set according to claim 1 wherein the master pool cleaning robot is configured to communicate information about the overlap areas to the slave pool cleaning robot.

17. The set according to claim 1 wherein each pool cleaning robot of the set is configured to track a position of at least one other pool cleaning robot of the set.

18. The set according to claim 1 wherein the master pool cleaning robot is configured to receive information about a location of a cord that is connected to the slave pool cleaning robot and to allocate a region to be cleaned by the slave pool cleaning robot based on the information about the location of the cord that is connected to the slave pool cleaning robot and based on estimated or actual location of another cord that is connected to the master pool cleaning robot.

19. The set according to claim 1 wherein the master pool cleaning robot comprises an image sensor that is not included in the slave pool cleaning robot.

20. The set according to claim 19 wherein the master pool cleaning robot comprises an image sensor that is a detachable modular sensor to be reattached to a slave pool cleaning robot.

21. The set according to claim 1 wherein slave pool cleaning robot and the master pool cleaning robot are configured to perform cable entanglement avoidance steps for preventing an entanglement of a cable connected to the slave pool cleaning robot with a cable connected to the master pool cleaning robot.

22. A method for cleaning a pool, the method comprises cleaning a pool by a set of pool cleaning robots that comprises a master pool cleaning robot and a slave pool cleaning robot, wherein cleaning comprises controlling a cleaning operation of the slave pool cleaning robot by the master pool cleaning robot; and independently generating a map of at least a part of the pool by each one of the master pool cleaning robot and the slave cleaning robot wherein each one of the first pool cleaning robot and the second pool cleaning robot comprises a filtering unit, a housing, and a controller.

23. The set according to claim 1 wherein the master pool cleaning robot is configured to allocate the cleaning task to the slave pool cleaning robot based on a cleanliness of a filtering unit of the slave pool cleaning robot.

24. The set according to claim 1 wherein the master pool cleaning robot is configured to allocate the cleaning task to the slave pool cleaning robot based on and energy resources status of the slave pool cleaning robot.

25. The set according to claim 1 wherein the master pool cleaning robot is configured to allocate the cleaning task to the slave pool cleaning robot based on a status of one or more cleaning robots of the set, wherein the status comprises a fault or an error.

26. The set according to claim 1 wherein the master pool cleaning robot is configured to allocate the cleaning task to the slave pool cleaning robot based on a status of one or more cleaning robots of the set, wherein the status comprises a progress or lack of progress of one or more cleaning tasks allocated to the one or more pool cleaning robots, and deviations of a pool cleaning robot of the set from allocated path.

27. The method according to claim 22 comprising switching roles of the master and slave second pool cleaning robots so that the slave pool cleaning robot becomes a master pool cleaning robot.

* * * * *